US012779402B2

(12) United States Patent
Yabuno et al.

(10) Patent No.: US 12,779,402 B2
(45) Date of Patent: Nov. 3, 2026

(54) WATER TREATMENT DEVICE AND ESTIMATION METHOD

(71) Applicant: KURARAY CO., LTD., Kurashiki (JP)

(72) Inventors: Youhei Yabuno, Okayama (JP); Kazuki Matsumoto, Okayama (JP); Takeyuki Nishikawa, Tokyo (JP); Kenji Shiode, Okayama (JP); Naru Teshima, Okayama (JP); Kensaku Komatsu, Okayama (JP); Shuwa Murata, Okayama (JP)

(73) Assignee: KURARAY CO., LTD., Kurashiki (JP)

(*) Notice: Subject to any disclaimer, the term of this patent is extended or adjusted under 35 U.S.C. 154(b) by 648 days.

(21) Appl. No.: 18/032,639

(22) PCT Filed: Oct. 26, 2021

(86) PCT No.: PCT/JP2021/039538

§ 371 (c)(1),
(2) Date: Apr. 19, 2023

(87) PCT Pub. No.: WO2022/092108

PCT Pub. Date: May 5, 2022

(65) Prior Publication Data

US 2023/0390706 A1 Dec. 7, 2023

(30) Foreign Application Priority Data

Oct. 27, 2020 (JP) ................................ 2020-179773
Apr. 30, 2021 (JP) ................................ 2021-077408
(Continued)

(51) Int. Cl.
*B01D 65/10* (2006.01)
*B01D 63/02* (2006.01)
(Continued)

(52) U.S. Cl.
CPC ........... *B01D 65/109* (2022.08); *B01D 63/02* (2013.01); *B01D 65/02* (2013.01); *B01D 65/10* (2013.01);
(Continued)

(58) Field of Classification Search
CPC ............ B01D 2311/14; B01D 2313/60; B01D 2313/70; B01D 2313/701;
(Continued)

(56) References Cited

U.S. PATENT DOCUMENTS

2010/0250154 A1 9/2010 Hanada et al.
2018/0333681 A1 11/2018 Nakanishi et al.
(Continued)

FOREIGN PATENT DOCUMENTS

JP H11-319516 A 11/1999
JP 2004216263 A 8/2004
(Continued)

OTHER PUBLICATIONS

Extended European Search Report issued Sep. 6, 2024, in corresponding European Patent Application No. 21886226.6, 8 pages.
(Continued)

*Primary Examiner* — Dirk R Bass
(74) *Attorney, Agent, or Firm* — Element IP, PLC

(57) ABSTRACT

A water treatment device includes: a measure that repeats measurement of pressures on a primary side and a secondary side of a hollow fiber membrane module every minute time of three seconds or less in one or more steps of water filling, backwashing, pressure relieving, bubbling, and draining; and an estimater that estimates: abnormality of an internal state of the hollow fiber membrane module or of a peripheral device; a time required from a start to an end of the one or more steps; an effect of physical washing or chemical washing; or a future increase in an membrane differential
(Continued)

pressure, based on a temporal transition of a measurement result of at least one of the pressures, or based on a difference in the temporal transition between a plurality of times of the step.

23 Claims, 18 Drawing Sheets

(30) Foreign Application Priority Data

Apr. 30, 2021 (JP) ................................ 2021-077409
May 17, 2021 (JP) ................................ 2021-083493

(51) Int. Cl.
*B01D 65/02* (2006.01)
*C02F 1/00* (2023.01)
*C02F 1/44* (2023.01)

(52) U.S. Cl.
CPC ........... *B01D 65/102* (2013.01); *C02F 1/008* (2013.01); *C02F 1/44* (2013.01); *B01D 2313/701* (2022.08); *B01D 2313/903* (2022.08); *B01D 2321/04* (2013.01); *B01D 2321/12* (2013.01); *B01D 2321/16* (2013.01); *B01D 2321/18* (2013.01); *C02F 2209/006* (2013.01); *C02F 2209/03* (2013.01); *C02F 2303/16* (2013.01)

(58) Field of Classification Search
CPC .......... B01D 2313/903; B01D 2321/04; B01D 2321/12; B01D 2321/16; B01D 2321/18; B01D 2321/40; B01D 61/22; B01D 63/02; B01D 65/02; B01D 65/06; B01D 65/10; B01D 65/102; B01D 65/109; C02F 1/008; C02F 1/44; C02F 1/444; C02F 2209/006; C02F 2209/03; C02F 2303/16
See application file for complete search history.

(56) References Cited

U.S. PATENT DOCUMENTS

| | | | |
|---|---|---|---|
| 2019/0046930 | A1 | 2/2019 | Imamura et al. |
| 2019/0184343 | A1 | 6/2019 | Hagawa et al. |
| 2020/0001240 | A1 | 1/2020 | Hayashi et al. |
| 2020/0339444 | A1 | 10/2020 | Yoshida et al. |

FOREIGN PATENT DOCUMENTS

| | | | |
|---|---|---|---|
| JP | 2008142675 | A | 6/2008 |
| JP | 6072994 | B1 | 2/2017 |
| JP | 6342101 | B1 | 6/2018 |
| JP | 2018183759 | A | 11/2018 |
| JP | 6479277 | B1 | 3/2019 |
| JP | 6607319 | B2 | 11/2019 |
| WO | WO-2009054506 | A1 | 4/2009 |
| WO | WO-2014171400 | A1 | 10/2014 |
| WO | WO-2017086313 | A1 | 5/2017 |
| WO | WO-2017221984 | A1 | 12/2017 |

OTHER PUBLICATIONS

Wikipedia, the free encyclopedia “Darcy Weissbach’s Formula”, https://ja.wikipedia.org/wiki/, retrieved on Nov. 26, 2024 (with machine English translation), 7 pages.
Official Communication regarding Third party Observations issued Nov. 13, 2024, received Nov. 19, 2024), in corresponding Japanese Patent Application No. 2021-077408 (with machine English translation), 13 pages.
“Daido University Heisei 19 Hydraulic Experiment 2. Pipeline” https://www.daido-it.ac.jp/~t-sumi/exp/shiryo2007/2.pdf, 2007 (with machine English translation), 10 pages.
International Preliminary Report on Patentability and Written Opinion issued May 11, 2023 in PCT/JP2021/039538 (with English translation), 12 pages.
International Search Report issued Dec. 14, 2021 in PCT/JP2021/039538 (with English translation), 5 pages.

FIG.3

| STEP | RAW WATER PUMP | AV1 | AV2 | AV3 | AV4 | AV5 | AV6 | AV7 | AV8 |
|---|---|---|---|---|---|---|---|---|---|
| FIRST WATER FILLING | ○ | ○ | | ○ | | | | | |
| FILTRATION | ○ | ○ | ○ | | | | | | |
| BACKWASHING PREPARATION | | ○ | ○ | | | | | | |
| BACKWASHING | | | | | ○ | ○ | | | |
| AIR VENTING | | | | | | | | ○ | |
| SECOND WATER FILLING | ○ | ○ | | ○ | | | | | |
| AIR DIFFUSER BUBBLING | | | | ○ | | | ○ | | |
| THIRD WATER FILLING | ○ | ○ | | ○ | | | | | |
| WATER CONDUIT BUBBLING | | | | ○ | | | | | ○ |
| DRAINING | | | | | ○ | | | | ○ |
| PRESSURE RELIEVING | | | | | ○ | | | | |

FIG.19

| STEP | RAW WATER PUMP | CHEMICAL SOLUTION PUMP | AV1 | AV2 | AV3 | AV4 | AV5 | AV6 | AV7 | AV8 |
|---|---|---|---|---|---|---|---|---|---|---|
| CHEMICAL SOLUTION INJECTION | | ○ | ○ | | ○ | | | | | |
| WATER FILLING | ○ | | ○ | | ○ | | | | | |
| CHEMICAL SOLUTION IMMERSION | | | | | ○ | | | | | |
| AIR BUBBLING | | | | | ○ | | | ○ | | |
| DRAINING | | | | | | ○ | | | | ○ |
| PRESSURE RELIEVING | | | | | | ○ | | | | |
| WATER FILLING | ○ | | ○ | | ○ | | | | | |
| AIR BUBBLING | | | | | ○ | | | ○ | | |
| DRAINING | | | | | | ○ | | | | ○ |
| PRESSURE RELIEVING | | | | | | ○ | | | | |

WATER TREATMENT DEVICE AND ESTIMATION METHOD

FIELD OF INVENTION

The present invention relates to a water treatment device and an estimation method.

BACKGROUND ART

Conventionally, a water treatment device that filters raw water using a hollow fiber membrane module has been known. In the water treatment device, raw water is supplied into the hollow fiber membrane module so as to permeate through a hollow fiber membrane, thereby discharging treated water from which a suspended component has been removed to the outside of the hollow fiber membrane module. When filtration is performed for a certain period of time, suspended components will be deposited on the hollow fiber membrane. As a result, permeation resistance of the hollow fiber membrane increases, and an membrane differential pressure, which is a difference between a pressure on a primary side (inner side) and a pressure on a secondary side (outer side) of the hollow fiber membrane module, increases. Therefore, in the water treatment device, it is a common practice to measure pressures on the primary side and the secondary side of the hollow fiber membrane module, and to use a measurement result as a performance index of the hollow fiber membrane module.

For example, Patent Literature 1 recites a fresh water generation system in which water to be treated is filtered by a separation membrane module having a hollow fiber membrane. In this fresh water generation system, pressures at a primary side inlet, a secondary side outlet, and a primary side outlet of the separation membrane module are measured at a step of supplying water to be treated, the time of starting a filtration step, and the time of starting a backwashing step. Based on measurement results of these pressures, resistances of an upper part and a lower part of the separation membrane module and the hollow fiber membrane are calculated. Then, based on an amount of change of the calculated resistance from an initial value or from a resistance calculated in the past, a clogged area of the separation membrane module is specified.

However, in the technique disclosed in Patent Literature 1, since the pressure on the primary side and the pressure on the secondary side of the separation membrane module are measured only once at the step of supplying water to be treated, the time of starting the filtration step, and the time of starting the backwashing step, respectively, it is not possible to appropriately estimate abnormality of an internal state of the hollow fiber membrane module or of a peripheral device of the hollow fiber membrane module, a time required from a start to an end of each step, an effect of physical washing or chemical washing of the hollow fiber membrane module, or a future increase in an membrane differential pressure.

CITATION LIST

Patent Literature

Patent Literature 1: Japanese Patent No. 6607319

SUMMARY OF INVENTION

An object of the present invention is to provide a water treatment device and an estimation method enabling appropriate grasp of a state or abnormality of a hollow fiber membrane module or a peripheral device of the hollow fiber membrane module, a time required for each step, a washing effect of the hollow fiber membrane module, or a future increase in an membrane differential pressure.

A water treatment device according to one aspect of the present invention is a water treatment device for filtering raw water using a hollow fiber membrane module, the water treatment device including: a measurement unit configured to repeat measurement of pressures on a primary side and a secondary side of the hollow fiber membrane module every minute time of three seconds or less in one or more of a water filling step, a backwashing step, a pressure relieving step, a bubbling step, and a draining step; and an estimation unit configured to estimate (1) abnormality of an internal state of the hollow fiber membrane module or of a peripheral device of the hollow fiber membrane module. (2) a time required from a start to an end of the one or more steps, (3) an effect of physical washing or chemical washing of the hollow fiber membrane module, or (4) a future increase in an membrane differential pressure of the hollow fiber membrane module, based on a temporal transition of a measurement result of at least one pressure of the primary side and the secondary side pressures, or when the one or more steps are performed a plurality of times, based on a difference in the temporal transition between the plurality of times of the step.

An estimation method according to another aspect of the present invention is an estimation method in a water treatment device for filtering raw water using a hollow fiber membrane module, in which a computer of the water treatment device repeats measurement of pressures on a primary side and a secondary side of the hollow fiber membrane module every minute time of three seconds or less in one or more of a water filling step, a backwashing step, a pressure relieving step, a bubbling step, and a draining step, and estimates (1) abnormality of an internal state of the hollow fiber membrane module or of a peripheral device of the hollow fiber membrane module, (2) a time required from a start to an end of the one or more steps, (3) an effect of physical washing or chemical washing of the hollow fiber membrane module, or (4) a future increase in an membrane differential pressure of the hollow fiber membrane module, based on a temporal transition of a measurement result of at least one pressure of the primary side and the secondary side pressures, or when the one or more steps are performed a plurality of times, based on a difference in the temporal transition between the plurality of times of the step.

According to the present invention, it is possible to provide a water treatment device and an estimation method enabling appropriate grasp of a state or abnormality of a hollow fiber membrane module or a peripheral device of the hollow fiber membrane module, a time required for each step, a washing effect of the hollow fiber membrane module, or a future increase in an membrane differential pressure.

BRIEF DESCRIPTION OF DRAWINGS

FIG. 3 is a diagram showing an on/off state of a raw water pump and an open/shut state of a valve in each step of a filtration process.

FIG. 19 is a diagram showing an on/off state of the raw water pump and an open/shut state of the valve in a chemical solution immersion step.

DETAILED DESCRIPTION

In the following, embodiments will be described in detail with reference to the drawings.

First Embodiment

Figure 1:
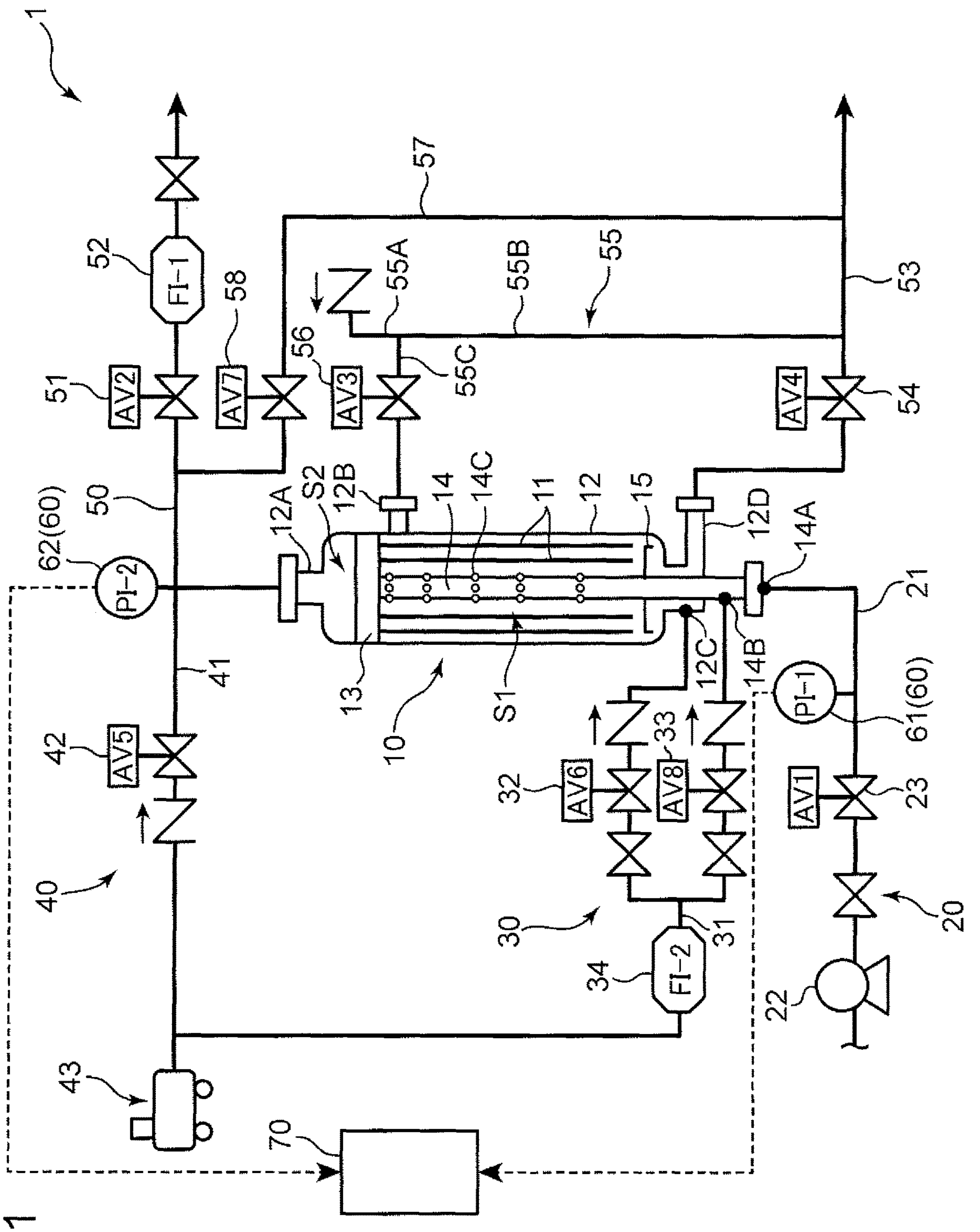
FIG. 1 is a diagram schematically showing a configuration of a water treatment device.

First, a configuration of a water treatment device 1 according to a first embodiment will be described with reference to FIG. 1. As shown in FIG. 1, the water treatment device 1 mainly include a hollow fiber membrane module 10, a raw water supply unit 20, a bubbling air supply unit and a backwashing air supply unit 40.

The hollow fiber membrane module 10 includes a hollow fiber membrane bundle having a plurality of hollow fiber membranes 11 whose upper ends are fixed to a fixing member 13, a housing 12, a water conduit 14 extending vertically inside the hollow fiber membrane bundle, and an air diffuser 15. The hollow fiber membrane bundle, the fixing member 13, and the air diffuser are accommodated in the housing 12. A space in the housing 12 is partitioned into a raw water space S1 and a treated water space S2 by the fixing member 13. The hollow fiber membrane 11, the water conduit 14, and the air diffuser 15 are accommodated in the raw water space S1.

As shown in FIG. 1, an outlet 12A for treated water is provided in an upper portion of the housing 12 so as to face the treated water space S2. An air vent 12B is provided on a side portion (a portion above the center in a length direction) of the housing 12 so as to face the raw water space S1. An air supply port 12C and a drain port 12D are provided in a lower portion of the housing 12 so as to face the raw water space S1. A ratio of an inner diameter of the housing 12 to inner diameters of the pipe connection ports (the outlet 12A, the air vent 12B, the air supply port 12C, and the drain port 12D) is 1.3 or more and 12 or less, preferably 2.5 or more and 12 or less, and more preferably 3.0 or more and 6.0 or less. The inner diameter of the housing 12 here is an inner diameter in a cross section in a direction orthogonal to the longitudinal direction of the housing 12.

The water conduit 14 is used to supply raw water and air to the raw water space S1. As shown in FIG. 1, the water conduit 14 has an upper end portion fixed to the fixing member 13 to have an end surface closed, and a lower end portion protruding downward from the lower portion of the housing 12. A raw water inlet 14A and an air inlet 14B are provided in the lower end portion. In the water conduit 14, a large number of holes 14C are formed for ejecting at least one of raw water and air from an inside of the water conduit 14 toward the raw water space S1.

The air diffuser 15 is used to diffuse air to the raw water space S1. The air diffuser 15 has a disk shape expanding in a radial direction of the hollow fiber membrane bundle, and is disposed below a lower end of the hollow fiber membrane 11. The air diffuser 15 has a plurality of vent holes (not shown) formed at intervals in the radial direction. Air supplied from the air supply port 12C into the housing 12 is diffused toward the hollow fiber membrane bundle through the vent holes of the air diffuser 15.

As shown in FIG. 1, an upstream end of the treated water pipe 50 is connected to the outlet 12A of the housing 12. A downstream end of the treated water pipe 50 is connected to an inlet of a treated water tank (not shown). In the treated water pipe 50, a treated water valve 51 (open-shut valve) and a flow meter 52 installed on a downstream side of the valve are installed. The treated water pipe 50 has an inner diameter smaller than the inner diameter of the housing 12.

An upstream end of a drain pipe 53 is connected to the drain port 12D of the housing 12, and a drain valve 54 (open-shut valve) is installed in the drain pipe 53. The drain pipe 53 has an inner diameter smaller than the inner diameter of the housing 12.

An air vent pipe 55 has one end connected to the air vent 12B of the housing 12. The air vent pipe 55 has the other end branching into two. Specifically, the air vent pipe 55 includes a first branch part 55A, a second branch part 55B, and a connection part 55C. The connection part 55C has one end portion connected to the air vent 12B, and has the other end portion connected to the first branch part 55A and the second branch part 55B. The first branch part 55A is opened to the atmosphere, and the second branch part 55B is connected to a part of the drain pipe 53 on a downstream side of the drain valve 54. An air vent valve 56 (open-shut valve) is installed in the connection part 55C. The air vent pipe 55 has an inner diameter smaller than the inner diameter of the housing 12.

As shown in FIG. 1, the treated water pipe 50 and the drain pipe 53 are connected to each other by a pressure relieving pipe 57. The pressure relieving pipe 57 has one end connected to a part of the treated water pipe 50 on an upstream side of the treated water valve 51, and the other end of the pressure relieving pipe 57 is connected to a part of the drain pipe 53 on a downstream side of a connection part of the air vent pipe 55. The pressure relieving pipe 57 has a pressure relieving valve (open-shut valve) 58. The pressure relieving pipe 57 has an inner diameter smaller than the inner diameter of the housing 12.

The raw water supply unit 20 includes a raw water pipe 21, and a raw water pump 22 and a raw water valve 23 installed at the raw water pipe 21. The raw water pipe 21 has an upstream end connected to an outlet of a raw water tank (not illustrated) and a downstream end connected to the raw water inlet 14A of the water conduit 14. The raw water pipe 21 has an inner diameter smaller than the inner diameter of the housing 12. The raw water valve 23 is an open-shut valve, and is installed in the raw water pipe 21 on a downstream side of the raw water pump 22.

The bubbling air supply unit 30 includes an air pipe 31, a first air valve 32, a second air valve 33, and a flow meter 34. The air pipe 31 has a downstream end branched, one of the branch parts being connected to the air supply port 12C of the housing 12, and the other of the branch parts being connected to the air inlet 14B of the water conduit 14. The air pipe 31 has an inner diameter smaller than the inner diameter of the housing 12. The first air valve 32 and the second air valve 33 are open-shut valves, the first air valve 32 is installed at one branch part of the air pipe 31, and the second air valve 33 is installed at the other branch part. The air pipe 31 has an upstream end connected to an air compressor 43.

The backwashing air supply unit 40 includes an air pipe 41 and an air valve 42 (open-shut valve) installed in the air pipe 41. The air pipe 41 has an upstream end connected to the air compressor 43, and a downstream end connected to a part of the treated water pipe 50 on an upstream side of a connection part of the pressure relieving pipe 57. The air pipe 41 has an inner diameter smaller than the inner diameter of the housing 12.

A primary side pressure sensor 61 repeatedly measures a pressure on a primary side of the hollow fiber membrane module 10 at intervals of three seconds or less under the control of a measurement control unit 73 to be described later. A secondary side pressure sensor 62 repeatedly measures a pressure on a secondary side of the hollow fiber membrane module 10 at intervals of three seconds or less under the control of the measurement control unit 73 to be described later.

As illustrated in FIG. 1, the primary side pressure sensor 61 is installed at the raw water pipe 21. The primary side pressure sensor 61 may be installed at a part between the raw water valve 23 and the raw water inlet 14A, or may be installed at a part of the water conduit 14, the part extending from the housing 12, or at a position facing the raw water space S1 in the housing 12.

The secondary side pressure sensor 62 is installed at the treated water pipe 50. The secondary side pressure sensor 62 may be installed at a connection part between the treated water pipe 50 and the air pipe 41. The primary side pressure sensor 61 and the secondary side pressure sensor 62 in the present embodiment repeatedly perform pressure measurement at intervals of 0.1 seconds or less, and obtained measurement data is transmitted to a control device 70 and stored therein. In other words, each measurement data is stored as pressure logging data.

Note that an air vent pressure sensor (not illustrated) may be provided in addition to the primary side pressure sensor 61 and the secondary side pressure sensor 62. The air vent pressure sensor is installed at the connection part 55C of the air vent pipe 55. The air vent pressure sensor performs pressure measurement at intervals of 0.1 seconds or more and three seconds or less, and obtained measurement data is transmitted to the control device 70 and stored therein. In other words, each measurement data is stored as logging data. However, as the number of pressure sensors increases, there occur problems that analysis takes more time and effort, and that cost increases. Therefore, it is desirable to omit the air vent pressure sensor and perform data analysis using data from the primary side pressure sensor 61 and the secondary side pressure sensor 62.

Figure 2:
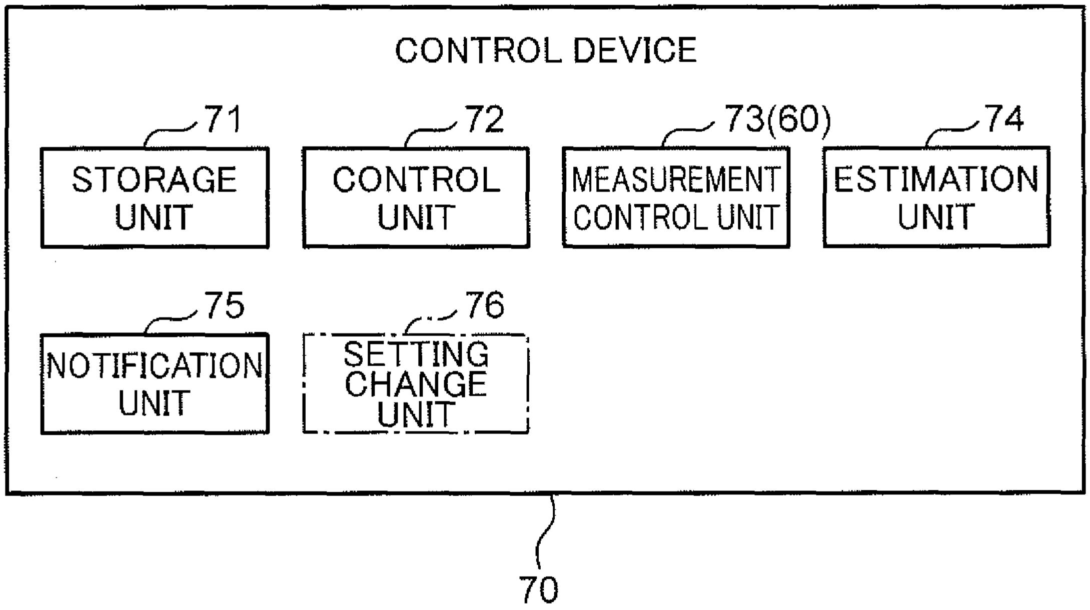
FIG. 2 is a diagram schematically showing a configuration of a control device.

The water treatment device 1 further includes the control device 70. The control device 70 controls driving of the raw water pump 22 and the air compressor 43, and controls opening/shutting operation of each valve. The control device 70 is configured by, for example, a personal computer (computer). As indicated by a solid line in FIG. 2, the control device 70 includes a storage unit 71, a control unit 72, a measurement control unit 73, an estimation unit 74, and a notification unit 75.

The storage unit 71 is configured by a storage device such as a hard disk drive (HDD) or a solid state drive (SSD). The storage unit 71 stores sequence information defining an execution order of steps (a water filling step, a filtration step, a backwashing step, an air diffuser bubbling step (a bubbling step), a pressure relieving step, a water conduit bubbling step (a bubbling step), a draining step, and the like) configuring a process (hereinafter, filtration process) of filtering raw water using the hollow fiber membrane module 10. In addition, the storage unit 71 stores step information defining contents of driving control of a peripheral device and opening/shutting control of a valve performed in each step and a time (hereinafter, set time) for performing each step.

The control unit 72 is configured by a microcomputer including a CPU, a RAM, a ROM, and the like. The control unit 72 controls execution of the filtration process. Specifically, the control unit 72 sequentially executes each step configuring the filtration process according to the sequence information stored in the storage unit 71. When starting the execution of each step, the control unit 72 performs the driving control of the peripheral device and the opening/shutting control of the valve corresponding to a step to be executed according to the step information stored in the storage unit 71.

The measurement control unit 73 is configured by a microcomputer including a CPU, a RAM, a ROM, and the like. In each step sequentially executed in the filtration process, the measurement control unit 73 causes the primary side pressure sensor 61 to repeat measurement of the primary side pressure and causes the secondary side pressure sensor 62 to repeat measurement of the secondary side pressure every minute time of three seconds or less. The minute time is preferably three seconds or less, more preferably one second or less, most preferably 0.1 seconds, and is 0.001 seconds or more.

The measurement control unit 73 sequentially stores the pressure logging data indicating the measured pressure on the primary side and pressure on the secondary side in the storage unit 71. In the filtration step, the measurement control unit 73, on a minute basis (e.g., ten minutes), may cause the primary side pressure sensor 61 to measure the primary side pressure and may cause the secondary side pressure sensor 62 to measure the secondary side pressure. In other words, the measurement control unit 73, the primary side pressure sensor 61, and the secondary side pressure sensor 62 configure a measurement unit 60 that repeatedly measures the primary side pressure and the secondary side pressure every minute time of three seconds or less in the respective steps sequentially executed in the filtration process.

The estimation unit 74 is configured by a microcomputer including a CPU, a RAM, a ROM, and the like. The estimation unit 74 estimates abnormality of an internal state of the hollow fiber membrane module 10 or of the peripheral device of the hollow fiber membrane module 10 based on a temporal transition of a measurement result of at least one of the pressure on the primary side and the pressure on the secondary side indicated by the pressure logging data stored in the storage unit 71. The estimation unit 74 outputs information indicating various estimation results. Details of the estimation by the estimation unit 74 will be described later.

The notification unit 75 is configured by a microcomputer including a CPU, a RAM, a ROM, and the like, and a display device such as a liquid crystal display. The notification unit 75 notifies various estimation results indicated by output information of the estimation unit 74.

Specifically, the microcomputer causes the display device to display a message indicating results of various estimations indicated by the output information of the estimation unit 74, so that the notification unit 75 notifies the results of various estimations obtained by the estimation unit 74.

Alternatively, the notification unit 75 may be configured by a microcomputer including a CPU, a RAM, a ROM, and the like, and a communication device that transmits an electronic mail to an information processing device owned by an administrator of the water treatment device 1. In this case, the microcomputer causes the communication device to transmit an electronic mail including the output information of the estimation unit 74 to the information processing device owned by the administrator of the water treatment device 1, so that the notification unit 75 notifies the results of various estimations obtained by the estimation unit 74.

Alternatively, the notification unit 75 may be configured by a microcomputer including a CPU, a RAM, a ROM, and the like, and a voice output device such as a speaker. In this case, the microcomputer causes the voice output device to output voice indicating the output information of the estimation unit 74, so that the notification unit 75 notifies the results of various estimations obtained by the estimation unit 74.

Alternatively, the notification unit 75 may be configured by combining a microcomputer including a CPU, a RAM, a ROM, and the like, and two or more devices among the display device, the communication device, and the voice output device.

Alternatively, two or more of the control unit 72, the measurement control unit 73, the estimation unit 74, and the notification unit 75 may be configured by the same microcomputer, or each of the control unit 72, the measurement control unit 73, the estimation unit 74, and the notification unit 75 may be configured by a separate microcomputer.

Note that timing at which the notification unit 75 notifies the results of various estimations obtained by the estimation unit 74 is not particularly limited. The notification unit 75 may notify an estimation result every time the estimation unit 74 performs estimation, or may collectively notify estimation results for a predetermined number of times of estimations every time the estimation unit 74 performs estimation the predetermined number of times.

[Filtration Process]

Next, the filtration process will be described with reference to FIG. 3. FIG. 3 is a diagram showing a relationship between an on/off state of the raw water pump 22 and an open/shut state of a valve in each step executed in the filtration process. A circle in FIG. 3 indicates the on state of the raw water pump 22 or the open state of the valve, and a blank indicates the off state of the raw water pump 22 or the shut state of the valve. In the present embodiment, as shown in FIG. 3, the control unit 72 executes each step in the filtration process according to the sequence information stored in the storage unit 71 in the order of a first water filling step, the filtration step, a backwashing preparation step, the backwashing step, an air venting step, a second water filling step (before the air diffuser bubbling), the air diffuser bubbling step, a third water filling step (before the water conduit bubbling), the water conduit bubbling step, the draining step, and the pressure relieving step. The steps performed in the filtration process and the execution order thereof are not limited thereto.

First, in the first water filling step, the raw water pump 22 is operated, and the raw water valve 23 and the air vent valve 56 are opened. As a result, raw water is supplied into the water conduit 14 through the raw water pipe 21, and the raw water is supplied to the raw water space S1 through the holes 14C.

When the first water filling step ends, the processing proceeds to the filtration step. In the filtration step, the air vent valve 56 is shut and the treated water valve 51 is opened. The raw water permeates through a membrane wall from an outer surface toward an inner surface of the hollow fiber membrane 11, and flows into the treated water space S2 through a hollow portion of the membrane. Thereafter, the treated water flows out of the housing 12 through the outlet 12A, and is collected in a treated water tank (not shown) through the treated water pipe 50.

Although in the filtration step, an interval of the pressure measurement may be three seconds or less, it is not limited thereto, and may be longer than three seconds.

After the filtration step, physical washing is performed to remove a suspended component deposited on the outer surface of the hollow fiber membrane 11 during filtration. The physical washing includes the backwashing preparation step (the pressure relieving step), the backwashing step, the air venting step, the second water filling step, the air diffuser bubbling step, the third water filling step, the water conduit bubbling step, the draining step, and the pressure relieving step.

First, in the backwashing preparation step (the pressure relieving step), the raw water pump 22 is switched from on to off.

Next, in the backwashing step, the raw water valve 23 and the treated water valve 51 are shut, and the air valve 42 and the drain valve 54 are opened. Specifically, a pressure of pressurized air by the air compressor 43 is instantaneously applied to the treated water on the secondary side of the hollow fiber membrane module 10 simultaneously with the opening of the air valve 42. As a result, the treated water on the secondary side of the hollow fiber membrane module 10 is pressurized by air (medium) pressurized to a predetermined pressure, and the treated water permeates through the membrane wall from the inner surface toward the outer surface of the hollow fiber membrane 11. This brings suspended components deposited on the outer surface of the hollow fiber membrane 11 to be easily peeled off. At this time, since the primary side pressure sensor 61 and the secondary side pressure sensor 62 measure the pressure at intervals of three seconds or less, it is also possible to detect a pressure in a state immediately after the hollow fiber membrane 11 is pressurized from the inner surface and before the suspended components on a membrane surface are brought to be easily peeled off. The predetermined pressure is preferably 30 kPa to 500 kPa, more preferably 50 kPa to 300 kPa, and most preferably 50 kPa to 200 kPa.

Next, in the air venting step (pressure relieving step), the air valve 42 and the drain valve 54 are shut, and the pressure relieving valve 58 is opened. As a result, air remaining on the secondary side of the hollow fiber membrane module 10 is discharged through the pressure relieving pipe 57.

Next, in the second water filling step, the raw water pump 22 is operated, and the raw water valve 23 and the air vent valve 56 are opened similarly to the first water filling step.

Next, in the air diffuser bubbling step, the raw water pump 22 is switched from on to off, the raw water valve 23 is shut, and the first air valve 32 is opened. Note that the air vent valve 56 is kept open. As a result, air is supplied from the air supply port 12C into the housing 12, and the air is diffused toward the hollow fiber membrane bundle by the air diffuser 15. As a result, the hollow fiber membrane bundle fluctuates due to air bubbles, and the suspended components deposited on the membrane surface are peeled off.

Although also in the air diffuser bubbling step, an interval of the pressure measurement may be three seconds or less, it is not limited thereto, and may be longer than three seconds.

Next, in the third water filling step, the raw water pump 22 is operated, and the raw water valve 23 and the air vent valve 56 are opened similarly to the first and second water filling steps. As a result, the raw water in the raw water space S1 reduced in the air diffuser bubbling step is replenished.

Next, in the water conduit bubbling step, the raw water pump 22 is switched from on to off, the raw water valve 23 is shut, and the second air valve 33 is opened. As a result, pressurized air by the air compressor 43 is supplied from the air inlet 14B into the water conduit 14, and is supplied to the raw water space S1 through the hole 14C. Thus, the hollow fiber membrane bundle is washed by bubbling.

Although also in the water conduit bubbling step, an interval of the pressure measurement may be three seconds or less, it is not limited thereto, and may be longer than three seconds.

Next in the draining step, the air vent valve 56 is shut and the drain valve 54 is opened. Note that the second air valve 33 is kept open. As a result, the raw water in the raw water space S1 is pushed by the air and discharged from the drain port 12D to the outside of the housing 12.

Finally, in the pressure relieving step, the second air valve 33 is shut while the drain valve 54 remains open. This causes the air in the housing 12 (the raw water space S1) to be relieved. After the hollow fiber membrane module 10 is physically washed by the filtration process described above, the processing returns to the first water filling step, and the filtration process is resumed.

[Estimation Processing]

Next, description will be made of processing in which the estimation unit 74 performs various estimations based on the pressure logging data stored in the storage unit 71 (hereafter, referred to as estimation processing). The estimation unit 74 performs the estimation processing illustrated in FIG. 4 at arbitrary timing, for example.

First, in Step S41, the estimation unit 74 chronologically refers to the logging data of any one of the pressure on the primary side and the pressure on the secondary side stored in the storage unit 71 during a certain step. Then, the estimation unit 74 extracts change information indicating an event that specifies a change in pressure in the step based on a temporal transition of the referred pressure logging data. Details of extraction of the change information will be described later.

Next, in Step S42, the estimation unit 74 performs various estimations based on the change information extracted in Step S41. This will be described later in detail.

Next, in Step S43, the estimation unit 74 outputs information indicating a result of the estimation obtained in Step S42. This will be described later in detail.

Figure 5:
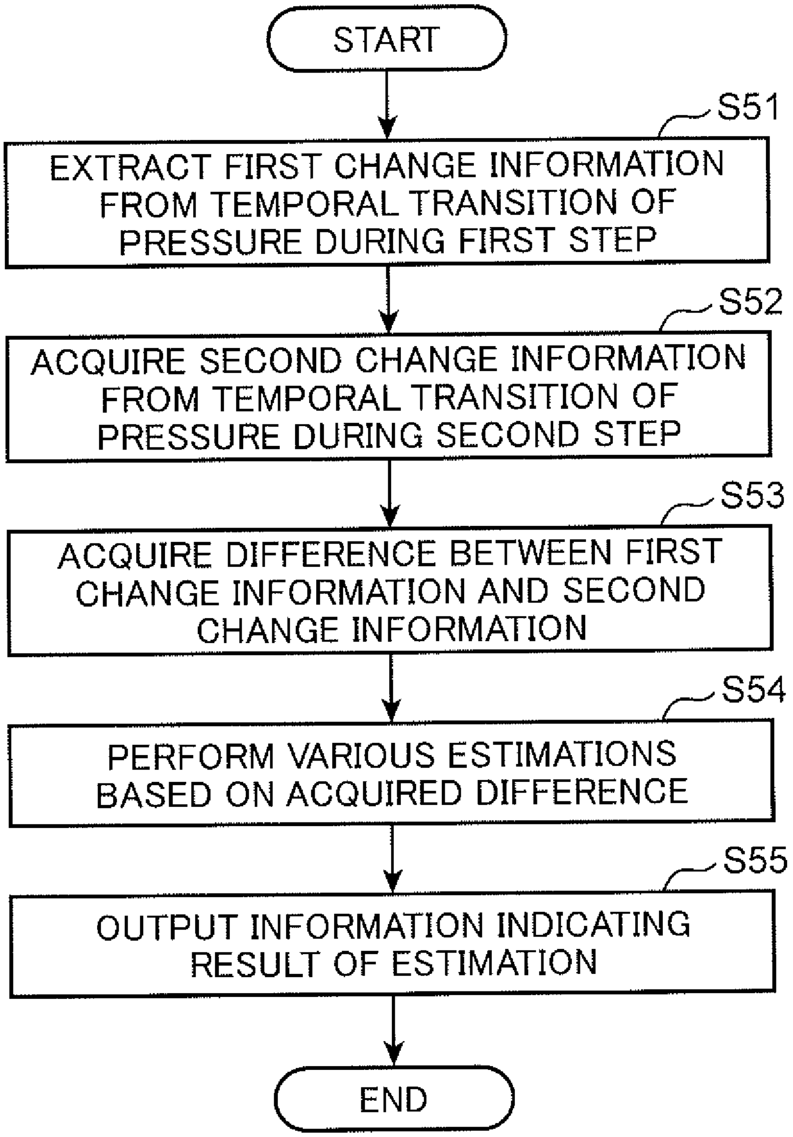
FIG. 5 is a flowchart showing another example of the estimation processing performed by the estimation unit.

Alternatively, as illustrated in FIG. 5, the estimation unit 74 may perform the estimation processing by comparing the pressure logging data in two steps.

Specifically, in Step S51, similarly to Step S41, the estimation unit 74 chronologically refers to the logging data of any one of the pressure on the primary side and the pressure on the secondary side stored in the storage unit 71 during a certain past step (hereinafter, referred to as first step) and extracts change information (hereinafter, referred to as first change information) indicating an event that specifies a change in pressure in the first step. Details of extraction of the first change information will be described later.

Next, in Step S52, similarly to Step S51, the estimation unit 74 chronologically refers to the logging data of the any one of the pressures stored in the storage unit 71 during a second step performed after the first step and extracts change information (hereafter, referred to as second change information) indicating an event specifying a change in pressure in the second step. Here, the second step and the first step are steps of the same kind (e.g., the first water filling step). In other words, since the same kind of step is repeated, the step performed first is set as the first step, and the step performed later is set as the second step. Details of extraction of the second change information will be described later.

Next, in Step S53, the estimation unit 74 acquires a difference between the second change information extracted in Step S52 and the first change information extracted in Step S51. This will be described later in detail.

Next, in Step S54, the estimation unit 74 performs various estimations based on the difference acquired in Step S53. This will be described later in detail.

Next, in Step S55, the estimation unit 74 outputs information indicating a result of the estimation obtained in Step S54. This will be described later in detail.

Next, estimation processing in which the estimation unit 74 performs various estimations based on the pressure logging data stored in the storage unit 71 will be detailed.

[Estimation Based on Pressure Logging Data During Water Filling Step]

First, estimation processing performed by the estimation unit 74 at the time of the first water filling step based on the pressure logging data stored in the storage unit 71 will be detailed.

[Estimation of Time Required for First Water Filling Step]

Figure 6:
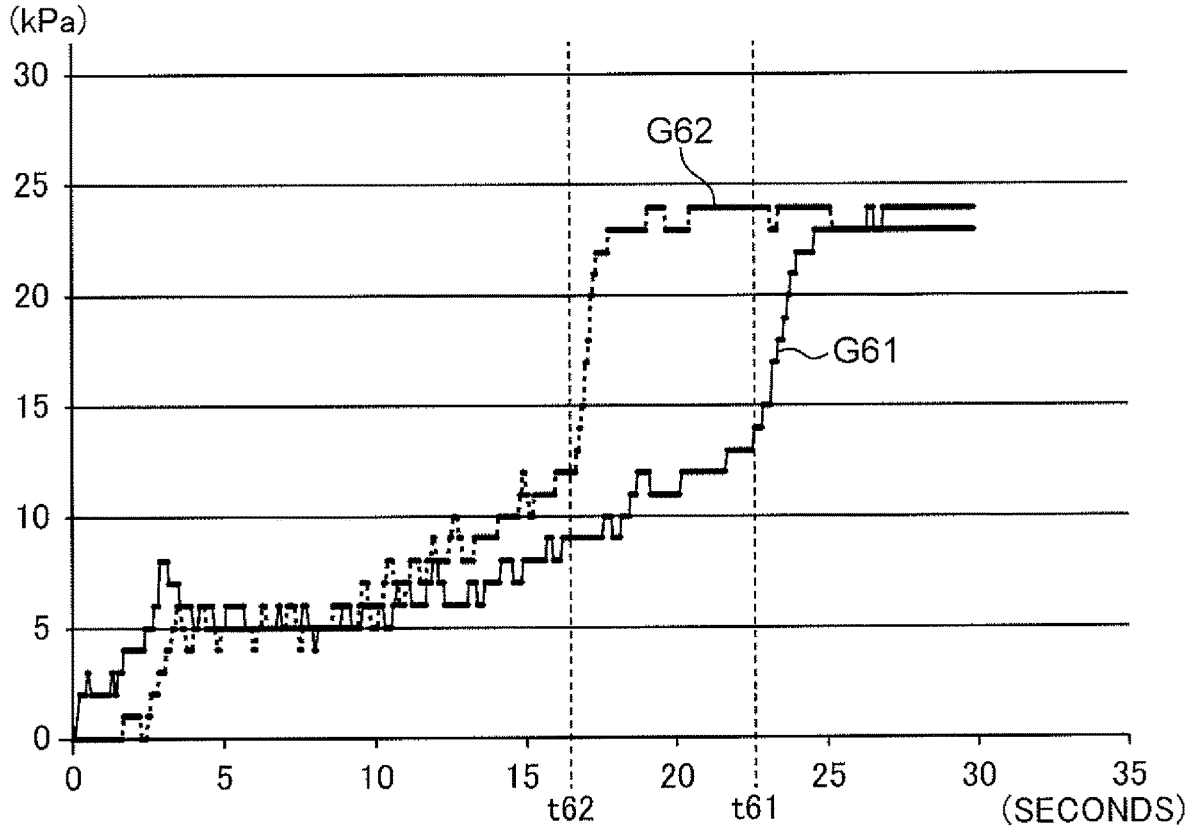
FIG. 6 is a diagram showing an example of pressure logging data at the time of a first water filling step.

FIG. 6 is a diagram showing an example of pressure logging data at the time of the first water filling step. In FIG. 6, a horizontal axis represents an elapsed time. (seconds) from a start of the first water filling step, and a vertical axis represents a pressure on the primary side (KPa) measured by the primary side pressure sensor 61. For example, as indicated by a polygonal line G61, in the first water filling step, when raw water is supplied to the raw water space S1 of the housing 12, the pressure on the primary side gradually increases due to a hydraulic head pressure. Thereafter, when the raw water space S1 of the housing 12 is full of water and the raw water flows out to the air vent pipe 55 (elapsed time t61), since the inner diameter of the air vent pipe 55 is sufficiently smaller than the inner diameter of the housing 12, pipeline resistance is generated, and the pressure on the primary side rapidly increases.

On the other hand, when suspended components are accumulated on the surface of the hollow fiber membranes 11, an effective capacity of the raw water space S1 inside the hollow fiber membrane module 10 decreases. In this case, for example, as indicated by a polygonal line G62, a time is shortened which is required until the pressure on the primary side rapidly increases (elapsed time t62) after the start of the first water filling step due to the raw water space S1 of the housing 12 being full of water.

Therefore, based on the pressure logging data stored in the storage unit 71 at the time of the first water filling step, the estimation unit 74 estimates a time required for the first water filling step from a time from the start of the first water filling step ("0" in FIG. 6) until an inflection point (e.g., the time points t61 and t62 in the drawing) of the change in the pressure on the primary side is reached.

Figure 4:
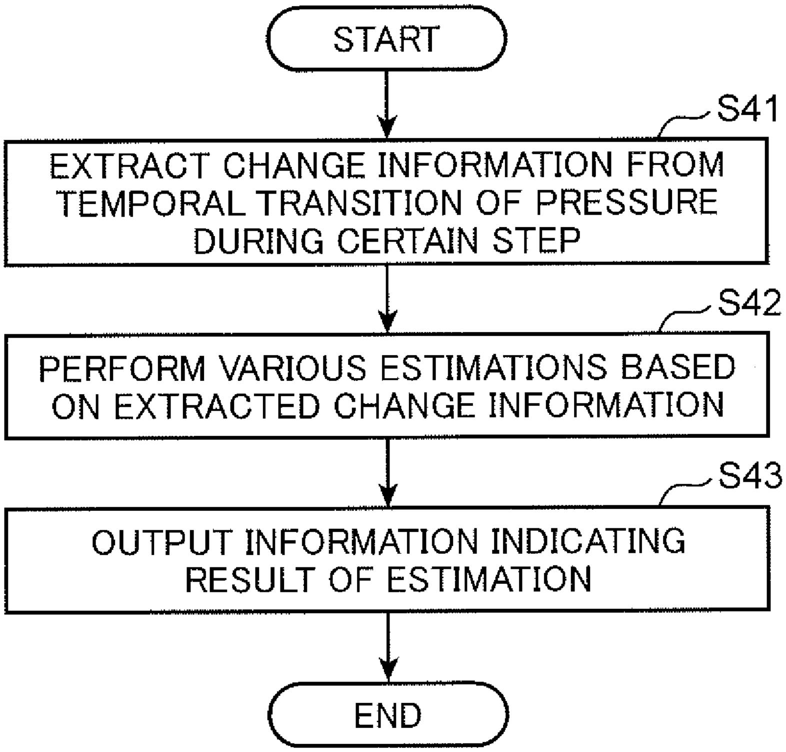
FIG. 4 is a flowchart showing an example of estimation processing performed by an estimation unit.

Specifically, the estimation unit 74 performs the estimation processing shown in FIG. 4 at an end of the filtration process. In Step S41, the estimation unit 74 chronologically refers to the logging data of the pressure on the primary side stored in the storage unit 71 during the first water filling step of the filtration process. Then, the estimation unit 74 extracts, as the change information, a time from the start time point of the first water filling step ("0" in FIG. 6) to a time point (e.g., the time point t61 in FIG. 6) at which the inflection point of the change in the pressure on the primary side is reached.

Here, in order to detect a time point at which the pressure on the primary side reaches the inflection point, the estimation unit 74 executes the following. For example, with respect to each of referred logging data, the estimation unit 74 performs processing of subtracting, from the logging data, one-preceding logging data. Then, the estimation unit 74 detects a time point (e.g., the time point t61 in the same drawing) at which the result of the subtraction becomes larger than a predetermined value as a time point at which the pressure on the primary side reaches the inflection point.

However, the method by which the estimation unit 74 detects a time point at which the pressure on the primary side reaches the inflection point in Step S41 is not limited thereto. For example, the estimation unit 74 may chronologically calculate a ratio of a current pressure on the primary side to a pressure on the primary side measured immediately before. Then, the estimation unit 74 may detect a time point at which the calculated ratio becomes equal to or more than a predetermined ratio as a time point at which the pressure on the primary side reaches the inflection point of the change in the pressure on the primary side.

The estimation unit 74 extracts, as the change information, a time (e.g., t61) from the start time point ("0" in FIG. 6) of the first water filling step to the detected time point (e.g., the time point t61 in the same drawing).

In Step S42, the estimation unit 74 estimates the time (e.g., t61) extracted as the change information in Step S41 as the time required for the first water filling step. In Step S43, the estimation unit 74 outputs information indicating the time required for the first water filling step estimated in Step S42 as the information indicating a result of the estimation.

[Estimation of Amount of Suspended Components Accumulated on Surface of Hollow Fiber Membrane 11]

In the above, the description has been made of the example of performing the estimation processing shown in FIG. 4 by the estimation unit 74 based on the pressure logging data stored in the storage unit 71 during the first water filling step. The present invention is not, however, limited thereto, and the estimation unit 74 may estimate an amount of suspended components accumulated on the surface of the hollow fiber membrane 11 by performing the estimation processing shown in FIG. 5 based on the pressure logging data stored in the storage unit 71 at a plurality of times of the first water filling step.

The present configuration can be realized, for example, as follows. The estimation unit 74 performs the estimation processing illustrated in FIG. 5 at the end of the filtration process. In Step S51, the estimation unit 74 refers to the pressure logging data stored in the storage unit 71 during the first water filling step of a past filtration process. The past filtration process is, for example, a filtration process that is first performed immediately after installation of the water treatment device 1 or after maintenance of the same. Then, the estimation unit 74 extracts a time (e.g., t61 in FIG. 6) required to the inflection point of the change in the pressure on the primary side from the start of the first water filling step as the first change information in a manner similar to Step S41 described in [Estimation of Time Required for First Water Filling Step] above.

In Step S52, the estimation unit 74 refers to the pressure logging data stored in the storage unit 71 during the first water filling step in the current filtration process. Then, the estimation unit 74 extracts a time required to reach the inflection point of the change in the pressure on the primary side from the start of the first water filling step as the second change information in a manner similar to Step S51.

In Step S53, the estimation unit 74 subtracts the time (e.g., t61) extracted as the first change information in Step S51 from the time (e.g., t62) extracted as the second change information in Step S52. The estimation unit 74 acquires the subtraction result (e.g., t62−t61) as a difference between the first change information extracted in Step S51 and the second change information extracted in Step S52.

In Step S54, the estimation unit 74 estimates the amount of the suspended components accumulated on the surface of the hollow fiber membrane 11 based on the difference acquired in Step S53.

In other words, the smaller the difference acquired in Step S53, the smaller state the effective capacity of the raw water space S1 inside the hollow fiber membrane module 10, so that it is presumed that the amount of the suspended components accumulated on the surface of the hollow fiber membrane 11 is large state. Therefore, when the difference acquired in Step S53 is larger than a predetermined positive first threshold value, the estimation unit 74 estimates that the amount of the suspended components accumulated on the surface of the hollow fiber membrane 11 is very small state. When the difference acquired in Step S53 is a positive value and is equal to or smaller than the first threshold value, the estimation unit 74 estimates that the amount of the suspended components accumulated on the surface of the hollow fiber membrane 11 is small state. When the difference acquired in Step S53 is a negative value and is larger than a predetermined negative second threshold value, the estimation unit 74 estimates that the amount of the suspended components accumulated on the surface of the hollow fiber membrane 11 is large state. When the difference acquired in Step S53 is equal to or smaller than the second threshold value, the estimation unit 74 estimates that the amount of the suspended components accumulated on the surface of the hollow fiber membrane 11 is very large state.

In Step S55, the estimation unit 74 outputs, as the information indicating a result of the estimation, information indicating that the amount of the suspended components accumulated on the surface of the hollow fiber membrane 11 estimated in Step S54 is very large state, large state, small state, or very small state.

Thus, it is possible to grasp how much suspended component is accumulated on the surface of the hollow fiber membrane 11 without disassembling the hollow fiber membrane module 10. Therefore, when it is estimated that suspended components are accumulated on the surface of the hollow fiber membrane 11 is large state, a filtration capacity of the hollow fiber membrane 11 can be restored at an early stage by rapidly enhancing physical washing of the hollow fiber membrane 11 or the like.

The physical washing is enhanced by operation of the control device 70 by a user and/or automatic operation by the control unit 72. The physical washing is enhanced by, for example, increasing a flow rate or a pressure of air supplied to the hollow fiber membrane module 10 in the air diffuser bubbling step or the water conduit bubbling step, or by repeating the steps from the backwashing step to the draining step continuously a plurality of times. In addition, the physical washing may be enhanced by combining two or more of these methods, or the physical washing may be enhanced by other methods without being limited to these methods.

Further, for example, based on an experimental value or the like, a suspended component prediction table may be stored in advance in the storage unit 71, the table in which a time from the start of the first water filling step until the inside of the hollow fiber membrane module 10 becomes full of water and an amount of the suspended components accumulated on the surface of the hollow fiber membrane 11 at this time are associated with each other. In this case, the estimation unit 74 may execute the estimation processing illustrated in FIG. 4.

In Step S42 of the estimation processing, the estimation unit 74 may acquire the amount of the suspended components associated, in the suspended component prediction table, with the time from the start of the first water filling step to the inflection point of the change in the pressure on the primary side, the time being extracted as the change information in Step S41. Then, the estimation unit 74 may estimate whether or not the amount of the suspended components is larger than a predetermined amount to estimate whether or not the amount of the suspended components accumulated on the surface of the hollow fiber membrane 11 is large state. In this case, in Step S43, the estimation unit 74 may output, as information indicating a result of the estimation, not only the information estimated in Step S42 and indicating whether or not suspended components accumulated on the surface of the hollow fiber membrane 11 is a large state, but also the information acquired in Step S42 and indicating the amount of suspended components.

In the above, the description has been made of the example in which the estimation unit 74 estimates an amount of the suspended components accumulated on the surface of the hollow fiber membrane 11 based on the logging data of the primary side pressure in the plurality of times of the first water filling step. The present invention is not, however, limited thereto. The estimation unit 74 may estimate an amount of the suspended components accumulated on the surface of the hollow fiber membrane 11 based on the logging data of the primary side pressure in one first water filling step.

The present configuration can be realized, for example, as follows. The estimation unit 74 performs the estimation processing shown in FIG. 4, and in Step S41, based on the logging data of the primary side pressure in one first water filling step, extracts the time from the start of the first water filling step until the inflection point of the change in the primary side pressure is reached as the change information. Then, in Step S42, the estimation unit 74 subtracts, from the time extracted in Step S41, the time from the start of the first water filling step until the inflection point of the change in the pressure on the primary side is reached, the time being determined in advance based on the experimental value or the like. Then, similarly to Step S53, the estimation unit 74 uses the result of the subtraction as a difference between the first change information and the second change information to estimate an amount of the suspended components accumulated on the surface of the hollow fiber membrane 11.

[Estimation of Future Increase in Membrane Differential Pressure (1)]

In the above, the description has been made of the example in which the estimation unit 74 estimates a time required for the first water filling step or an amount of the suspended components accumulated on the surface of the hollow fiber membrane 11. The present invention is not, however, limited thereto, and the estimation unit 74 may estimate a future increase in an membrane differential pressure of the hollow fiber membrane module 10.

For example, it is presumed that the larger an accumulation amount of the suspended components in the hollow fiber membrane module 10 and the smaller the effective capacity of the raw water space S1 in the hollow fiber membrane module 10, the larger a deposition amount of the suspended components in the hollow fiber membrane 11, i.e., it is presumed that the membrane differential pressure of the hollow fiber membrane module 10 will increase in the future. Therefore, the estimation unit 74 may refer to the pressure logging data (FIG. 6) stored in the storage unit 71 during the plurality of times of the first water filling step, and estimate a future increase in the membrane differential pressure of the hollow fiber membrane module 10 based on a difference, between the plurality of times of the first water filling step, in the time (0 (sec) to t61 in FIG. 6) from the start of the first water filling step until the inflection point of the change in the pressure on the primary side is reached.

The present configuration can be realized, for example, as follows. The estimation unit 74 performs the estimation processing illustrated in FIG. 5 at the end of the filtration process. In Step S51, the estimation unit 74 extracts a time from a start of a past first water filling step until the inflection point of the change in the pressure on the primary side is reached as the first change information. In Step S52, the estimation unit 74 extracts a time from the start of the current first water filling step until the inflection point of the change in the pressure on the primary side is reached as the second change information.

In Step S53, the estimation unit 74 subtracts the time extracted as the first change information from the time extracted as the second change information. When the result of the subtraction is a negative value, it is presumed that since the time of the first water filling step is shortened, the accumulation amount of the suspended components inside the hollow fiber membrane module 10 increases, and the effective capacity of the raw water space S1 inside the hollow fiber membrane module 10 decreases. Accordingly, in this case, the estimation unit 74 estimates in Step S54 that the membrane differential pressure of the hollow fiber membrane module 10 will increase in the future. In Step S55, the estimation unit 74 outputs information indicating that the membrane differential pressure of the hollow fiber membrane module 10 will increase in the future.

On the other hand, when the result of the subtraction in Step S53 is a value of 0 or more, the estimation unit 74 estimates in Step S54 that the membrane differential pressure of the hollow fiber membrane module 10 does not tend to increase. In this case, in Step S55, the estimation unit 74 outputs information indicating that the membrane differential pressure of the hollow fiber membrane module 10 does not tend to increase in the future.

In the present configuration, in the first water filling step, the pressure on the primary side of the hollow fiber membrane module 10 when the inside of the hollow fiber membrane module 10 is full of the raw water is intermittently measured. Accordingly, in the present configuration, a transition of the pressure on the primary side of the hollow fiber membrane module 10 according to an accumulation amount of the suspended components inside the hollow fiber membrane module 10 can be measured.

Moreover, in the present configuration, in each of the plurality of times of the first water filling step, the pressure on the primary side of the hollow fiber membrane module 10 is measured at an interval of three seconds or less shorter than a normal measurement interval of the membrane differential pressure in the filtration step. Therefore, it is possible to grasp a detailed temporal transition of the pressure on the primary side of the hollow fiber membrane module 10 in each first water filling step that ends within several minutes.

Accordingly, from a difference in the detailed temporal transition between the plurality of times of the first water filling step, it is possible to grasp the change in the accumulation amount of the suspended components inside the hollow fiber membrane module 10 according to a change in the pressure on the primary side of the hollow fiber membrane module 10.

Specifically, by a difference, between the plurality of times of the first water filling step, in a time from the start time point 0 (seconds) (FIG. 6) of the first water filling step to the time points t61 and t62 (FIG. 6) at which the inflection point of the change in the pressure on the primary side is reached, it is possible to grasp a change in the accumulation amount of the suspended components in the hollow fiber membrane module 10 and in the effective capacity of the same. Therefore, when a situation is grasped where the accumulation amount of the suspended components in the hollow fiber membrane module 10 is increased and the effective capacity of the raw water space S1 in the hollow fiber membrane module 10 is decreased, it is possible to appropriately estimate the situation where the deposition amount of the suspended components in the hollow fiber membrane 11 has increased, i.e., the situation where the membrane differential pressure will increase in the future.

[Estimation Based on Pressure Logging Data During Draining Step]

Next, estimation processing performed by the estimation unit 74 based on the pressure logging data stored in the storage unit 71 during the draining step will be detailed.

[Estimation of Time Required for Draining Step]

Figure 7:
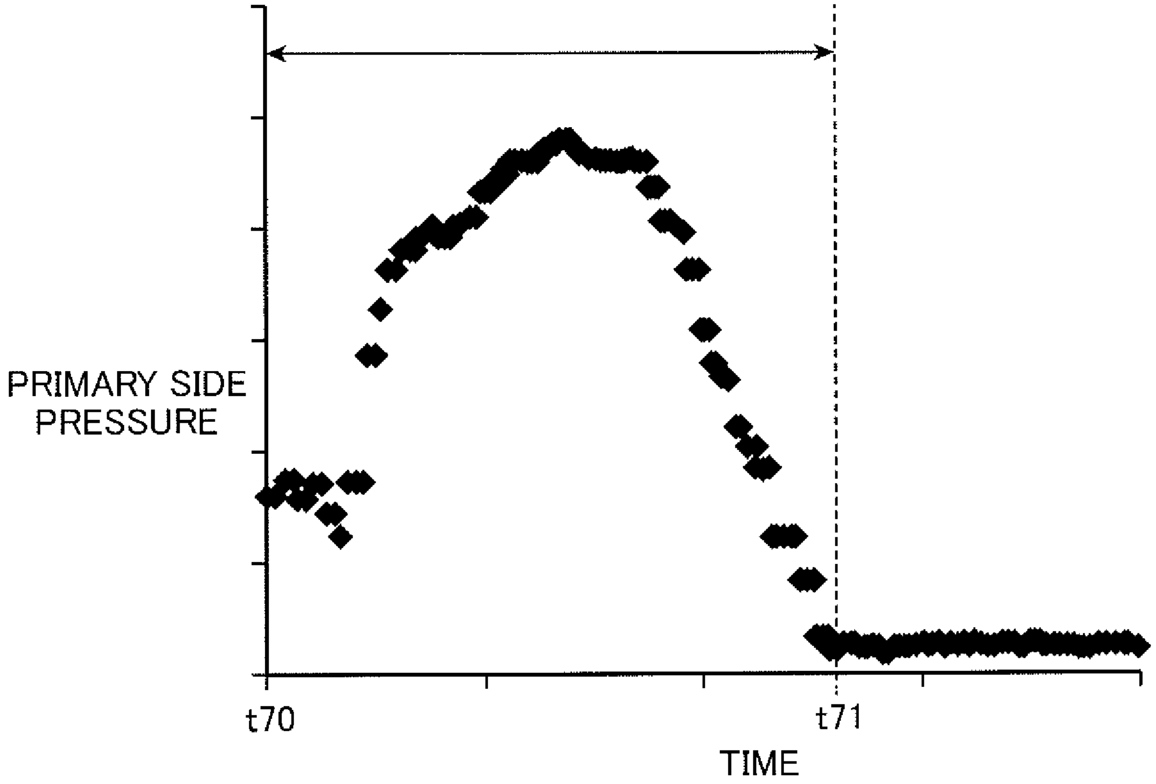
FIG. 7 is a diagram showing an example of pressure logging data at the time of a draining step.

FIG. 7 is a diagram showing an example of pressure logging data at the time of the draining step. In FIG. 7, a horizontal axis represents an elapsed time from a start of the draining step, and a vertical axis represents the pressure on the primary side measured by the primary side pressure sensor 61. For example, as shown in FIG. 7, in the draining step, when drain water in the raw water space S1 of the housing 12 is discharged by a pressure of air supplied via the second air valve 33, the pressure on the primary side gradually decreases. Thereafter, when the discharge of the drain water in the raw water space S1 ends (an elapsed time t71), the pressure on the primary side stabilizes at a predetermined drainage end pressure around 0 KPa indicating the end of the discharge of the drain water because of the open system. In the draining step, as described above, the drain water may be discharged by the pressure of air, or the drain water may be discharged using the hydraulic head pressure without supplying air.

As described above, when suspended components are accumulated on the surface of the hollow fiber membrane 11, the effective capacity of the raw water space S1 inside the hollow fiber membrane module 10 decreases. Therefore, the larger the amount of the suspended components accumulated on the surface of the hollow fiber membrane 11, the shorter a time required from the start of the draining step until the drainage of the drain water in the raw water space S1 ends and the pressure on the primary side stabilizes at the drainage end pressure.

Therefore, based on the pressure logging data stored in the storage unit 71 at the time of the draining step, the estimation unit 74 estimates a time required for the draining step from the time from the start of the draining step (a time point t70 in FIG. 7) until the pressure on the primary side stabilizes (the time point t71 in the same drawing).

Specifically, the estimation unit 74 performs the estimation processing shown in FIG. 4 at an end of the filtration process. In Step S41, the estimation unit 74 chronologically refers to the logging data of the pressure on the primary side stored in the storage unit 71 during the draining step of the filtration process. Then, the estimation unit 74 extracts, as the change information, a time from the start time point of the draining step ("0" in FIG. 7) to the time point at which the pressure on the primary side stabilizes (e.g., the time point t71 in the same drawing).

Here, in order to detect a time point at which the pressure on the primary side stabilizes, the estimation unit 74 executes the following. For example, with respect to each of referred logging data, the estimation unit 74 performs processing of subtracting, from the logging data, one-preceding logging data. Then, the estimation unit 74 detects a time point at which the result of the subtraction becomes smaller than the predetermined value a predetermined number of times in succession (e.g., the time point t71 in the same drawing) as a time point at which the pressure on the primary side has stabilized.

However, the method by which the estimation unit 74 detects a time point at which the pressure on the primary side stabilizes in Step S41 is not limited thereto. For example, the estimation unit 74 may chronologically calculate a ratio of a current pressure on the primary side to a pressure on the primary side measured immediately before. Then, as a time point at which the pressure on the primary side has stabilized, the estimation unit 74 may detect a time point at which the calculated ratio becomes equal to or less than the predetermined ratio a predetermined number of times in succession.

The estimation unit 74 extracts, as the change information, a time (e.g., t71) from the start time point ("0" in FIG. 7) of the draining step to the detected time point (e.g., the time point t71 in the same drawing).

In Step S42, the estimation unit 74 estimates the time (e.g., t71) extracted as the change information in Step S41 as the time required for the draining step. Then, in Step S43, the estimation unit 74 outputs information indicating the time required for the draining step estimated in Step S42 as information indicating a result of the estimation.

[Estimation of Amount of Suspended Components Accumulated on Surface of Hollow Fiber Membrane 11]

In the above, the description has been made of the execution of the estimation processing shown in FIG. 4 by the estimation unit 74 based on the pressure logging data stored in the storage unit 71 during the draining step. The present invention is not, however, limited thereto, and the estimation unit 74 may estimate an amount of suspended components accumulated on the surface of the hollow fiber membrane 11 by performing the estimation processing shown in FIG. 5 based on the pressure logging data stored in the storage unit 71 at a plurality of times of the draining step.

The present configuration can be realized, for example, as follows. The estimation unit 74 performs the estimation processing illustrated in FIG. 5 at the end of the filtration process. In Step S51, the estimation unit 74 refers to the pressure logging data stored in the storage unit 71 during the draining step of the past filtration process. The past filtration process is, for example, a filtration process that is first performed immediately after installation of the water treatment device 1 or after maintenance of the same. Then, the estimation unit 74 extracts a time required from the start of the draining step until the pressure on the primary side stabilizes (e.g., t71 in FIG. 7) as the first change information in a similar manner to Step S41 described above.

In Step S52, the estimation unit 74 refers to the pressure logging data stored in the storage unit 71 during the draining step in the current filtration process. Then, the estimation unit 74 extracts a time required from the start of the draining step until the pressure on the primary side stabilizes as the second change information in a similar manner to Step S51 described above.

In Step S53, the estimation unit 74 subtracts the time extracted as the first change information in Step S51 from the time extracted as the second change information in Step S52. The estimation unit 74 acquires the subtraction result as a difference between the first change information extracted in Step S51 and the second change information extracted in Step S52.

In Step S54, the estimation unit 74 estimates the amount of the suspended components accumulated on the surface of the hollow fiber membrane 11 based on the difference acquired in Step S53.

In other words, it is estimated that the smaller the difference calculated in Step S53, the larger state the amount of the suspended components accumulated on the surface of the hollow fiber membrane 11. Therefore, when the difference acquired in Step S53 is larger than a predetermined positive third threshold value, the estimation unit 74 estimates that the amount of the suspended components accumulated on the surface of the hollow fiber membrane 11 is very small state. When the difference acquired in Step S53 is a positive value and is equal to or smaller than the third threshold value, the estimation unit 74 estimates that the amount of the suspended components accumulated on the surface of the hollow fiber membrane 11 is small state. When the difference acquired in Step S53 is a negative value and is larger than a predetermined negative fourth threshold value, the estimation unit 74 estimates that the amount of the suspended components accumulated on the surface of the hollow fiber membrane 11 is large state. When the difference acquired in Step S53 is equal to or smaller than the fourth threshold value, the estimation unit 74 estimates that the amount of the suspended components accumulated on the surface of the hollow fiber membrane 11 is very large state.

In Step S55, the estimation unit 74 outputs, as the information indicating a result of the estimation, information indicating that the amount of the suspended components accumulated on the surface of the hollow fiber membrane 11 estimated in Step S54 is very large state, large state, small state, or very small state.

Thus, it is possible to grasp how much suspended component is accumulated on the surface of the hollow fiber membrane 11 without disassembling the hollow fiber membrane module 10. Therefore, when it is estimated that the amount of suspended components accumulated on the surface of the hollow fiber membrane 11 is large state, a filtration capacity of the hollow fiber membrane 11 can be restored at an early stage by rapidly enhancing physical washing of the hollow fiber membrane 11 or the like.

Note that in the above, the description has been made of the example in which the estimation unit 74 estimates an amount of the suspended components accumulated on the surface of the hollow fiber membrane 11 based on the logging data of the primary side pressure in the plurality of times of the draining step. The present invention is not, however, limited thereto. The estimation unit 74 may estimate an amount of the suspended components accumulated on the surface of the hollow fiber membrane 11 based on the logging data of the primary side pressure in one draining step.

The present configuration can be realized, for example, as follows. The estimation unit 74 performs the estimation processing shown in FIG. 4, and in Step S41, based on the logging data of the primary side pressure in one draining step, extracts the time from the start of the draining step until the pressure on the primary side stabilizes as the change information. Then, in Step S42, the estimation unit 74 subtracts, from the time extracted in Step S41 as the change information, the time from the start of the draining step until the pressure on the primary side stabilizes, which is determined in advance based on the experimental value or the like. Then, similarly to Step S53, the estimation unit 74 uses the result of the subtraction as a difference between the first change information and the second change information to estimate an amount of the suspended components accumulated on the surface of the hollow fiber membrane 11.

[Estimation of Future Increase in Membrane Differential Pressure (2)]

In the above, the description has been made of the example in which the estimation unit 74 estimates a time required for the draining step or an amount of the suspended components accumulated on the surface of the hollow fiber membrane 11. The present invention is not, however, limited thereto, and the estimation unit 74 may estimate a future increase in an membrane differential pressure of the hollow fiber membrane module 10.

For example, it is presumed that the larger an accumulation amount of the suspended components in the hollow fiber membrane module 10 and the smaller the effective capacity of the raw water space S1 in the hollow fiber membrane module 10, the larger a deposition amount of the suspended components in the hollow fiber membrane 11, i.e., it is presumed that the membrane differential pressure of the hollow fiber membrane module 10 will increase in the future. Therefore, the estimation unit 74 may refer to the pressure logging data (FIG. 7) stored in the storage unit 71 during the plurality of times of the draining step, and estimate a future increase in the membrane differential pressure of the hollow fiber membrane module 10 based on a difference, between the plurality of times of the draining step, in the time (t70 to t71 in FIG. 7) from the start of the draining step until the pressure on the primary side becomes constant.

The present configuration can be realized, for example, as follows. The estimation unit 74 performs the estimation processing illustrated in FIG. 5 at the end of the filtration process. In Step S51, the estimation unit 74 extracts a time from a start of a past draining step until the pressure on the primary side stabilizes as the first change information. In Step S52, the estimation unit 74 extracts a time from a start of a current draining step until the pressure on the primary side stabilizes as the second change information.

In Step S53, the estimation unit 74 subtracts the time extracted as the first change information from the time extracted as the second change information. When a result of the subtraction is a negative value, it is presumed that since the time of the draining step is shortened, the accumulation amount of the suspended components inside the hollow fiber membrane module increases, and the effective capacity of the raw water space S1 inside the hollow fiber membrane module 10 decreases. Accordingly, in this case, the estimation unit 74 estimates in Step S54 that the membrane differential pressure of the hollow fiber membrane module 10 will increase in the future. In Step S55, the estimation unit 74 outputs information indicating that the membrane differential pressure of the hollow fiber membrane module 10 will increase in the future.

On the other hand, when the result of the subtraction in Step S53 is a value of 0 or more, the estimation unit 74 estimates in Step S54 that the membrane differential pressure of the hollow fiber membrane module 10 does not tend to increase. In this case, in Step S55, the estimation unit 74 outputs information indicating that the membrane differential pressure of the hollow fiber membrane module 10 does not tend to increase in the future.

In the present configuration, in the draining step, the pressure on the primary side of the hollow fiber membrane module 10 when the drain water inside the hollow fiber membrane module is discharged is intermittently measured. Therefore, in the present configuration, a transition of the pressure on the primary side of the hollow fiber membrane module 10 according to the accumulation amount of the suspended components inside the hollow fiber membrane module 10 can be measured.

Moreover, in the present configuration, in each of the plurality of times of the draining step, the pressure on the primary side of the hollow fiber membrane module 10 is measured at an interval of three seconds or less shorter than the normal measurement interval of the membrane differential pressure in the filtration step. Therefore, a detailed temporal transition of the pressure on the primary side of the hollow fiber membrane module 10 in each draining step that ends within several minutes can be grasped.

Accordingly, from a difference in the detailed temporal transition between the plurality of times of the draining step, it is possible to grasp a change in the accumulation amount of the suspended components inside the hollow fiber membrane module 10 according to a change in the pressure on the primary side of the hollow fiber membrane module 10.

Specifically, by a difference, between the plurality of times of the draining step, in the time t70 to t71 (FIG. 7), the time being from the start time point t70 (FIG. 7) of the draining step to the time point t71 (FIG. 7) at which the pressure on the primary side becomes constant, it is possible to grasp a change in the accumulation amount of the suspended components in the hollow fiber membrane module 10 and a change in the effective capacity. Therefore, when a situation is grasped where the accumulation amount of the suspended components in the hollow fiber membrane module 10 is increased and the effective capacity of the raw water space S1 in the hollow fiber membrane module 10 is decreased, it is possible to appropriately estimate the situation where the deposition amount of the suspended components in the hollow fiber membrane 11 has increased, i.e., the situation where the membrane differential pressure will increase in the future.

[Estimation Based on Pressure Logging Data During Backwashing Step]

Next, estimation processing performed by the estimation unit 74 based on the pressure logging data stored in the storage unit 71 during the backwashing step will be detailed.

[Estimation of Time Required for Backwashing Step (1)]

Figure 8:
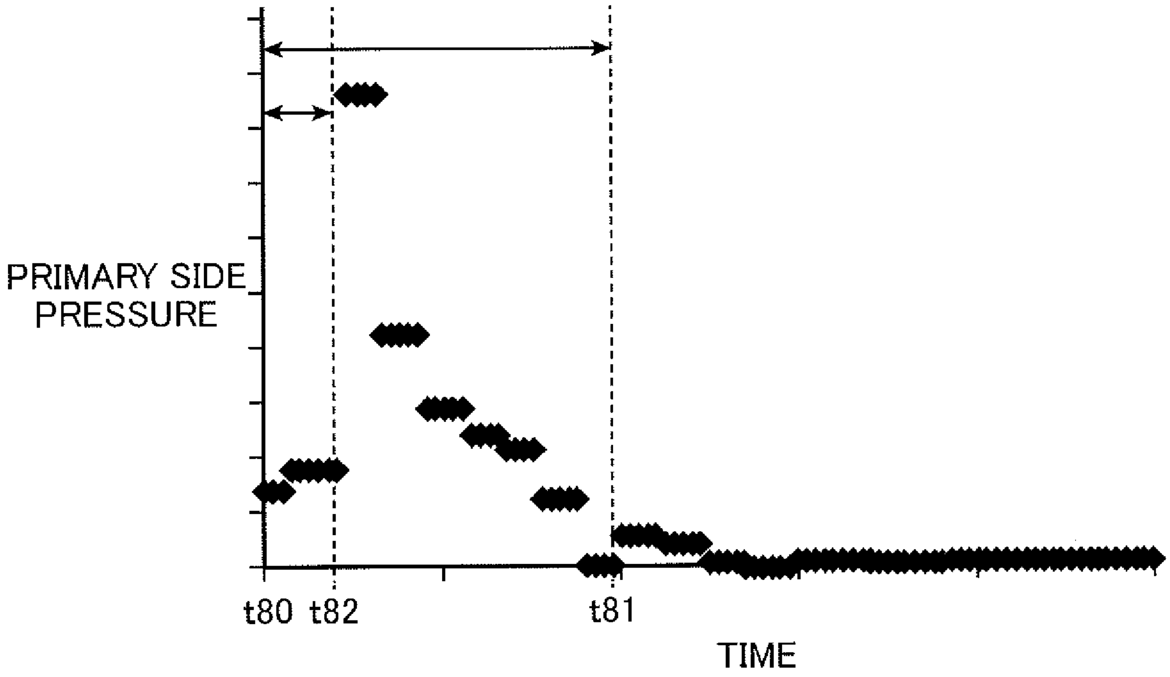
FIG. 8 is a diagram showing a first example of the pressure logging data on a primary side at the time of a backwashing step.

FIG. 8 is a diagram showing a first example of pressure logging data on a primary side at the time of the backwashing step. In FIG. 8, a horizontal axis represents time, and a vertical axis represents the pressure on the primary side of the hollow fiber membrane module 10. As shown in FIG. 8, the primary side pressure instantaneously increases after a start of the backwashing step to reach a maximum pressure, and then decreases to become constant. The instantaneous increase in the pressure on the primary side, as can be found from the fact that the pressure is rapidly reduced thereafter, is presumed to be caused by the fact that a large amount of pressurized treated water starts to permeate through the hollow fiber membrane 11. Then, the primary side pressure rapidly decreases as the raw water is discharged to the drain pipe 53, and then the primary side pressure gradually decreases. At this time, it is presumed that the primary side pressure gradually decreases due to the gradual decrease in the amount of water in the raw water space S1. Then, it is presumed that the pressure on the primary side becomes constant when all the treated water in the raw water space S1 has been discharged from the housing 12.

Therefore, the estimation unit 74 estimates a time required for the backwashing step based on the pressure logging data on the primary side stored in the storage unit 71.

Specifically, the estimation unit 74 performs the estimation processing shown in FIG. 4 at an end of the filtration process. In Step S41, the estimation unit 74 chronologically refers to the logging data of the pressure on the primary side stored in the storage unit 71 during the backwashing step of the filtration process. Then, the estimation unit 74 extracts, as the change information, a time from the start of the backwashing step (a time point t80 in FIG. 8) to a time when the pressure on the primary side becomes constant (a time point t81 in the same drawing).

Here, in order to detect a time point at which the pressure on the primary side becomes constant, the estimation unit 74 executes the following. For example, with respect to each of referred logging data, the estimation unit 74 performs processing of subtracting, from the logging data, one-preceding logging data. Then, the estimation unit 74 detects a time point (e.g., the time point t81 in FIG. 8) at which the result of the subtraction becomes smaller than the predetermined value the predetermined number of times in succession as a time point at which the pressure on the primary side has become constant.

However, the method by which the estimation unit 74 detects the time point at which the pressure on the primary side becomes constant in Step S41 is not limited thereto. For example, the estimation unit 74 may chronologically calculate a ratio of a current pressure on the primary side to a pressure on the primary side measured immediately before.

Then, as a time point at which the pressure on the primary side has become constant, the estimation unit 74 may detect a time point at which the calculated ratio becomes equal to or less than the predetermined ratio the predetermined number of times in succession.

The estimation unit 74 extracts, as the change information, a time (e.g., t81-t80) from the start time point (the time point t80 in FIG. 8) of the backwashing step to the detected time point (e.g., the time point t81 in the same drawing).

In Step S42, the estimation unit 74 estimates, as the time required for the backwashing step, the time (e.g., t81-t80) extracted as the change information in Step S41. In Step S43, the estimation unit 74 outputs information indicating the time required for the backwashing step estimated in Step S42 as information indicating a result of the estimation.

[Estimation of Time Required for Backwashing Step (2)]

In the backwashing step, also when the secondary side pressure sensor 62 measures the pressure on the secondary side of the hollow fiber membrane module 10 at intervals of three seconds or less, the pressure logging data similar to that in FIG. 6 is obtained. Therefore, the estimation unit 74 may perform the estimation processing shown in FIG. 4 at the end of the filtration process to estimate a time required for the backwashing step based on the logging data indicating the secondary side pressure.

The present configuration can be realized, for example, as follows. In Step S41, the estimation unit 74 detects a time point at which the pressure on the secondary side becomes constant in a manner similar to the above case of detecting a time point at which the pressure on the primary side becomes constant. Then, the estimation unit 74 extracts a time from the start time point of the backwashing step to the detected time point as the change information. In Step S42, the estimation unit 74 estimates the time extracted as the change information in Step S41 as the time required for the backwashing step.

[Estimation of Time Required for Backwashing Step (3)]

Figure 9:
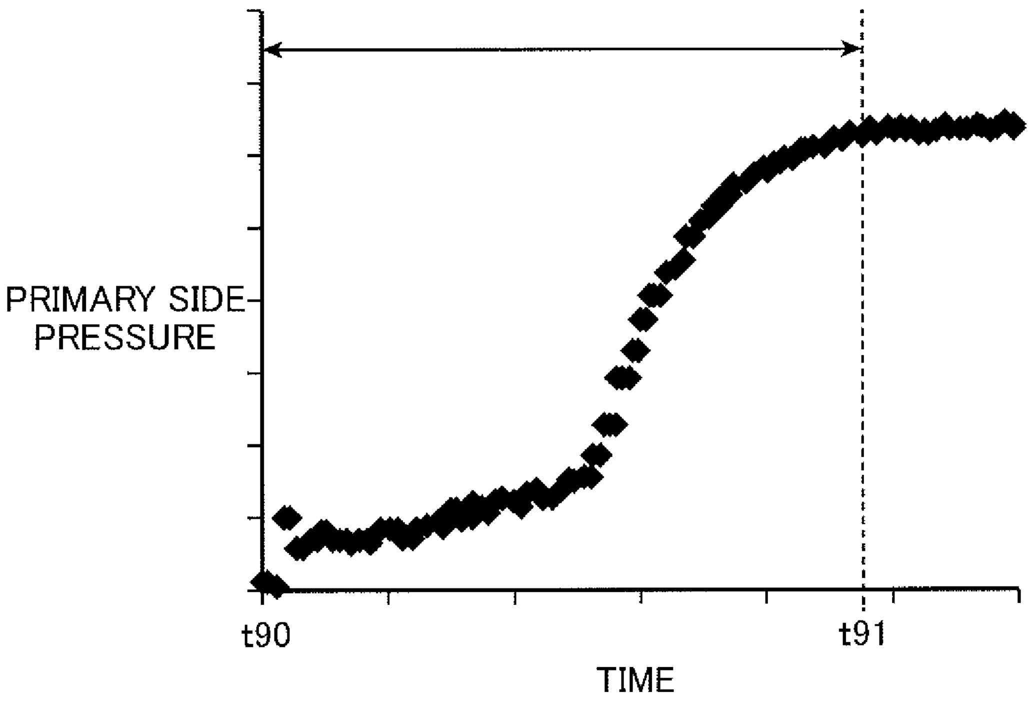
FIG. 9 is a diagram showing a second example of the pressure logging data on the primary side at the time of the backwashing step.

In the backwashing step, treated liquid on the secondary side may be pressurized using liquid instead of air. In this case, the primary side pressure of the hollow fiber membrane module 10 in the backwashing step changes over time as shown in FIG. 9. Specifically, the pressure on the primary side increases after the start of backwashing, and substantially becomes constant after a time point t91 at which time has elapsed from a start time point t90 of the backwashing step. Therefore, the estimation unit 74 may perform the estimation processing shown in FIG. 4 at the end of the filtration process, and in Step S41, may extract time from the start time point t90 of the backwashing step until the pressure on the primary side becomes constant (the time point t91 in the same drawing) as the change information. Then, in Step S42, the estimation unit 74 may estimate, as the change information in Step S41, the time extracted as the time required for the backwashing step.

[Estimation of Time Required for Backwashing Step (4)]

In the above, the description has been made of the example of estimating a time required for the backwashing step by the estimation unit 74 based on a time from the start of the backwashing step until the pressure on the primary side or the secondary side becomes constant. However, the estimation unit 74 may estimate a time required for the backwashing step based on a time from the start of the backwashing step until the pressure on the primary side reaches a maximum pressure.

The present configuration can be realized, for example, as follows. The estimation unit 74 performs the estimation processing illustrated in FIG. 4 at the end of the filtration process. In Step S41, the estimation unit 74 extracts a time from the start time point t80 (FIG. 8) of the backwashing step of the filtration process to a time point t82 (FIG. 8) at which the pressure on the primary side becomes the maximum pressure as the change information. In Step S42, the estimation unit 74 estimates, as the time required for the backwashing step, the time extracted as the change information in Step S41.

This estimation method can be suitably used in a case where the suspended components deposited on the membrane surface are, for example, based on inorganic components and having good peelability. Specifically, in a case of a suspended component having good peelability, since the suspended components peel off from the membrane surface at the same time as backwashing water starts to permeate through the hollow fiber membrane 11, it can be presumed that the backwashing is actually ended when the primary side pressure reaches the time point t82 at which the primary side pressure shows a maximum value.

[Estimation of Time Required for Backwashing Step (5)]

Figure 10:
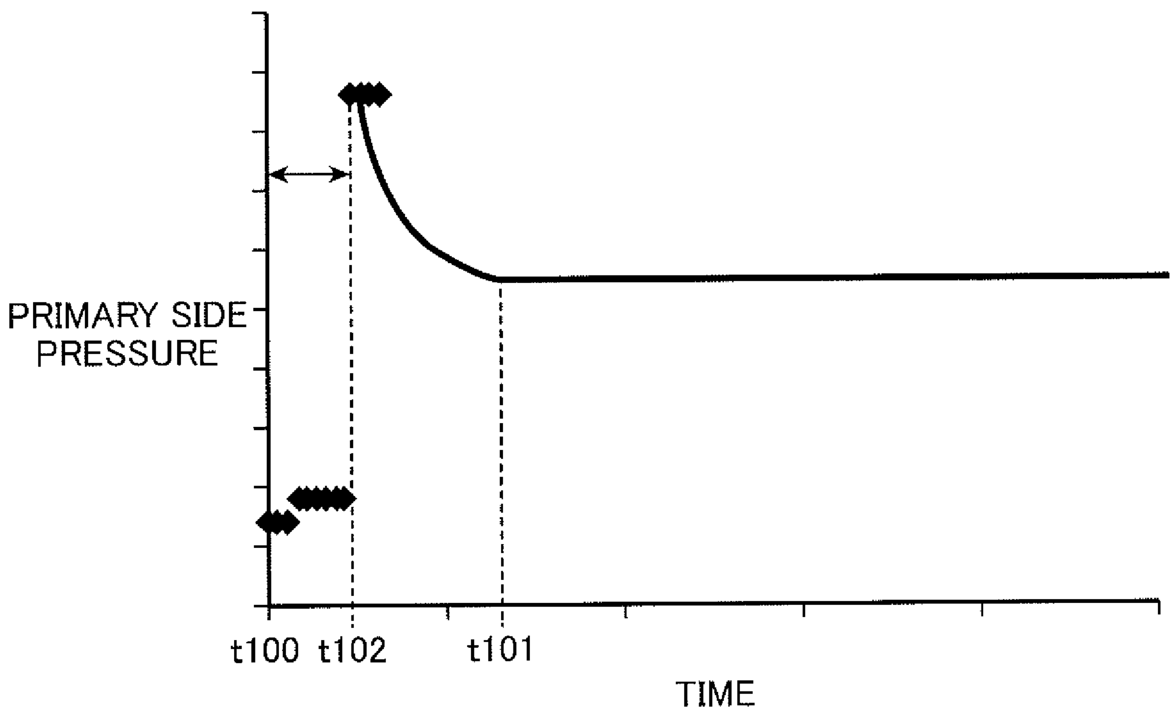
FIG. 10 is a diagram showing a third example of the pressure logging data on the primary side at the time of the backwashing step.

In addition, also in a case where the treated liquid on the secondary side is pressurized using liquid instead of air, a step time can be estimated in the same manner as described above. FIG. 10 is a graph showing a temporal transition of the pressure on the primary side when the treated water is circulated in advance by a pump before the backwashing is started, and the secondary side of the hollow fiber membranes 11 is pressurized at once at the same time as the start of the backwashing step. In FIG. 10, a horizontal axis represents time, and a vertical axis represents the pressure on the primary side of the hollow fiber membrane module 10. As shown in FIG. 10, also in this case, the primary side pressure instantaneously increases to the maximum pressure after a lapse of a predetermined time after the start of the backwashing (time point t102). Then, thereafter, the primary side pressure gradually decreases and becomes constant at a constant pressure (time point t101).

Therefore, the estimation unit 74 may perform the estimation processing shown in FIG. 4 at the end of the filtration process, and in Step S41, may extract, as the change information, a time from the start time point t100 (FIG. 10) of the backwashing step of the filtration process until the time point t102 (FIG. 10) at which the pressure on the primary side reaches the maximum pressure. In Step S42, the estimation unit 74 may estimate the time extracted as the change information in Step S41 as the time required for the backwashing step.

[Estimation of Blockage Degree of Hollow Fiber Membrane 11 (1)]

In the above, the description has been made of the example in which the estimation unit 74 estimates a time required for the backwashing step. The present invention is not, however, limited thereto, and the estimation unit 74 may estimate a blockage degree of the hollow fiber membrane 11.

Figure 11:
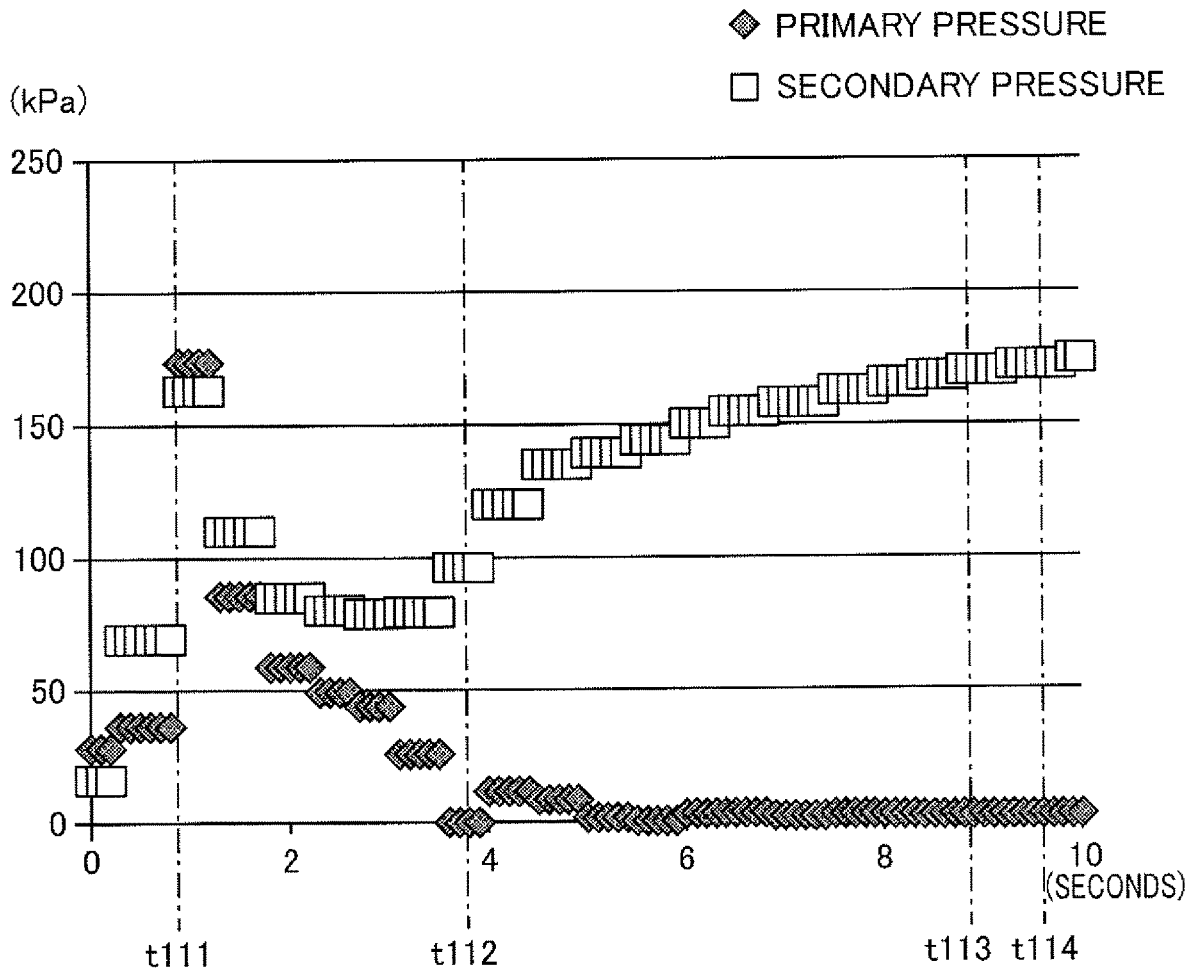
FIG. 11 is a diagram showing an example of the pressure logging data at the time of the backwashing step.

FIG. 11 is a diagram showing an example of pressure logging data at the time of the backwashing step. In FIG. 11, a horizontal axis represents an elapsed time (seconds) from the start of the backwashing step, and a vertical axis represents a pressure on the primary side (primary pressure) (KPa) and a pressure on the secondary side (secondary pressure).

As shown in FIG. 11, the pressure on the primary side instantaneously increases immediately after the start of the backwashing step (elapsed time till), and then the treated water on the secondary side is pushed out to the primary side at a constant pressure. At this time, the larger the blockage degree of the hollow fiber membrane 11, the slower a speed at which the treated water is pushed out to the primary side and the longer a time required to finish the pushing out of the treated water on the secondary side. In other words, the time becomes long from the start point (elapsed time 0) of the backwashing step until the pressure on the primary side stabilizes at a predetermined pressure (hereinafter, referred to as end pressure) around 0 KPa indicating the end of the pushing out of the treated water on the secondary side (elapsed time t112).

Therefore, the estimation unit 74 may estimate the blockage degree of the hollow fiber membrane 11 based on the time from the start of the backwashing step until the pressure on the primary side stabilizes at the end pressure.

The present configuration can be realized, for example, as follows. The estimation unit 74 performs the estimation processing illustrated in FIG. 5 at the end of the filtration process. In Step S51, the estimation unit 74 chronologically refers to the logging data of the pressure on the primary side stored in the storage unit 71 during the backwashing step of the past filtration process. The past filtration process is, for example, a filtration process that is first performed immediately after installation of the water treatment device 1 or after maintenance of the same. Then, the estimation unit 74 extracts the time from the start of the backwashing step until the pressure on the primary side stabilizes at the end pressure as the first change information.

Here, in order to detect a time point at which the pressure on the primary side stabilizes at the end pressure, the estimation unit 74 executes the following. For example, with respect to each pressure on the primary side indicated by each logging data referred to, the estimation unit 74 calculates a difference between each pressure on the primary side and the end pressure. Then, the estimation unit 74 detects a time point at which the difference becomes smaller than a predetermined value a predetermined number of times in succession as a time point at which the pressure on the primary side has stabilized at the end pressure.

Note that the method by which the estimation unit 74 detects a time point at which the pressure on the primary side stabilizes at the end pressure in Step S51 is not limited thereto. For example, the estimation unit 74 may chronologically calculate a ratio of the end pressure to the pressure on the primary side. Then, as a time point at which the pressure on the primary side has stabilized at the end pressure, the estimation unit 74 may detect a time point at which the calculated ratio becomes equal to or less than the predetermined ratio the predetermined number of times in succession.

The estimation unit 74 extracts a time from the start time point of the backwashing step in the past filtration process to the detected time point as the first change information.

In Step S52, the estimation unit 74 refers to the logging data of the pressure on the primary side stored in the storage unit 71 during the backwashing step of the current filtration process. Then, similarly to Step S51, the estimation unit 74 extracts a time from the start of the backwashing step until the pressure on the primary side stabilizes at the end pressure as the second change information.

In Step S53, the estimation unit 74 subtracts the time extracted as the first change information in Step S51 from the time extracted as the second change information in Step S52. The estimation unit 74 acquires the subtraction result as a difference between the first change information extracted in Step S51 and the second change information extracted in Step S52.

In Step S54, the estimation unit 74 estimates a blockage degree of the hollow fiber membrane 11 based on the difference acquired in Step S53. Specifically, it is presumed that the larger the difference acquired in Step S53, the larger state the blockage degree of the hollow fiber membrane 11.

Therefore, when the difference acquired in Step S53 is larger than a predetermined positive fifth threshold value, the estimation unit 74 estimates that the blockage degree of the hollow fiber membrane 11 is very large state. When the difference acquired in Step S53 is a positive value and is equal to or smaller than the fifth threshold value, the estimation unit 74 estimates that the blockage degree of the hollow fiber membrane 11 is large state. When the difference acquired in Step S53 is a negative value and larger than a predetermined negative sixth threshold value, the estimation unit 74 estimates that the blockage degree of the hollow fiber membrane 11 is small state. When the difference acquired in Step S53 is equal to or smaller than the sixth threshold value, the estimation unit 74 estimates that the blockage degree of the hollow fiber membrane 11 is extremely small state.

In Step S55, the estimation unit 74 outputs, as the information indicating a result of the estimation, information indicating that the blockage degree of the hollow fiber membrane 11 estimated in Step S54 is very large state, large state, small state, or very small state.

In this case, the blockage degree of the hollow fiber membranes 11 can be grasped without disassembling the hollow fiber membrane module 10. Therefore, when it is estimated that the blockage degree of the hollow fiber membrane 11 is large state, the time required for the backwashing step can be shortened at an early stage by chemical washing or replacing the hollow fiber membranes 11 with a chemical solution, thereby restoring the filtration capacity of the hollow fiber membrane 11.

Specifically, the chemical washing means that the hollow fiber membrane module 10 is cleaned with a chemical solution by immersing or circulating, in the hollow fiber membrane module 10, a chemical solution such as acids such as sulfuric acid, hydrochloric acid, nitric acid, oxalic acid, and citric acid, alkalis such as caustic soda, sodium hydrogen carbonate, and sodium carbonate, oxidants such as hypochlorous acid, ozone, chloramine, and peracetic acid, and a chemical solution such as organic drugs, chelating agents, enzyme agents, and surfactants, or the like by operation of the control device 70 by a user and/or automatic operation by the control unit 72. These chemical solutions may be used singly, or two or more thereof may be used one by one in order, or may be used in combination.

[Estimation of Blockage Degree of Hollow Fiber Membrane 11 (2)]

Note that in the above, the description has been made of the example in which the estimation unit 74 estimates a blockage degree of the hollow fiber membrane 11 based on the logging data of the primary side pressure in the plurality of times of the backwashing step. The present invention is, however, not limited thereto, and the estimation unit 74 may estimate a blockage degree of the hollow fiber membrane 11 based on the logging data of the primary side pressure in one backwashing step.

The present configuration can be realized, for example, as follows. The estimation unit 74 performs the estimation processing shown in FIG. 4, and in Step S41, based on the logging data of the primary side pressure in one backwashing step, extracts the time from the start of the backwashing step until the pressure on the primary side stabilizes at the end pressure as the change information. Then, in Step S42, the estimation unit 74 subtracts, from the time extracted in Step S41 as the change information, the time from the start of the backwashing step until the pressure on the primary side stabilizes at the end pressure, which is determined in advance based on the experimental value or the like. Then, similarly to Step S53 described in the above [Estimation of Blockage Degree of Hollow Fiber Membrane 11 (1)], the estimation unit 74 uses a result of the subtraction as a difference between the first change information and the second change information to estimate a blockage degree of the hollow fiber membrane 11.

[Estimation of Effect of Physical Washing or Future Increase in Membrane Differential Pressure (1)]

Also in the above, the description has been made of the example in which the estimation unit 74 estimates a blockage degree of the hollow fiber membrane 11. The present invention is not, however, limited thereto, and the estimation unit 74 may estimate an effect of the physical washing or a future increase in an membrane differential pressure of the hollow fiber membrane module 10.

For example, in each of the plurality of times of the backwashing step, the primary side pressure sensor 61 repeatedly measures a pressure on the primary side of the hollow fiber membrane module 10 at intervals of three seconds or less. As a result, pressure logging data (FIG. 12) is obtained which shows a temporal change in the primary side pressure of the hollow fiber membrane module 10 in each of the plurality of times of the backwashing step.

Note that as described above, when the pressure on the primary side of the hollow fiber membrane module 10 is repeatedly measured at intervals of three seconds or less by the air vent pressure sensor, the estimation unit 74 may use data indicating an average value of the pressure on the primary side indicated by the logging data received from each of the primary side pressure sensor 61 and the air vent pressure sensor as pressure logging data indicating the pressure on the primary side of the hollow fiber membrane module 10.

Figure 12:
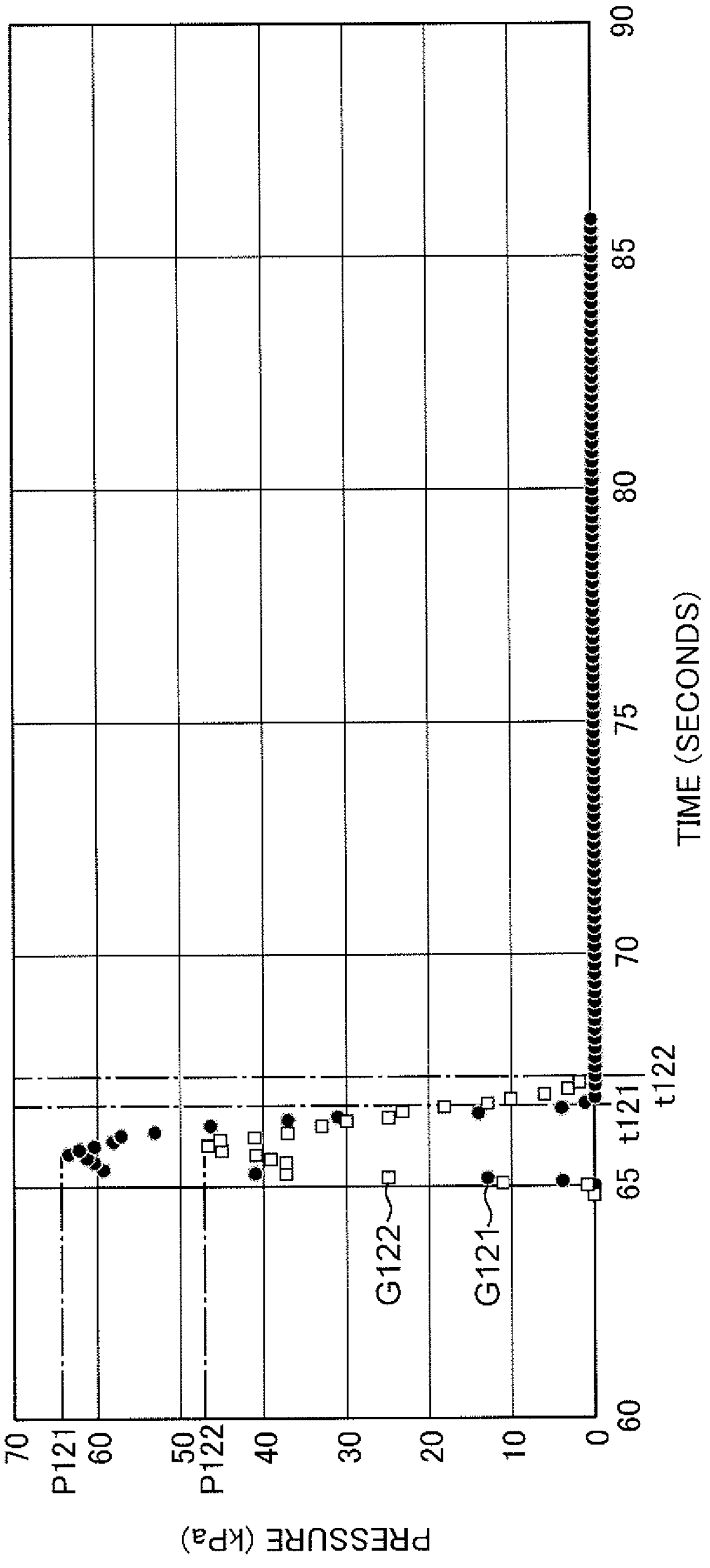
FIG. 12 is a diagram showing a fourth example of the pressure logging data on the primary side at the time of the backwashing step.

In FIG. 12, a horizontal axis represents time, and a vertical axis represents the pressure on the primary side of the hollow fiber membrane module 10. A plot group G121 in FIG. 12 shows a temporal change in the pressure on the primary side of the hollow fiber membrane module 10 during the backwashing step immediately before the most recent backwashing step. A plot group G122 in FIG. 12 shows a temporal change in the pressure on the primary side of the hollow fiber membrane module 10 during the most recent backwashing step.

As shown in FIG. 12, in a situation where the backwashing step is started, and after the pressure on the primary side instantaneously increases immediately after the treated water on the secondary side is pushed out to the primary side, as clogging of the hollow fiber membrane 11 progresses and permeation resistance of the hollow fiber membrane 11 is increased, the speed at which the treated water is pushed out to the primary side becomes slower, and a time required to finish the pushing out of the treated water on the secondary side becomes longer.

Therefore, the estimation unit 74 may refer to the pressure logging data stored in the storage unit 71 in each of the plurality of times of the backwashing step, and estimate an effect of the physical washing or a future increase in the membrane differential pressure of the hollow fiber membrane module 10 based on a difference, between the plurality of times of the backwashing step, in a time from the start of the backwashing step until the pressure on the primary side stabilizes at the end pressure.

The present configuration can be realized, for example, as follows. The estimation unit 74 performs the estimation processing illustrated in FIG. 5 at the end of the filtration process. In Step S51, the estimation unit 74 refers to the logging data of the pressure on the primary side stored in the storage unit 71 during the backwashing step in the past filtration process. The past filtration process may be, for example, the last filtration process or a filtration process that is first performed immediately after installation of the water treatment device 1 or after maintenance of the same. Then, similarly to the above, the estimation unit 74 extracts a time (e.g., t121 in FIG. 12) from the start of the backwashing step until the pressure on the primary side stabilizes at the end pressure as the first change information.

In Step S52, the estimation unit 74 refers to the logging data of the pressure on the primary side stored in the storage unit 71 during the backwashing step of the current filtration process. Then, similarly to Step S51, the estimation unit 74 extracts a time (e.g., t122 in FIG. 12) from the start of the backwashing step until the pressure on the primary side stabilizes at the end pressure as the second change information.

In Step S53, the estimation unit 74 subtracts the time (e.g., t121) extracted as the first change information in Step S51 from the time (e.g., t122) extracted as the second change information in Step S52. The estimation unit 74 acquires the subtraction result (e.g., t122–t121) as a difference between the first change information extracted in Step S51 and the second change information extracted in Step S52.

In Step S54, the estimation unit 74 estimates an effect of the physical washing or a future increase in the membrane differential pressure of the hollow fiber membrane module 10 based on the difference acquired in Step S53. Specifically, when the difference acquired in Step S53 is a positive value, it is presumed that clogging of the hollow fiber membrane 11 has progressed and the permeation resistance of the hollow fiber membrane 11 has increased. Accordingly, in this case, the estimation unit 74 estimates that the effect of the physical washing is insufficient or the membrane differential pressure will increase in the future. On the other hand, when the difference acquired in Step S53 is a negative value, it is presumed that the clogging of the hollow fiber membranes 11 has been eliminated and the permeation resistance of the hollow fiber membrane 11 has decreased. Accordingly, in this case, the estimation unit 74 estimates that the effect of the physical washing is sufficient or the membrane differential pressure does not tend to increase.

In Step S55, the estimation unit 74 outputs, as the information indicating a result of the estimation, information indicating whether the effect of the physical washing is insufficient or sufficient, the information indicating that the membrane differential pressure will increase in the future, or the information indicating that the membrane differential pressure does not tend to increase, all the information being estimated in Step S54.

In the example of FIG. 12, the time t122 from a start point of the most recent backwashing step until the pressure on the primary side stabilizes at the end pressure is longer than the time t121 from a start point of the backwashing step immediately before the most recent backwashing step until the pressure on the primary side stabilizes at the end pressure. Therefore, the estimation unit 74 estimates that the effect of the physical washing is insufficient or the membrane differential pressure will increase in the future.

In the above, the description has been made of the example of the estimation performed by the estimation unit 74 based on a time from the start of the backwashing step until the pressure on the primary side stabilizes at the end pressure. The present invention is not, however, limited thereto, and the estimation unit 74 may perform various kinds of estimations based on a pressure (peak) at a reaching point of the pressure on the primary side that has instantaneously increased immediately after the start of the backwashing step.

[Estimation of Magnitude of Pipeline Resistance]

For example, as shown in FIG. 11, immediately after the start of the backwashing step, when a part of the raw water on the primary side of the raw water space S1 is discharged from the drain port 12D to the outside of the system, because the drain port 12D has an inner diameter smaller than the inner diameter of the housing 12, pipeline resistance is generated. Due to this pipeline resistance, the pressure on the primary side measured by the primary side pressure sensor 61 instantaneously increases (the elapsed time t111). In addition, the more serious the contamination in the drain pipe 53 connected to the drain port 12D, the higher the pipeline resistance when the drain water on the primary side is drained, so that the pressure on the primary side increases.

Therefore, the estimation unit 74 may estimate a magnitude of the pipeline resistance of the drain pipe 53 (FIG. 1) based on the peak of the pressure on the primary side that has instantaneously increased immediately after the start of the backwashing step.

The present configuration can be realized, for example, as follows. The estimation unit 74 performs the estimation processing illustrated in FIG. 5 at the end of the filtration process. In Step S51, the estimation unit 74 refers to the logging data of the pressure on the primary side stored in the storage unit 71 during the backwashing step in the past filtration process. The past filtration process is, for example, a filtration process that is first performed immediately after installation of the water treatment device 1 or after maintenance of the same. Then, the estimation unit 74 extracts a peak value (e.g., P121 in FIG. 12) of the pressure on the primary side, which has instantaneously increased immediately after the start of the backwashing step, as the first change information.

In Step S52, the estimation unit 74 refers to the logging data of the pressure on the primary side stored in the storage unit 71 during the backwashing step of the current filtration process. Then, the estimation unit 74 extracts a peak value (e.g., P122 in FIG. 12) of the pressure on the primary side that has instantaneously increased immediately after the start of the backwashing step as the second change information in the same manner as in Step S51.

In Step S53, the estimation unit 74 subtracts the peak value (e.g., P121) of the pressure on the primary side extracted as the first change information in Step S51 from the peak value (e.g., P122) of the pressure on the primary side extracted as the second change information in Step S52. The estimation unit 74 acquires the subtraction result (e.g., P122-P121) as a difference between the first change information extracted in Step S51 and the second change information extracted in Step S52.

In Step S54, the estimation unit 74 estimates a magnitude of the pipeline resistance of the drain pipe 53 (FIG. 1) based on the difference acquired in Step S53. Specifically, it is presumed that the larger the difference acquired in Step S53, the more serious the contamination in the drain pipe 53 and the higher the pipeline resistance of the drain pipe 53 when the drain water on the primary side is drained.

Therefore, when the difference acquired in Step S53 is larger than a predetermined positive seventh threshold value, the estimation unit 74 estimates that the pipeline resistance of the drain pipe 53 is very high state. When the difference acquired in Step S53 is a positive value and is equal to or smaller than the seventh threshold value, the estimation unit 74 estimates that the pipeline resistance of the drain pipe 53 is high state. When the difference acquired in Step S53 is a negative value and is larger than a predetermined negative eighth threshold value, the estimation unit 74 estimates that the pipeline resistance of the drain pipe 53 is low state. When the difference acquired in Step S53 is equal to or smaller than the eighth threshold value, the estimation unit 74 estimates that the pipeline resistance of the drain pipe 53 is extremely low state.

In Step S55, the estimation unit 74 outputs, as the information indicating a result of the estimation, information indicating that the pipeline resistance of the drain pipe 53 is very high state, high state, low state, or very low state, the information being estimated in Step S54.

In this case, how much the drain pipe 53 is contaminated can be grasped by grasping how high the pipeline resistance of the drain pipe 53 (FIG. 1) as a primary side drain pipeline is without disassembling the hollow fiber membrane module 10. Therefore, when it is estimated that the pipeline resistance of the drain pipe 53 is high state, the drain pipe 53 can be quickly washed to suppress accumulation of the drain water inside the hollow fiber membrane module 10 during the backwashing step. As a result, the washing capability of the hollow fiber membrane 11 by the backwashing step can be quickly restored.

Note that in the above, the description has been made of the example in which the estimation unit 74 estimates a magnitude of the pipeline resistance of the drain pipe 53 based on the logging data of the primary side pressure in the plurality of times of the backwashing step. The present invention is not, however, limited thereto, and the estimation unit 74 may estimate a magnitude of the pipeline resistance of the drain pipe 53 based on the logging data of the primary side pressure in one backwashing step.

The present configuration can be realized, for example, as follows. The estimation unit 74 performs the estimation processing shown in FIG. 4, and in Step S41, based on the logging data of the primary side pressure in one backwashing step, extracts the peak value of the pressure on the primary side that has instantaneously increased immediately after the start of the backwashing step as the change information. Then, in Step S42, the estimation unit 74 subtracts, from the peak value extracted in Step S41 as the change information, the peak value of the pressure on the primary side that has instantaneously increased immediately after the start of the backwashing step, the peak value being determined in advance based on the experimental value or the like. Similarly to Step S53, the estimation unit 74 uses the result of the subtraction as a difference between the first change information and the second change information to estimate a magnitude of the pipeline resistance of the drain pipe 53.

[Estimation of Effect of Physical Washing or Future Increase in Membrane Differential Pressure (2)]

Also in the above, the description has been made of the example in which the estimation unit 74 estimates a magnitude of the pipeline resistance of the drain pipe 53. The present invention is not, however, limited thereto, and the estimation unit 74 may estimate an effect of the physical washing or a future increase in an membrane differential pressure of the hollow fiber membrane module 10.

As shown in FIG. 12, immediately after the backwashing step is started and the treated water on the secondary side is pushed out to the primary side, since the inner diameter of the drain pipe 53 is smaller than the inner diameter of the housing 12, the pressure on the primary side instantaneously increases due to pipeline resistance generated when the raw water on the primary side flows into the drain pipe 53. At this time, the speed at which the treated water on the secondary side is pushed out to the primary side increases and the peak of the pressure on the primary side increases as clogging of the hollow fiber membranes 11 decreases and the permeation resistance of the hollow fiber membranes 11 decreases.

Therefore, the estimation unit 74 may refer to the pressure logging data stored in the storage unit 71 in each of the plurality of times of the backwashing step, and estimate an effect of the physical washing or a future increase in the membrane differential pressure of the hollow fiber membrane module 10 based on a difference, between the plurality of times of the backwashing step, in the peak of the pressure on the primary side that has instantaneously increases immediately after the start of the backwashing step.

The present configuration can be realized, for example, as follows. The estimation unit 74 performs the estimation processing illustrated in FIG. 5 at the end of the filtration process. In Step S51, the estimation unit 74 refers to the logging data of the pressure on the primary side stored in the storage unit 71 during the backwashing step in the past filtration process. The past filtration process may be, for example, the last filtration process or a filtration process that is first performed immediately after installation of the water treatment device 1 or after maintenance of the same. Then, the estimation unit 74 extracts a peak value (e.g., P121 in FIG. 12) of the pressure on the primary side, which is immediately after the start of the backwashing step in the past filtration process, as the first change information.

In Step S52, the estimation unit 74 refers to the pressure logging data stored in the storage unit 71 during the backwashing step in the current filtration process. Then, the estimation unit 74 extracts the peak value (e.g., P122 in FIG. 12) of the pressure on the primary side immediately after the start of the backwashing step as the second change information in the same manner as in Step S51.

In Step S53, the estimation unit 74 subtracts the peak value (e.g., P121 in FIG. 12) of the pressure on the primary side extracted as the first change information in Step S51 from the peak value (e.g., P122 in FIG. 12) of the pressure on the primary side extracted as the second change information in Step S52. The estimation unit 74 acquires the subtraction result (e.g., P122-P121) as a difference between the first change information extracted in Step S51 and the second change information extracted in Step S52.

In Step S54, the estimation unit 74 estimates an effect of the physical washing or a future increase in the membrane differential pressure of the hollow fiber membrane module 10 based on the difference acquired in Step S53. Specifically, when the difference acquired in Step S53 is a negative value, it is presumed that the clogging of the hollow fiber membrane 11 has progressed and the permeation resistance of the hollow fiber membrane 11 has increased. Accordingly, in this case, the estimation unit 74 estimates that the effect of the physical washing is insufficient or the membrane differential pressure will increase in the future. On the other hand, when the difference acquired in step S53 is a positive value, it is presumed that the clogging of hollow fiber membrane 11 is eliminated and the permeation resistance of the hollow fiber membrane 11 is reduced. Accordingly, in this case, the estimation unit 74 estimates that the effect of the physical washing is sufficient or the membrane differential pressure does not tend to increase.

In Step S55, the estimation unit 74 outputs, as the information indicating a result of the estimation, information indicating whether the effect of the physical washing is insufficient or sufficient, the information indicating that the membrane differential pressure will increase in the future, or the information indicating that the membrane differential pressure does not tend to increase, all the information being estimated in Step S54.

In the example of FIG. 12, the peak value P122 of the pressure on the primary side immediately after the start of the most recent backwashing step is smaller than the peak value P121 of the pressure on the primary side immediately after the start of the backwashing step immediately before the most recent backwashing step. Therefore, the estimation unit 74 estimates that the effect of the physical washing is insufficient or the membrane differential pressure will increase in the future.

[Estimation Based on Pressure Logging Data on Secondary Side During Backwashing Step]

In the above, the description has been made of the example in which the estimation unit 74 performs various estimations based on the pressure logging data on the primary side stored in the storage unit 71 during the backwashing step. The present invention is not, however, limited thereto, and the estimation unit 74 may perform various estimations based on the pressure logging data on the secondary side stored in the storage unit 71 during the backwashing step.

[Estimation of Effect of Physical Washing or Future Increase in Membrane Differential Pressure (3)]

Figure 13:
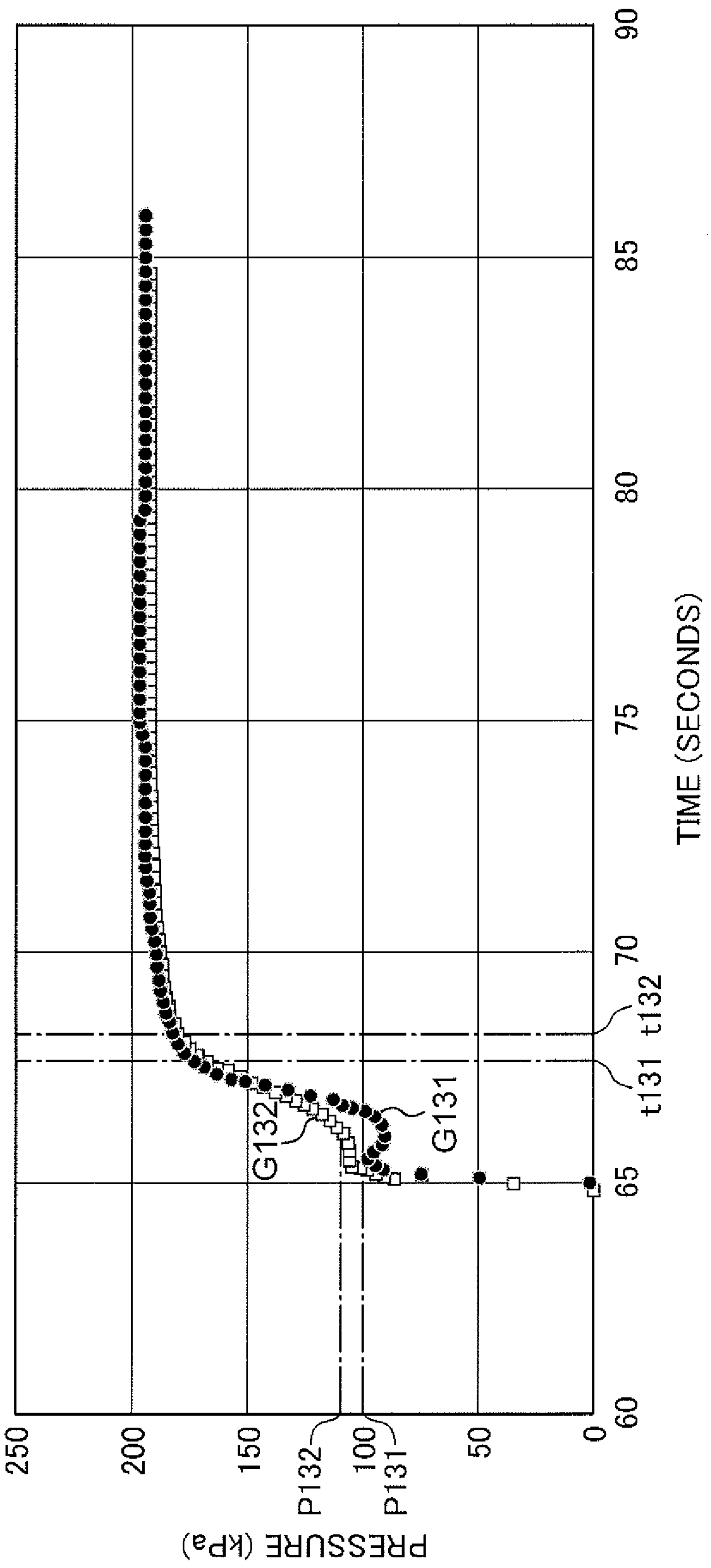
FIG. 13 is a diagram showing a first example of pressure logging data on a secondary side at the time of the backwashing step.

For example, in each of the plurality of times of the backwashing step, the secondary side pressure sensor 62 repeatedly measures a pressure on the secondary side of the hollow fiber membrane module 10 at intervals of three seconds or less. As a result, pressure logging data (FIG. 13) showing a temporal change in the secondary side pressure of the hollow fiber membrane module 10 in each of the plurality of times of the backwashing step is obtained. In FIG. 13, a horizontal axis represents time, and a vertical axis represents the pressure on the secondary side of the hollow fiber membrane module 10. A plot group G131 in FIG. 13 shows a temporal change in the pressure on the secondary side of the hollow fiber membrane module 10 during the backwashing step immediately before the most recent backwashing step. A plot group G132 in FIG. 13 shows a temporal change in the pressure on the secondary side of the hollow fiber membrane module 10 during the most recent backwashing step.

As shown in FIG. 13, in the backwashing step, when the pushing of the treated water on the secondary side out to the primary side is completed, the secondary side becomes filled state with pressurized air, and the pressure on the secondary side stabilizes at a pressure of air (an example of a medium) (hereinafter, referred to as air pressure). Here, as the clogging of the hollow fiber membranes 11 progresses and the permeation resistance of the hollow fiber membranes 11 increases, the time required for all the treated water on the secondary side to be pushed out to the primary side increases. Therefore, the time from the start of the backwashing step until the pressure on the secondary side stabilizes at the air pressure becomes longer as the clogging of the hollow fiber membranes 11 progresses and the permeation resistance of the hollow fiber membranes 11 increases.

Note that stabilization of a pressure represents, for example, that an increasing pressure reaches an inflection point at which a slope of the increase of the pressure is reduced, that a decreasing pressure reaches an inflection point at which a slope of the decrease of the pressure is increased, or that an increasing or decreasing pressure becomes fluctuating state within a predetermined allowable range continuously for a predetermined time or more.

Therefore, the estimation unit 74 may refer to the secondary side pressure logging data stored in the storage unit 71 in each of the plurality of times of the backwashing step, and estimate an effect of the physical washing or a future increase in the membrane differential pressure of the hollow fiber membrane module 10 based on a difference, between the plurality of times of the backwashing step, in a time from the start of the backwashing step until the pressure on the secondary side stabilizes at the air pressure.

The present configuration can be realized, for example, as follows. The estimation unit 74 performs the estimation processing illustrated in FIG. 5 at the end of the filtration process. In Step S51, the estimation unit 74 refers to the pressure logging data on the secondary side stored in the storage unit 71 during the backwashing step in the past filtration process. The past filtration process may be, for example, the last filtration process or a filtration process that is first performed immediately after installation of the water treatment device 1 or after maintenance of the same. Then, the estimation unit 74 extracts a time (e.g., t131 in FIG. 13) from the start of the backwashing step in the past filtration process until the pressure on the secondary side stabilizes at the air pressure as the first change information.

Here, in order to detect a time point at which the pressure on the secondary side stabilizes at the air pressure, the estimation unit 74 executes the following. For example, with respect to each pressure on the secondary side indicated by each logging data referred to, the estimation unit 74 calculates a difference between each pressure on the secondary side and the air pressure. Then, the estimation unit 74 detects a time point at which the difference becomes smaller than the predetermined value the predetermined number of times in succession as a time point at which the pressure on the secondary side stabilizes at the air pressure.

However, the method by which the estimation unit 74 detects a time point at which the pressure on the secondary side stabilizes at the air pressure in Step S51 is not limited thereto. For example, the estimation unit 74 may chronologically calculate a ratio of the air pressure to the pressure on the secondary side. Then, as a time point at which the pressure on the secondary side has stabilized at the air pressure, the estimation unit 74 may detect a time point at which the calculated ratio becomes equal to or less than the predetermined ratio the predetermined number of times in succession.

The estimation unit 74 extracts a time from the start time point of the backwashing step in the past filtration process to the detected time point as the first change information.

In Step S52, the estimation unit 74 refers to the pressure logging data on the secondary side stored in the storage unit 71 during the backwashing step in the current filtration process. Then, similarly to Step S51, the estimation unit 74 extracts a time (e.g., t132 in FIG. 13) from the start of the backwashing step until the pressure on the secondary side stabilizes at the air pressure as the second change information.

In Step S53, the estimation unit 74 subtracts the time (e.g., t131) extracted as the first change information in Step S51 from the time (e.g., t132) extracted as the second change information in Step S52. The estimation unit 74 acquires the subtraction result (e.g., t132–t131) as a difference between the first change information extracted in Step S51 and the second change information extracted in Step S52.

In Step S54, the estimation unit 74 estimates an effect of the physical washing or a future increase in the membrane differential pressure of the hollow fiber membrane module 10 based on the difference acquired in Step S53. Specifically, when the difference acquired in Step S53 is a positive value, it is presumed that clogging of the hollow fiber membrane 11 has progressed and the permeation resistance of the hollow fiber membrane 11 has increased. Accordingly, in this case, the estimation unit 74 estimates that the effect of the physical washing is insufficient or the membrane differential pressure will increase in the future. On the other hand, when the difference acquired in Step S53 is a negative value, it is presumed that the clogging of the hollow fiber membranes 11 has been eliminated and the permeation resistance of the hollow fiber membrane 11 has decreased. Accordingly, in this case, the estimation unit 74 estimates that the effect of the physical washing is sufficient or the membrane differential pressure does not tend to increase.

In Step S55, the estimation unit 74 outputs, as the information indicating a result of the estimation, information indicating whether the effect of the physical washing is insufficient or sufficient, the information indicating that the membrane differential pressure will increase in the future, or the information indicating that the membrane differential pressure does not tend to increase, all the information being estimated in Step S54.

In the example of FIG. 13, the time t132 from the start point of the most recent backwashing step until the pressure on the secondary side stabilizes at the air pressure is longer than the time t131 from the start point of the backwashing step immediately before the most recent backwashing step until the pressure on the secondary side stabilizes at the air pressure. Therefore, the estimation unit 74 estimates that the effect of the physical washing is insufficient or the membrane differential pressure will increase in the future.

[Estimation of Effect of Physical Washing or Future Increase in Membrane Differential Pressure (4)]

In the above, the description has been made of the example in which the estimation unit 74 estimates an effect of the physical washing or a future increase in the membrane differential pressure of the hollow fiber membrane module 10 based on a difference, between the plurality of times of the backwashing step, in a time from the start of the backwashing step until the pressure on the secondary side stabilizes at the air pressure. The method of estimating an effect of the physical washing or a future increase in an membrane differential pressure of the hollow fiber membrane module 10 by the estimation unit 74 is not, however, limited thereto.

For example, as shown in FIG. 13, immediately after the start of the backwashing step, the treated water on the secondary side is rapidly pushed by the pressurized air and flows into the primary side. At this time, the permeation of the treated water in the hollow fiber membrane 11 enters a rate-determining step, so that a degree of pressurization of the treated water by air becomes larger than a degree of permeation of the treated water to the primary side. Therefore, the pressure on the secondary side increases immediately after the start of the backwashing step. Then, a part of the suspended components deposited on the surface of hollow fiber membranes 11 is peeled off state or is brought to be easily peeled off state by the force of pushing the treated water to the primary side, so that the pressure on the secondary side is instantaneously reduced or maintained. Thereafter, the pressure on the secondary side is increased again by pressurization with air. In this way, the pressure on the secondary side instantaneously increases immediately after the start of the backwashing step. A pressure (peak) at a reaching point on the secondary side at the time of the increase increases as the clogging of the hollow fiber membranes 11 progresses and the permeation resistance of the hollow fiber membranes 11 increases.

Therefore, the estimation unit 74 may refer to the pressure logging data on the secondary side stored in the storage unit 71 in each of the plurality of times of the backwashing step, and estimate an effect of the physical washing or a future increase in the membrane differential pressure of the hollow fiber membrane module 10 based on a difference, between the plurality of times of the backwashing step, in a peak of the pressure on the secondary side that has instantaneously increased immediately after the start of the backwashing step.

The present configuration can be realized, for example, as follows. The estimation unit 74 performs the estimation processing illustrated in FIG. 5 at the end of the filtration process. In Step S51, the estimation unit 74 refers to the pressure logging data on the secondary side stored in the storage unit 71 during the backwashing step in the past filtration process. The past filtration process may be, for example, the last filtration process or a filtration process that is first performed immediately after installation of the water treatment device 1 or after maintenance of the same. Then, the estimation unit 74 extracts, as the first change information, a peak value (e.g., P131 in FIG. 13) of the pressure on the secondary side that has instantaneously increased immediately after the start of the backwashing step in the past filtration process.

In Step S52, the estimation unit 74 refers to the pressure logging data on the secondary side stored in the storage unit 71 during the backwashing step in the current filtration process. Then, the estimation unit 74 extracts the peak value (P132 in FIG. 13) of the pressure on the secondary side that has instantaneously increased immediately after the start of the backwashing step as the second change information in the same manner as in Step S51.

In Step S53, the estimation unit 74 subtracts the peak value (e.g., P131 in FIG. 13) of the pressure on the secondary side extracted as the first change information in Step S51 from the peak value (e.g., P132 in FIG. 13) of the pressure on the secondary side extracted as the second change information in Step S52. The estimation unit 74 acquires the subtraction result (e.g., P132-P131) as a difference between the first change information extracted in Step S51 and the second change information extracted in Step S52.

In Step S54, the estimation unit 74 estimates an effect of the physical washing or a future increase in the membrane differential pressure of the hollow fiber membrane module 10 based on the difference acquired in Step S53. Specifically, when the difference acquired in Step S53 is a positive value, it is presumed that clogging of the hollow fiber membrane 11 has progressed and the permeation resistance of the hollow fiber membrane 11 has increased. Accordingly, in this case, the estimation unit 74 estimates that the effect of the physical washing is insufficient or the membrane differential pressure will increase in the future. On the other hand, when the difference acquired in Step S53 is a negative value, it is presumed that the clogging of the hollow fiber membranes 11 has been eliminated and the permeation resistance of the hollow fiber membrane 11 has decreased. Accordingly, in this case, the estimation unit 74 estimates that the effect of the physical washing is sufficient or the membrane differential pressure does not tend to increase.

In Step S55, the estimation unit 74 outputs, as the information indicating a result of the estimation, information indicating whether the effect of the physical washing is insufficient or sufficient, the information indicating that the membrane differential pressure will increase in the future, or the information indicating that the membrane differential pressure does not tend to increase, all the information being estimated in Step S54.

In the example of FIG. 13, the peak value P132 of the pressure on the secondary side immediately after the start of the most recent backwashing step is larger than the peak value P131 of the pressure on the secondary side immediately after the start of the backwashing step immediately before the most recent backwashing step. Therefore, the estimation unit 74 estimates that the effect of the physical washing is insufficient or the membrane differential pressure will increase in the future.

[Estimation of Effect of Physical Washing or Future Increase in Membrane Differential Pressure (5)]

In addition, the present inventors have found, from the knowledge obtained by performing test operation, that an effect of the physical washing or a future increase in an membrane differential pressure can be estimated by the following method. Specifically, the present inventors have conducted the test operation, and calculated an integral value of a difference between the pressure on the secondary side and the pressure on the primary side in the time from the start of the backwashing step to the time point at which the pressure on the primary side stabilizes, using the pressure logging data (FIG. 14 and FIG. 15) acquired in each of a backwashing step (hereinafter, referred to as first backwashing step) when a degree of progress of the clogging of the hollow fiber membranes 11 is smaller than a predetermined degree and a backwashing step (hereinafter, referred to as second backwashing step) when the degree of progress of the clogging of the hollow fiber membranes 11 is larger than the predetermined degree.

Figure 14:
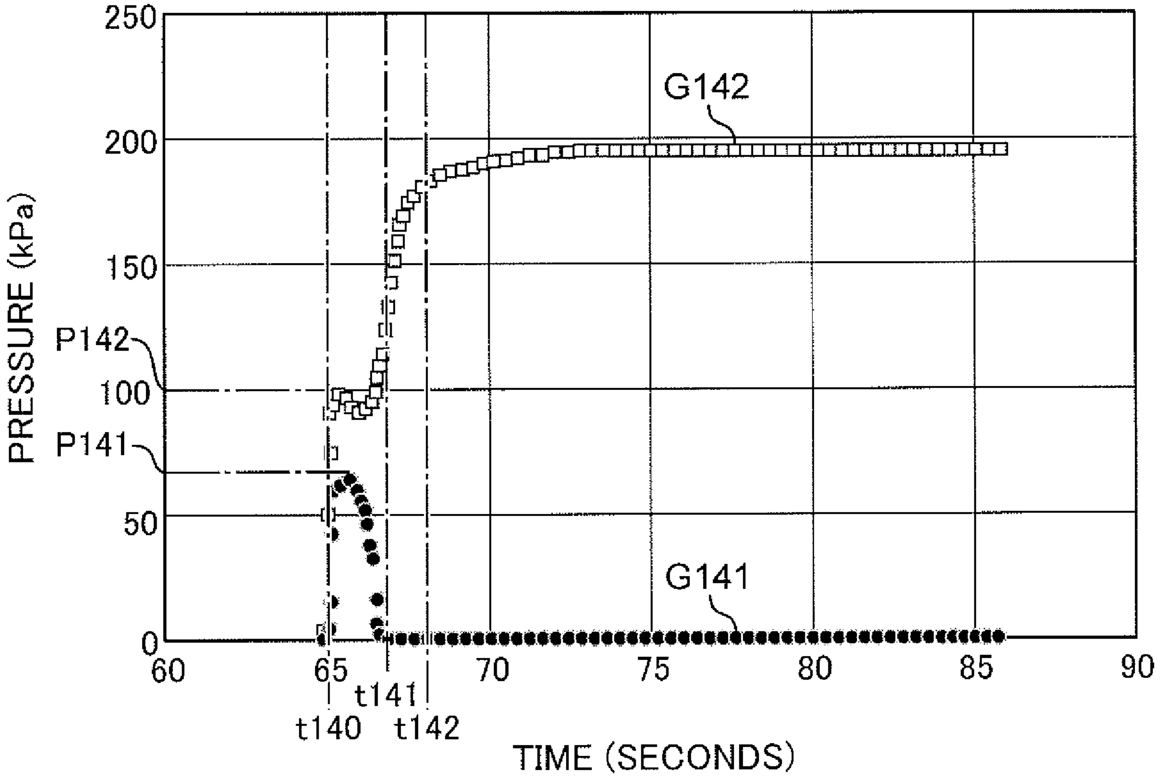
FIG. 14 is a diagram showing an example of the pressure logging data at the time of the backwashing step when clogging of a hollow fiber membrane is not in progress.
Figure 15:
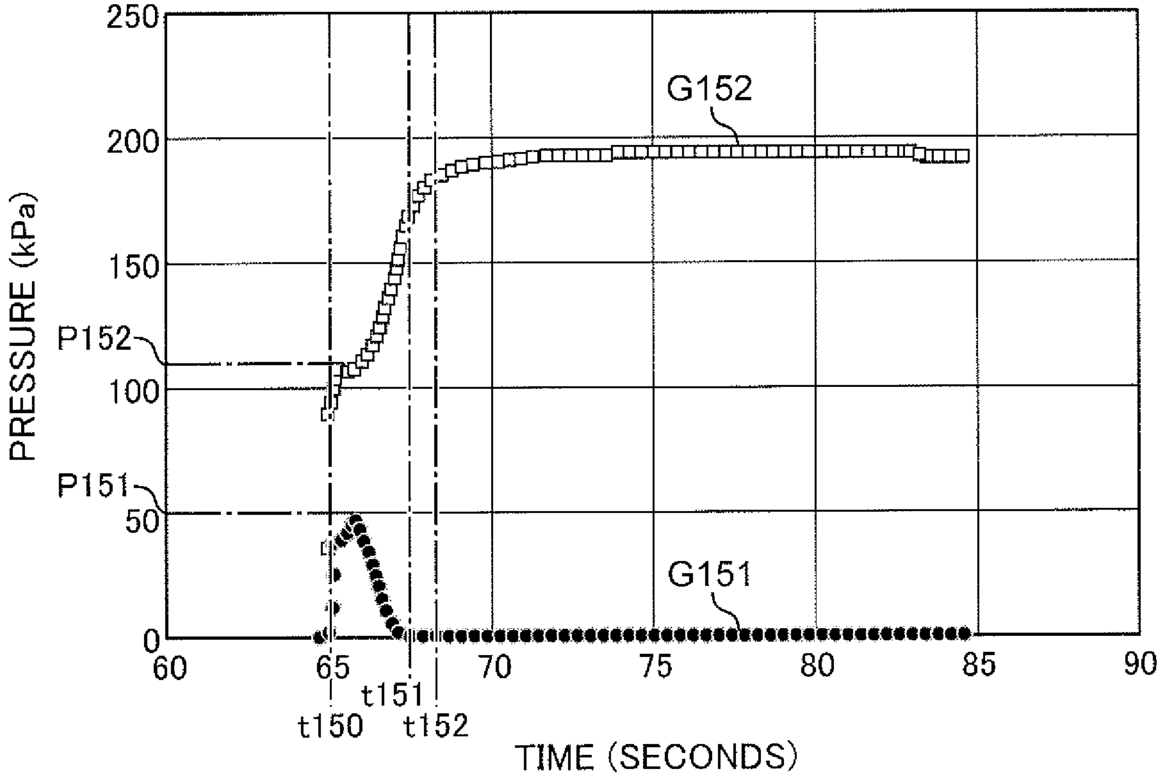
FIG. 15 is a diagram showing an example of the pressure logging data at the time of the backwashing step when the clogging of the hollow fiber membrane is in progress.

In FIG. 14 and FIG. 15, a horizontal axis represents time, and a vertical axis represents pressures on the primary side and the secondary side of the hollow fiber membrane module 10. A plot group G141 in FIG. 14 shows a temporal change in the pressure on the primary side of the hollow fiber membrane module 10 during the first backwashing step. A plot group G142 in FIG. 14 shows a temporal change in the pressure on the secondary side of the hollow fiber membrane module 10 during the first backwashing step. A plot group G151 in FIG. 15 shows a temporal change in the pressure on the primary side of the hollow fiber membrane module 10 during the second backwashing step. A plot group G152 in FIG. 15 shows a temporal change in the pressure on the secondary side of the hollow fiber membrane module 10 during the second backwashing step.

Next, using the pressure logging data shown in FIG. 14 acquired in the first backwashing step, the present inventors have calculated an integral value of a difference between the pressure on the secondary side and the pressure on the primary side in a time of t140 to t141 from a time point t140 at which the first backwashing step starts to a time point t141 at which the pressure on the primary side stabilizes. Hereinafter, a target time for calculating the integral value is referred to as a target time.

In FIG. 14, the integral value of the difference between the pressure on the secondary side and the pressure on the primary side when the target time is set to the time of t140 to t141 corresponds to an area of a region surrounded by a chain line indicating the start time point t140 of the first backwashing step, a chain line indicating the time point t141 at which the pressure on the primary side stabilizes, the plot group G142, and the plot group G141.

Similarly, using the pressure logging data shown in FIG. 15 acquired in the second backwashing step, the present inventors have calculated an integral value of the difference between the pressure on the secondary side and the pressure on the primary side in a time of t150 to t151, as the target time, the time being from a time point t150 at which the second backwashing step starts to a time point t151 at which the pressure on the primary side stabilizes.

Then, the present inventors have compared a measurement result of the difference between the pressure on the secondary side and the pressure on the primary side in the filtration step performed after the first backwashing step, a measurement result of the difference in the filtration step performed after the second backwashing step, and a calculation result of the integral value. As a result, the present inventors have found that the integral value in the predetermined period is significantly different between a case where the degree of progress of the clogging of the hollow fiber membranes 11 is larger than the predetermined degree and a case where the degree of progress of clogging is smaller than the predetermined degree even when the difference between the pressure on the secondary side and the pressure on the primary side during the filtration step is substantially constant. Similarly, the present inventors have obtained knowledge, from the test operation, that even when the difference between the pressure on the secondary side and the pressure on the primary side during the filtration step is substantially constant, the integral value is significantly different between a case where the deposition amount of the suspended components in the hollow fiber membranes 11 is larger than a predetermined amount and a case where the same is smaller.

It is presumed that this is because the time from the start of the backwashing step until the pressure on the primary side that has instantaneously increased immediately after the start of the backwashing step reaches the peak and the time from the peak to the stabilization of the pressure on the primary side that has instantaneously increased immediately after the start of the backwashing step become longer as the degree of progress of the clogging of the hollow fiber membranes 11 is increased or as the deposition amount of the suspended components in the hollow fiber membranes 11 is increased.

Therefore, similarly, the present inventors have calculated the integral value using, as the target time, a time from the start time point t140 of the first backwashing step until the pressure on the primary side that has instantaneously increased immediately after the start of the first backwashing step reaches a peak P141. In addition, the present inventors have calculated the integral value using, as the target time, a time from the start time point t150 of the second backwashing step until the pressure on the primary side that has instantaneously increased immediately after the start of the second backwashing step reaches the peak P151. Also in this case, the present inventors have obtained the same knowledge as described above.

The present inventors have calculated the integral value using, as the target time, a time from when the pressure on the primary side that has instantaneously increased immediately after the start of the first backwashing step reaches the peak P141 until the time point t141 at which the pressure on the primary side stabilizes. The present inventors have also calculated the integral value using, as the target time, a time from when the pressure on the primary side that has instantaneously increased immediately after the start of the second backwashing step reaches the peak P151 until the time point t151 at which the pressure on the primary side stabilizes. Also in these cases, the present inventors have obtained the same knowledge as described above.

Further, the present inventors have calculated the integral value using, as the target time, a time from the start time point t140 of the first backwashing step until a time point t142 at which the pressure on the secondary side stabilizes. Further, the present inventors have also calculated the integral value using, as the target time, a time from the start time point t150 of the second backwashing step until a time point t152 at which the pressure on the secondary side stabilizes. Also in these cases, the present inventors have obtained the same knowledge as described above.

The present inventors have calculated the integral value using, as the target time, a time from the start time point 1140 of the first backwashing step until the pressure on the secondary side that has instantaneously increased immediately after the start of the backwashing step reaches a peak P142. The present inventors have also calculated the integral value using, as the target time, a time from the start time point t150 of the second backwashing step until the pressure on the secondary side that has instantaneously increased immediately after the start of the second backwashing step reaches a peak P152. Also in these cases, the present inventors have obtained the same knowledge as described above.

The present inventors have calculated the integral value using, as the target time, a time from when the pressure on the secondary side that has instantaneously increased immediately after the start of the first backwashing step reaches the peak P142 until the time point t142 at which the pressure on the secondary side stabilizes. The present inventors have also calculated the integral value using, as the target time, a time from when the pressure on the secondary side that has instantaneously increased immediately after the start of the second backwashing step reaches the peak P152 until the time point t152 at which the pressure on the secondary side stabilizes. Also in these cases, the present inventors have obtained the same knowledge as described above.

In addition, the present inventors have found that the larger the degree of progress of the clogging of the hollow fiber membrane 11, or the larger the deposition amount of the suspended components in the hollow fiber membrane 11, the larger the integral value at each of the above target times.

Therefore, based on the above knowledge obtained by the present inventors, with respect to a plurality of times of the backwashing step, the estimation unit 74 may calculate an integral value of a difference between the pressure on the secondary side and the pressure on the primary side in any one of a time (hereinafter, referred to as first target time) from the start of the backwashing step until the pressure on the primary side or the secondary side has instantaneously increased immediately after the start of the backwashing step reaches a peak, a time (hereinafter, referred to as second target time) from when the pressure on the primary side or the secondary side has instantaneously increased immediately after the start of the backwashing step reaches the peak until when the pressure stabilizes, and a time (hereinafter, referred to as third target time) from the start time point of the backwashing step until a time point at which the pressure on the primary side or the secondary side stabilizes. The estimation unit 74 may estimate an effect of the physical washing or a future increase in the membrane differential pressure of the hollow fiber membrane module 10 based on a difference in the integral value between the plurality of times of the backwashing step.

The present configuration can be realized, for example, as follows. The estimation unit 74 performs the estimation processing illustrated in FIG. 5 at the end of the filtration process. In Step S51, the estimation unit 74 chronologically refers to the pressure logging data on the primary side and the secondary side stored in the storage unit 71 during the backwashing step in the past filtration process. The past filtration process may be, for example, the last filtration process or a filtration process that is first performed immediately after installation of the water treatment device 1 or after maintenance of the same. Then, the estimation unit 74 calculates the integral value using, as the target time, any one of the first target time, the second target time, and the third target time during the backwashing step in the past filtration process. Then, the estimation unit 74 extracts the calculated integral value as the first change information.

When calculating the integral value using the second target time or the third target time as the target time, the estimation unit 74 detects a time point at which the pressure on the primary side or the secondary side stabilizes as follows.

With respect to each pressure on the primary side indicated by each logging data referred to, the estimation unit 74 subtracts, from each pressure on the primary side, a pressure on the primary side measured immediately before. Then, the estimation unit 74 detects a time point at which the subtraction result becomes smaller than the predetermined value the predetermined number of times in succession as a time point at which the pressure on the primary side stabilizes. In the same manner as this, the estimation unit 74 detects a time point at which the pressure on the secondary side stabilizes.

The method by which the estimation unit 74 detects a time point at which the pressure on the primary side or the secondary side stabilizes is not, however, limited thereto. For example, the estimation unit 74 may chronologically calculate a ratio of a current pressure on the primary side to a pressure on the primary side measured immediately before. Then, as a time point at which the pressure on the primary side has stabilized, the estimation unit 74 may detect a time point at which the calculated ratio becomes equal to or less than the predetermined ratio a predetermined number of times in succession. In the same manner as this, the estimation unit 74 may detect a time point at which the pressure on the secondary side has stabilized.

In Step S52, the estimation unit 74 refers to the pressure logging data on the primary side and the secondary side stored in the storage unit 71 during the backwashing step in the current filtration process. Then, the estimation unit 74 calculates the integral value using, as the target time, a time which is the same as the time considered as the target time in Step S51, among the first target time, the second target time, and the third target time during the backwashing step in the current filtration process. Then, the estimation unit 74 extracts the calculated integral value as the second change information.

In Step S53, the estimation unit 74 subtracts the integral value extracted as the first change information in Step S51 from the integral value extracted as the second change information in Step S52. The estimation unit 74 acquires the subtraction result as a difference between the first change information extracted in Step S51 and the second change information extracted in Step S52.

In Step S54, the estimation unit 74 estimates an effect of the physical washing or a future increase in the membrane differential pressure of the hollow fiber membrane module 10 based on the difference acquired in Step S53. Specifically, when the difference acquired in Step S53 is a positive value, it is presumed that the degree of the clogging of the hollow fiber membrane 11 has increased. Accordingly, in this case, the estimation unit 74 estimates that the effect of the physical washing is insufficient. Alternatively, when the difference acquired in Step S53 is a positive value, it is presumed that the deposition amount of the suspended components in the hollow fiber membrane 11 has increased. Accordingly, in this case, the estimation unit 74 may estimate that the permeation resistance of the hollow fiber membrane 11 increases and the membrane differential pressure of the hollow fiber membrane module 10 will increase in the future.

By contrast, when the difference acquired in Step S53 is a negative value, it is presumed that the degree of progress of the clogging of the hollow fiber membrane 11 has decreased. Accordingly, in this case, the estimation unit 74 estimates that the effect of the physical washing is sufficient. Alternatively, when the difference acquired in Step S53 is a negative value, it is presumed that the deposition amount of the suspended components in the hollow fiber membrane 11 has decreased. Accordingly, in this case, the estimation unit 74 may estimate that the permeation resistance of the hollow fiber membrane 11 decreases and the membrane differential pressure does not tend to increase.

In Step S55, the estimation unit 74 outputs, as the information indicating a result of the estimation, information indicating whether the effect of the physical washing is insufficient or sufficient, the information indicating that the membrane differential pressure will increase in the future, or the information indicating that the membrane differential pressure does not tend to increase, all the information being estimated in Step S54.

According to the present estimation method, it is possible to appropriately grasp the degree of progress of the clogging of the hollow fiber membranes 11 or the change in the deposition amount of the suspended components in the hollow fiber membrane 11 by a difference, between the plurality of times of the backwashing step, in an integral value of a difference between the pressure on the secondary side and the pressure on the primary side at the three times of the first target time, the second target time, and the third target time. Therefore, the effect of elimination of clogging of the hollow fiber membrane 11 by the physical washing can be appropriately estimated based on the grasped degree of progress of the clogging of the hollow fiber membrane 11. Further, when it is grasped that the deposition amount of the suspended components in the hollow fiber membrane 11 has increased, it is possible to appropriately estimate that the permeation resistance of the hollow fiber membrane 11 will increase and the membrane differential pressure will increase.

[Estimation of Degree of Progress of Clogging, Effect of Physical Washing or Future Increase in Membrane Differential Pressure]

The estimation unit 74 may, however, estimate a degree of progress of clogging of the hollow fiber membranes 11, an effect of the physical washing or a future increase in an membrane differential pressure by the following method different from the above. Specifically, immediately after the start of the backwashing step, the pressure on the secondary side instantaneously increases immediately after the start of the backwashing step as described above. At this time, an ultimate pressure on the secondary side increases as the clogging of the hollow fiber membranes 11 progresses and the permeation resistance of the hollow fiber membranes 11 increases, or as the deposition amount of the suspended components in the hollow fiber membranes 11 increases. In addition, as the pressure on the secondary side increases, a permeation rate of the treated water increases, and the suspended components deposited on the outer surface of the hollow fiber membrane 11 is brought to be easily peeled off state. Thereafter, when a part of the suspended components deposited on the outer surface of the hollow fiber membrane 11 is peeled off, although the pressure on the secondary side instantaneously decreases, the pressure increases again by pressurization with air. As a result, the speed at which the treated water is pushed out to the primary side increases.

On the other hand, immediately after the treated water on the secondary side is pushed out to the primary side, the pressure on the primary side instantaneously increases due to pipeline resistance generated when the raw water on the primary side flows into the drain pipe 53. At this time, the speed at which the treated water on the secondary side is pushed out to the primary side increases as the clogging of the hollow fiber membrane 11 progresses and the permeation resistance of the hollow fiber membrane 11 increases, or as the deposition amount of the suspended components in the hollow fiber membrane 11 increases. At this time, the peak of the pressure on the primary side that has instantaneously increased immediately after the start of the backwashing step decreases as the clogging of the hollow fiber membrane 11 progresses and the permeation resistance of the hollow fiber membrane 11 increases, or as the deposition amount of the suspended components in the hollow fiber membrane 11 increases. Thereafter, when a part of the suspended components deposited on the outer surface of the hollow fiber membrane 11 is peeled off, and the speed at which the treated water is pushed out to the primary side increases, a speed at which the water on the primary side is discharged also increases, and the pressure on the primary side rapidly decreases.

In other words, it is assumed that the pressure on the primary side or the secondary side has instantaneously increased immediately after the start of the backwashing step reaches the peak and reaches a time point immediately before a part of the suspended components deposited on the outer surface of the hollow fiber membrane 11 is peeled off. At this time point, the difference between the pressure on the secondary side and the pressure on the primary side increases as the clogging of the hollow fiber membrane 11 progresses and the permeation resistance of the hollow fiber membrane 11 increases, or as the deposition amount of the suspended components in the hollow fiber membrane 11 increases.

Therefore, with respect to the plurality of times of the backwashing step, the estimation unit 74 may detect a peak of any one of the pressure on the primary side and the pressure on the secondary side that have instantaneously increased immediately after the start of the backwashing step. Then, the estimation unit 74 may estimate a degree of progress of clogging of the hollow fiber membrane 11, an effect of the physical washing, or a future increase in the membrane differential pressure of the hollow fiber membrane module 10 based on a difference between the pressure on the secondary side and the pressure on the primary side at a time point at which the any one of the pressures reaches the peak between the plurality of times of the backwashing step.

The present configuration can be realized, for example, as follows. The estimation unit 74 performs the estimation processing illustrated in FIG. 5 at the end of the filtration process. In Step S51, the estimation unit 74 chronologically refers to the pressure logging data on the primary side and the secondary side stored in the storage unit 71 during the backwashing step in the past filtration process. The past filtration process may be, for example, the last filtration process or a filtration process that is first performed immediately after installation of the water treatment device 1 or after maintenance of the same. Then, the estimation unit 74 detects a peak value of any one of the pressures on the primary side and the secondary side immediately after the start of the backwashing step in the past filtration process. Then, the estimation unit 74 calculates a difference between the pressure on the secondary side and the pressure on the primary side at the time point at which the any one of the pressures reaches the peak value. Then, the estimation unit 74 extracts the calculated difference between the pressure on the secondary side and the pressure on the primary side as the first change information.

In Step S52, the estimation unit 74 chronologically refers to the pressure logging data of the pressures on the primary side and the secondary side stored in the storage unit 71 during the backwashing step in the current filtration process. Then, the estimation unit 74 detects a peak value of the same pressure (hereinafter referred to as first target pressure) as the any one of the pressures immediately after the start of the backwashing step in the same manner as in Step S51. Then, the estimation unit 74 calculates a difference between the pressure on the secondary side and the pressure on the primary side at the time point at which the first target pressure reaches the peak value. Then, the estimation unit 74 extracts the calculated difference between the pressure on the secondary side and the pressure on the primary side as the second change information.

In Step S53, the estimation unit 74 subtracts the difference extracted as the first change information in Step S51 from the difference extracted as the second change information in Step S52. The estimation unit 74 acquires the subtraction result as a difference between the first change information extracted in Step S51 and the second change information extracted in Step S52.

In Step S54, the estimation unit 74 estimates a degree of progress of clogging of the hollow fiber membrane 11, an effect of the physical washing, or a future increase in the membrane differential pressure of the hollow fiber membrane module 10 based on the difference acquired in Step S53.

Specifically, when the difference acquired in Step S53 is a positive value, it is presumed that the degree of the clogging of the hollow fiber membrane 11 has increased. Accordingly, in this case, the estimation unit 74 estimates that the degree of progress of the clogging of the hollow fiber membrane 11 is large or the effect of the physical washing is insufficient. Alternatively, when the difference acquired in Step S53 is a positive value, it is presumed that the deposition amount of the suspended components in the hollow fiber membrane 11 has increased. Accordingly, in this case, the estimation unit 74 may estimate that the permeation resistance of the hollow fiber membrane 11 increases and the membrane differential pressure of the hollow fiber membrane module 10 will increase in the future.

By contrast, when the difference acquired in Step S53 is a negative value, it is presumed that the degree of progress of the clogging of the hollow fiber membrane 11 has decreased. Accordingly, in this case, the estimation unit 74 estimates that the degree of progress of the clogging of the hollow fiber membrane 11 is small or the effect of the physical washing is sufficient. Alternatively, when the difference acquired in Step S53 is a negative value, it is presumed that the deposition amount of the suspended components in the hollow fiber membrane 11 has decreased. Accordingly, in this case, the estimation unit 74 may estimate that the permeation resistance of the hollow fiber membrane 11 decreases and the membrane differential pressure does not tend to increase.

In Step S55, the estimation unit 74 outputs, as the information indicating a result of the estimation, information indicating whether the degree of progress of the clogging of the hollow fiber membrane 11 is increased or decreased, the information indicating whether the effect of the physical washing is insufficient or sufficient, the information indicating that the membrane differential pressure will increase in the future, or the information indicating that the membrane differential pressure does not tend to increase, which are estimated in Step S54.

In the present estimation method, the pressure on at least one of the primary side and the secondary side of the hollow fiber membrane module 10 is measured at intervals of three seconds or less for the plurality of times of the backwashing step, so that the peak of the pressure can be detected on any one of the primary side and the secondary side that has instantaneously increased immediately after the start of the backwashing step. In other words, in the backwashing step, even with a suspended component that is peeled off from the surface of the hollow fiber membrane 11 by the force of pushing the treated water out from the secondary side to the primary side, the any one of the pressures before decreasing due to peeling off of the suspended component can be appropriately detected.

As a result, by using the difference between the pressure on the secondary side and the pressure on the primary side at the time of the detection, it is possible to appropriately grasp the degree of progress of the clogging of the hollow fiber membrane 11 after the physical washing or a change in the deposition amount of the suspended components in the hollow fiber membrane. Therefore, the effect of elimination of clogging of the hollow fiber membrane 11 by the physical washing can be appropriately estimated based on the grasped degree of progress of the clogging of the hollow fiber membrane 11. Further, when it is grasped that the deposition amount of the suspended components in the hollow fiber membrane 11 has increased, it is possible to appropriately estimate that the permeation resistance of the hollow fiber membrane 11 will increase and the membrane differential pressure will increase.

[Estimation of Presence or Absence of Leak of Hollow Fiber Membrane 11]

In the above, the description has been made of the example in which the estimation unit 74 estimates the degree of progress of the clogging of the hollow fiber membrane 11, an effect of the physical washing, or a future increase in the membrane differential pressure of the hollow fiber membrane module 10 based on the pressure logging data on the primary side or the secondary side stored in the storage unit 71 during the plurality of times of the backwashing step. The present invention is not, however, limited thereto, and the estimation unit 74 may estimate whether or not the hollow fiber membrane 11 leaks based on the pressure logging data on the secondary side stored in the storage unit 71 during the backwashing step.

For example, in the backwashing step, as illustrated in FIG. 1, the drain valve 54 and the air valve 42 are opened, so that the air compressor 43 is operated. As a result, the air pressurized to the predetermined pressure is supplied to the treated water space S2 (FIG. 1) of the housing 12 via the air pipe 41, and the treated water on the secondary side is pushed out to the primary side by the air.

As described above, it is assumed that in the backwashing step, the air valve 42 and the air compressor 43 normally operate, and the air pressurized to the air pressure is normally supplied to the treated water space S2 (FIG. 1) of the housing 12 without leaking to the raw water space S1 (FIG. 1) on the primary side of the housing 12, to the outside of the air pipe 41, and the like. It is also assumed that no leak occurs in the hollow fiber membrane 11. In this case, as shown in FIG. 11, when the pushing of the treated water on the secondary side out to the primary side is completed in the backwashing step (the elapsed time 1112), the pressure on the secondary side stabilizes at the air pressure (the elapsed time t114). However, when the hollow fiber membrane 11 leaks, the air used for pushing out the treated water flows out to the primary side inside the hollow fiber membrane module 10 from a location of the leak. As a result, after the pushing of the treated water on the secondary side out to the primary side is completed in the backwashing step, the pressure on the secondary side stabilizes at a pressure lower than the air pressure.

Therefore, when the pressure on the secondary side has stabilized in the backwashing step (the elapsed time t114), the estimation unit 74 may compare the stabilized pressure on the secondary side with the air pressure to estimate whether or not the hollow fiber membrane 11 leaks.

The present configuration can be realized, for example, as follows. The estimation unit 74 performs the estimation processing illustrated in FIG. 4 at the end of the filtration process. In Step S41, the estimation unit 74 chronologically refers to the logging data of the pressure on the secondary side stored in the storage unit 71 during the backwashing step of the filtration process. Then, with respect to each of referred logging data, the estimation unit 74 performs processing of subtracting, from the logging data, one-preceding logging data. Then, the estimation unit 74 detects a time point at which the result of the subtraction becomes smaller than the predetermined value the predetermined number of times in succession (e.g., the time point t114 in FIG. 11) as a time point at which the pressure on the secondary side has stabilized.

Note that the method by which the estimation unit 74 detects a time point at which the pressure on the secondary side has stabilized is not limited thereto. For example, the estimation unit 74 may chronologically calculate a ratio of a current pressure on the secondary side to a pressure on the secondary side measured immediately before. Then, as a time point at which the pressure on the secondary side has stabilized, the estimation unit 74 may detect a time point at which the calculated ratio becomes equal to or less than the predetermined ratio the predetermined number of times in succession.

Then, the estimation unit 74 extracts an absolute value of a difference between the detected pressure on the secondary side and the air pressure as the change information.

In Step S42, the estimation unit 74 estimates whether or not the hollow fiber membrane 11 leaks based on the absolute value of the difference between the secondary side pressure and the air pressure, the absolute value being extracted as the change information in Step S41. Specifically, when the absolute value of the difference between the secondary side pressure and the air pressure, the absolute value being extracted as the change information in Step S41, is equal to or less than a predetermined error, the estimation unit 74 estimates that the hollow fiber membrane 11 has no leak. By contrast, when the absolute value of the difference between the secondary side pressure and the air pressure, the absolute value being extracted as the change information in Step S41, is larger than the predetermined error, it is estimated that the hollow fiber membrane 11 leaks.

In Step S43, the estimation unit 74 outputs, as information indicating a result of the estimation, information being estimated in Step S42 and indicating whether or not the hollow fiber membrane 11 leaks.

As a result, in the water treatment device 1, a state of leak of the hollow fiber membrane 11 can be grasped without disassembling the hollow fiber membrane module 10. This enables reference to the pressure logging data when the hollow fiber membrane 11 leaked in the past to use the pressure logging data for prediction of a time when the hollow fiber membrane 11 will leak.

Note that the timing at which the estimation unit 74 performs the above estimation of the effect of the physical washing or the future increase in the membrane differential pressure is not particularly limited, and for example, the estimation may be performed every time the filtration process is performed, or the estimation may be performed every time the filtration process is repeated a plurality of times (e.g., ten times). Alternatively, the estimation unit 74 may estimate an effect of the physical washing or a future increase in the membrane differential pressure at a predetermined frequency such as once a day, once a week, or once a month. The frequency need only be appropriately determined according to a kind of raw water (e.g., river water, drainage water, or sewage water), season, and the like.

In addition, in the backwashing step, the treated water on the secondary side may be pressurized with a permeated liquid pressurized to a predetermined pressure instead of air pressurized to a predetermined pressure. A drug may be injected into the permeated liquid.

In addition, when the estimation unit 74 estimates that the effect of the physical washing is insufficient, for example, the effect of the physical washing may be enhanced by increasing the pressure of the air on the secondary side during the backwashing step and/or increasing an inflow amount of the air during the bubbling step. In the backwashing step using the permeated liquid, the effect of the physical washing may be enhanced by adjusting a flow rate of the permeated liquid, the flow velocity of the permeated liquid, and the like. The effect of the physical washing may be enhanced by adjusting a time of the backwashing step and/or the bubbling step.

[Estimation Based on Pressure Logging Data During Bubbling Step]

Next, description will be made of various estimation methods performed by the estimation unit 74 based on the pressure logging data stored in the storage unit 71 during the air diffuser bubbling step and the water conduit bubbling step.

[Estimation of Abnormality of Peripheral Device During Air Diffuser Bubbling Step]

Figure 16:
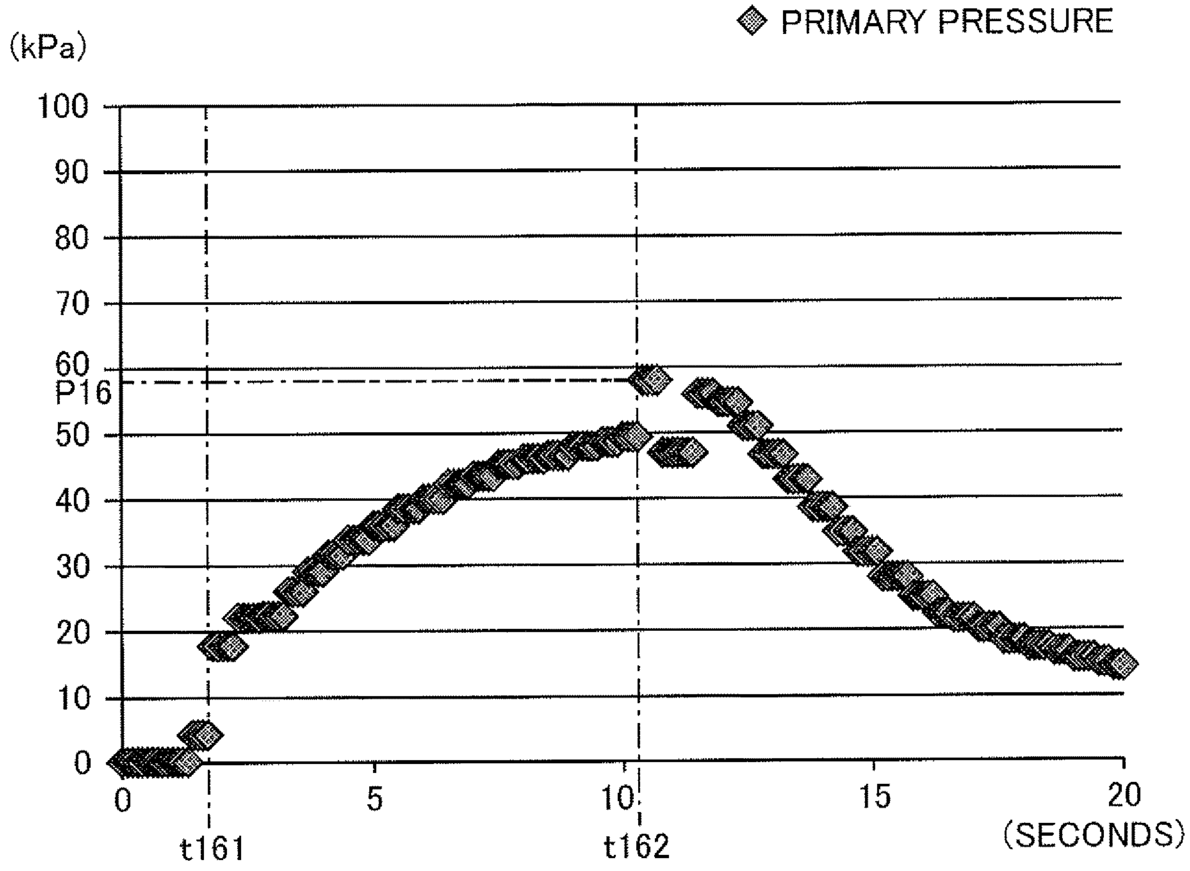
FIG. 16 is a diagram showing an example of the pressure logging data at the time of a second water filling step and an air diffuser bubbling step.

FIG. 16 is a diagram showing an example of pressure logging data at the time of the second water filling step and the air diffuser bubbling step. In FIG. 16, a horizontal axis represents an elapsed time (seconds) from a start of the second water filling step (FIG. 3) before the air diffuser bubbling step, and a vertical axis represents a pressure on the primary side (KPa) measured by the primary side pressure sensor 61. For example, as shown in FIG. 16, when the second water filling step before the air diffuser bubbling step brings the raw water space S1 of the housing 12 to be full of water (an elapsed time t161), the raw water flows out to the air vent pipe 55. At this time, since the inner diameter of the air vent pipe 55 is sufficiently smaller than the inner diameter of the housing 12, pipeline resistance is generated. This increases the pressure on the primary side.

Then, when the air diffuser bubbling step is started (elapsed time t162), the first air valve 32 is opened and the air compressor 43 is operated. As a result, when air flows in immediately after the start of the air diffuser bubbling step, water corresponding to the amount of air that has flowed in flows into the air vent pipe 55 (FIG. 1) sufficiently thinner than the housing 12 (FIG. 2) at once. As a result, the pressure on the primary side instantaneously increases. In addition, the pressure on the primary side increases as the inflow amount of air increases.

Therefore, the estimation unit 74 estimates whether or not the first air valve 32 and the air compressor 43 are abnormal by comparing a pressure (peak) at a reaching point of the pressure on the primary side that has instantaneously increased immediately after the start of the air diffuser bubbling step with a predetermined pressure (hereinafter, referred to as first bubbling pressure). The first bubbling pressure is set to be a peak value of the pressure on the primary side that has instantaneously increased immediately after the start of the air diffuser bubbling step when the first air valve 32 and the air compressor 43 are operating normally.

The present configuration can be realized, for example, as follows. The estimation unit 74 performs the estimation processing illustrated in FIG. 4 at the end of the filtration process. In Step S41, the estimation unit 74 chronologically refers to the logging data of the pressure on the primary side stored in the storage unit 71 during the air diffuser bubbling step of the filtration process. Then, the estimation unit 74 detects a peak value of the primary side pressure immediately after the start of the air diffuser bubbling step. Then, the estimation unit 74 extracts an absolute value of a difference between the detected peak value of the pressure on the primary side and the first bubbling pressure as the change information.

In Step S42, the estimation unit 74 estimates whether or not the first air valve 32 and the air compressor 43 are abnormal based on the absolute value of the difference between the peak value of the pressure on the primary side and the first bubbling pressure, the absolute value being extracted as the change information in Step S41.

Specifically, when the absolute value of the difference between the peak value of the primary side pressure and the first bubbling pressure, the absolute value being extracted as the change information in Step S41, is equal to or less than a predetermined error, it is presumed that the inflow amount of air for use in the air diffuser bubbling step is in a normal state. Therefore, in this case, the estimation unit 74 estimates that the first air valve 32 and the air compressor 43 are normal. By contrast, when the absolute value of the difference between the peak value of the primary side pressure and the first bubbling pressure, the absolute value being extracted as the change information in Step S41, is larger than the error, it is presumed that the inflow amount of air for use in the air diffuser bubbling step is in an abnormal state. Therefore, in this case, the estimation unit 74 estimates that one or more devices of the first air valve 32 and the air compressor 43 are abnormal.

In Step S43, the estimation unit 74 outputs, as information indicating a result of the estimation, information indicating that the first air valve 32 and the air compressor 43 are normal or information indicating that one or more devices of the first air valve 32 and the air compressor 43 are abnormal, the information being estimated in Step S42.

[Estimation of Abnormality of Peripheral Device During Water Conduit Bubbling Step]

Figure 17:
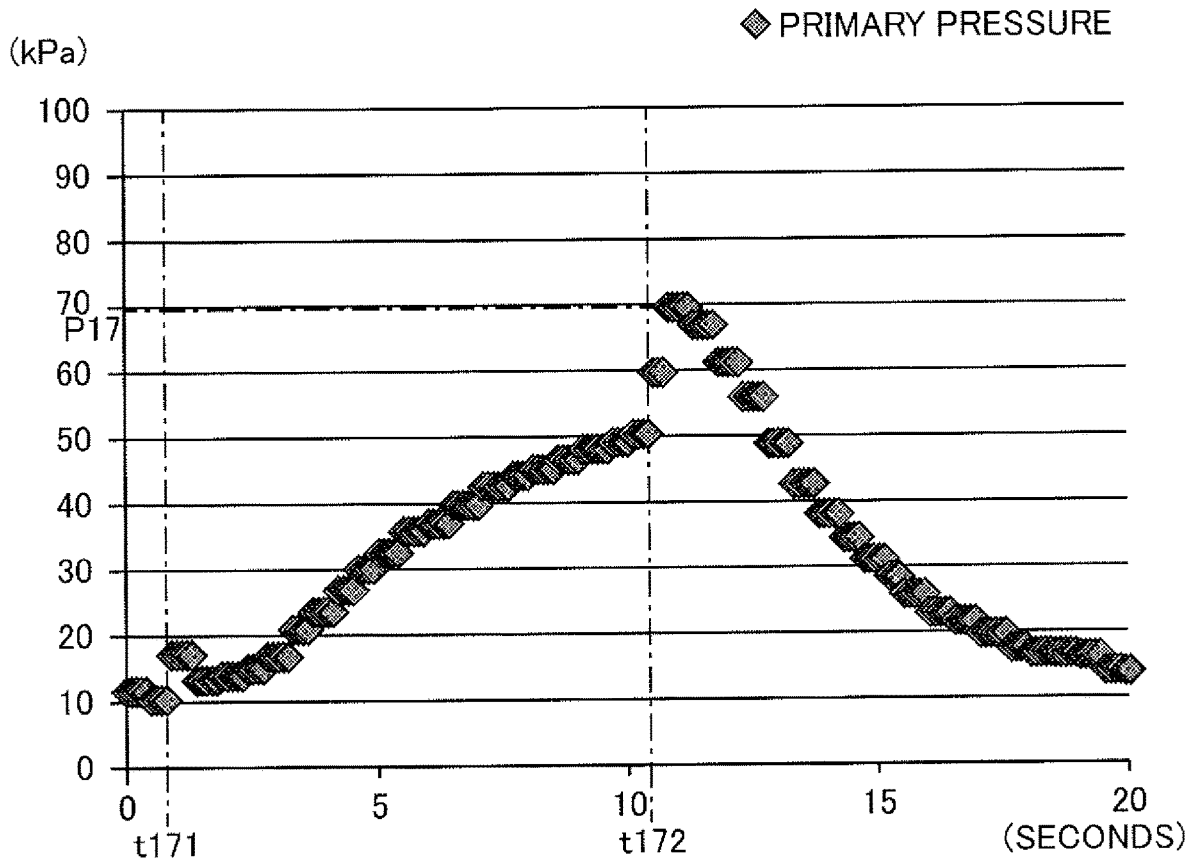
FIG. 17 is a diagram showing an example of the pressure logging data at the time of a third water filling step and a water conduit bubbling step.

FIG. 17 is a diagram showing an example of pressure logging data at the time of the water conduit bubbling step. In FIG. 17, a horizontal axis represents an elapsed time (seconds) from a start of the third water filling step (FIG. 3) before the water conduit bubbling step, and a vertical axis represents a pressure on the primary side (KPa) measured by the primary side pressure sensor 61. For example, as shown in FIG. 17, when the third water filling step before the water conduit bubbling step brings the raw water space S1 of the housing 12 to be full of water (elapsed time t171), the raw water flows out to the air vent pipe 55, so that the pressure on the primary side increases. This is because since the inner diameter of the air vent pipe 55 is sufficiently smaller than the inner diameter of the housing 12, pipeline resistance is generated.

Then, when the water conduit bubbling step is started (an elapsed time t172), the second air valve 33 is opened and the air compressor 43 is operated. As a result, when air flows in immediately after the start of the water conduit bubbling step, water corresponding to the amount of air that has flowed in flows into the air vent pipe 55 (FIG. 1) sufficiently thinner than the housing 12 (FIG. 1) at once. As a result, the pressure on the primary side instantaneously increases. In addition, the pressure on the primary side increases as the inflow amount of air increases.

Therefore, the estimation unit 74 may estimate whether or not the second air valve 33 and the air compressor 43 are abnormal by comparing a pressure (peak) at a reaching point of the pressure on the primary side that has instantaneously increased immediately after the start of the water conduit bubbling step with a predetermined pressure (hereinafter, referred to as second bubbling pressure). The second bubbling pressure is set to be a peak value of the pressure on the primary side that has instantaneously increased immediately after the start of the water conduit bubbling step when the second air valve 33 and the air compressor 43 are operating normally.

The present configuration can be realized, for example, as follows. The estimation unit 74 performs the estimation processing illustrated in FIG. 4 at the end of the filtration process. In Step S41, the estimation unit 74 chronologically refers to the logging data of the pressure on the primary side stored in the storage unit 71 during the water conduit bubbling step of the filtration process. Then, the estimation unit 74 detects a peak value of the primary side pressure immediately after the start of the water conduit bubbling step. Then, the estimation unit 74 extracts an absolute value of a difference between the detected peak value of the pressure on the primary side and the second bubbling pressure as the change information.

In Step S42, the estimation unit 74 estimates whether or not the second air valve 33 and the air compressor 43 are abnormal based on the absolute value of the difference between the peak value of the pressure on the primary side and the second bubbling pressure, the absolute value being extracted as the change information in Step S41.

Specifically, when the absolute value of the difference between the peak value of the primary side pressure and the second bubbling pressure, the absolute value being extracted as the change information in Step S41, is equal to or less than a predetermined error, it is presumed that the inflow amount of air for use in the water conduit bubbling step is in a normal state. Therefore, in this case, the estimation unit 74 estimates that the second air valve 33 and the air compressor 43 are normal. By contrast, when the absolute value of the difference between the peak value of the primary side pressure and the second bubbling pressure, the absolute value being extracted as the change information in Step S41, is larger than the error, it is presumed that the inflow amount of air for use in the water conduit bubbling step is in an abnormal state. Therefore, in this case, the estimation unit 74 estimates that one or more devices of the second air valve 33 and the air compressor 43 are abnormal.

In Step S43, the estimation unit 74 outputs, as information indicating a result of the estimation, information indicating that the second air valve 33 and the air compressor 43 are normal or information indicating that one or more devices of the second air valve 33 and the air compressor 43 are abnormal, the information being estimated in Step S42.

In the air diffuser bubbling step and the water conduit bubbling step, when the amount of the air to flow into the raw water space S1 of the housing 12 is excessively increased, the hollow fiber membranes 11 are easily entangled, which may cause breakage of the hollow fiber membranes 11 and a decrease in filtration capacity. In addition, the flow rate of the air for use in the air diffuser bubbling step and the water conduit bubbling step is in general visually monitored by a person. Therefore, the present configuration is useful in that the flow rate of the air for use in the air diffuser bubbling step and the water conduit bubbling step and presence or absence of abnormality of the device for supplying the air can be remotely monitored.

Second Embodiment

Next, a configuration of a water treatment device 1 according to a second embodiment of the present invention will be described. Although the second embodiment is basically the same as the first embodiment, it is different from the first embodiment in that the control unit 72 controls execution of the chemical washing of the hollow fiber membrane module 10, and the estimation unit 74 estimates an effect of the chemical washing or a length of a time of a chemical solution immersion step performed during the chemical washing. In the following, only differences from the first embodiment will be described.

Figure 18:
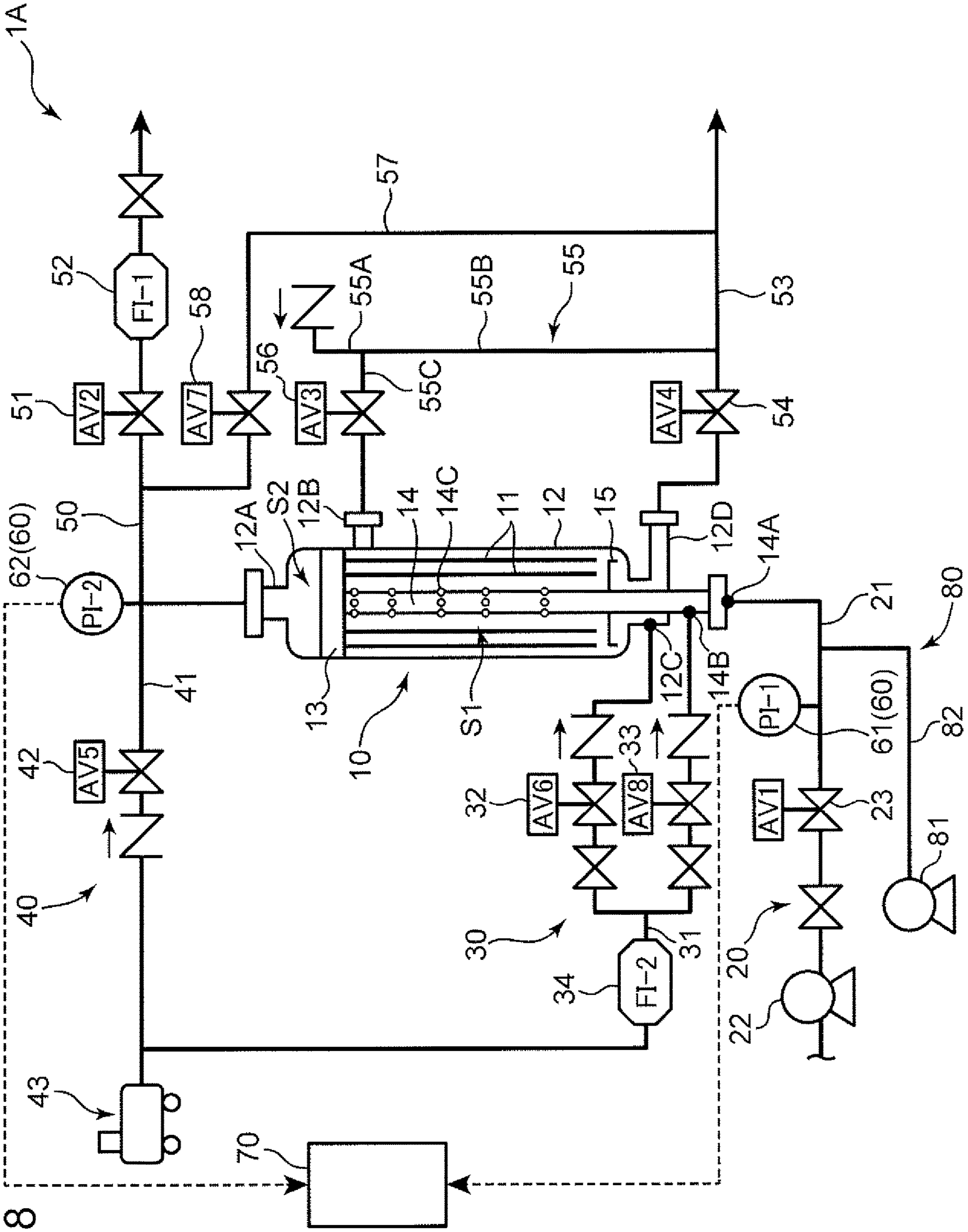
FIG. 18 is a diagram schematically showing a modified configuration of the water treatment device.

First, the chemical washing of the hollow fiber membrane module 10 will be described with reference to FIGS. 18 and 19, in the chemical washing, suspended components deposited on the hollow fiber membrane 11 are dissolved by immersion in a chemical solution. As shown in FIG. 18, a water treatment device 1A according to the second embodiment further includes a chemical solution supply unit 80 in addition to the configuration of the first embodiment. The chemical solution supply unit 80 includes a chemical solution pump 81 and a chemical solution pipe 82. The chemical solution pipe 82 has an upstream end side on which the chemical solution pump 81 is installed, and a downstream end connected to a part of the raw water pipe 21 on a downstream side of the raw water valve 23.

FIG. 19 shows an on/off state of the raw water pump 22 and the chemical solution pump 81 and an open/shut state of each valve in each step in the chemical washing. A circle in FIG. 19 indicates the on state of the pump or the open state of the valve, and a blank indicates the off state of the pump or the shut state of the valve. As illustrated in FIG. 19, in accordance with the sequence information stored in the storage unit 71, the control unit 72 executes, in the chemical washing, each step in the order of a chemical solution injection step, the water filling step, the chemical solution immersion step, an air bubbling step, the draining step, the pressure relieving step, the water filling step, the air bubbling step, the draining step, and the pressure relieving step.

First, in the chemical solution injection step, the chemical solution pump 81 is operated, and the raw water valve 23 and the air vent valve 56 are opened. As a result, the chemical solution is supplied to the raw water space S1 of the housing 12. Although a kind of chemical solution is not particularly limited, for example, an oxidant, an alkali agent, a surfactant, a chelating agent, or a combination thereof can be used in addition to acids such as sulfuric acid, nitric acid, or hydrochloric acid.

Next; in the water filling step, the chemical solution pump 81 is stopped, and the raw water pump 22 is operated. As a result, the raw water is supplied into the raw water space S1 through the raw water pipe 21 and the water conduit 14.

Next, in the chemical solution immersion step, the raw water pump 22 is stopped and the raw water valve 23 is shut to wait for a predetermined time. Thus, the hollow fiber membranes 11 are held in the raw water containing the chemical solution for a predetermined time.

Next, in the air bubbling step, the first air valve 32 is opened. As a result, the hollow fiber membrane 11 is washed by bubbling in a state where the raw water space S1 is full of the raw water containing the chemical solution.

Next, in the draining step, the air vent valve 56 and the first air valve 32 are shut, and the drain valve 54 and the second air valve 33 are opened. As a result, the raw water containing the chemical solution and the suspended components is pushed by air and discharged to the outside of the housing 12. In the subsequent pressure relieving step, the second air valve 33 is shut while the drain valve 54 is kept open, and the inside of the housing 12 (the raw water space S1) is depressurized.

Next, in the water filling step, the raw water pump 22 is operated, while the drain valve 54 is shut and the raw water valve 23 and the air vent valve 56 are opened similarly to the above. This brings the raw water space S1 to be full of the raw water again.

Next, in the air bubbling step, the raw water pump 22 is stopped, the raw water valve 23 is shut, and the first air valve 32 is opened. As a result, air is supplied into the housing 12, and the air is diffused upward toward the hollow fiber membrane 11 by the air diffuser 15.

Next, in the draining step, the air vent valve 56 and the first air valve 32 are shut, and the drain valve 54 and the second air valve 33 are opened. As a result, the water in the raw water space S1 is pushed by the air out to the outside of the housing 12. Thereafter, in the pressure relieving step, only the second air valve 33 is shut, and the inside of the raw water space S1 is depressurized. Note that the last four steps (water filling to pressure relieving) in FIG. 19 are repeated a predetermined number of times until the chemical solution in the housing 12 is sufficiently discharged.

As described above, the control unit 72 executes the chemical washing of the hollow fiber membrane module 10. Note that when repeating the filtration process, the control unit 72 may execute the chemical washing at a predetermined frequency, for example, at a frequency of once a day, once a week, once a month, or the like, or may execute the chemical washing according to operation of the control device 70 by a user.

The estimation unit 74 in the second embodiment refers to the pressure logging data stored in the storage unit 71 during the backwashing steps before and after the chemical washing, and estimates an effect of the chemical washing based on a difference, in the backwashing steps before and after the chemical washing, in a time from the start of the backwashing step until the pressure on the primary side stabilizes at the end pressure indicating the end of the pushing out of the treated water on the secondary side.

Specifically, similarly to the estimation processing described in [Estimation of Effect of Physical Washing or Future Increase in Membrane Differential Pressure (1)] in the first embodiment, the estimation unit 74 performs the estimation processing illustrated in FIG. 5 to perform the estimation. Specifically, in Step S51, the estimation unit 74 refers to the pressure logging data stored in the storage unit 71 during the backwashing step before the chemical washing to extract a time (e.g., t121 in FIG. 12) from the start of the backwashing step until the pressure on the primary side stabilizes at the end pressure as the first change information.

In Step S52, with reference to the pressure logging data stored in the storage unit 71 during the backwashing step after the chemical washing, a time (e.g., t122 in FIG. 12) from the start of the backwashing step until the pressure on the primary side stabilizes at the end pressure is extracted as the second change information.

In Step S53, the estimation unit 74 acquires, as a difference between the first change information and the second change information, a result of a subtraction (e.g., t122−t121) of the time (e.g., t121) extracted as the first change information in Step S51 from the time (e.g., t122) extracted as the second change information in Step S52.

In Step S54, when the difference acquired in Step S53 is a positive value, the estimation unit 74 estimates that the clogging of the hollow fiber membrane 11 has progressed and the permeation resistance of the hollow fiber membrane 11 has increased, i.e., that the effect of the chemical washing is insufficient. By contrast, when the difference acquired in Step S53 is a negative value, the estimation unit 74 estimates that the clogging of the hollow fiber membrane 11 has been eliminated and the permeation resistance of the hollow fiber membrane 11 has decreased, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

Alternatively, the estimation unit 74 may refer to the pressure logging data stored in the storage unit 71 during the backwashing steps before and after the chemical washing, and estimate an effect of the chemical washing based on a difference, in the backwashing steps before and after the chemical washing, in a pressure (peak) at the reaching point of the pressure on the primary side that has instantaneously increased immediately after the start of the backwashing step.

Specifically, similarly to the estimation processing described in [Estimation of Effect of Physical Washing or Future Increase in Membrane Differential Pressure (2)] in the first embodiment, the estimation unit 74 performs the estimation processing illustrated in FIG. 5 to perform the estimation. In other words, in Step S51, the estimation unit 74 refers to the pressure logging data stored in the storage unit 71 during the backwashing step before the chemical washing to extract the peak value (e.g., P121 in FIG. 12) of the pressure on the primary side immediately after the start of the backwashing step as the first change information.

In Step S52, the estimation unit 74 refers to the pressure logging data stored in the storage unit 71 during the backwashing step after the chemical washing to extract the peak value (e.g., P122 in FIG. 12) of the pressure on the primary side immediately after the start of the backwashing step as the second change information.

In Step S53, the estimation unit 74 acquires, as a difference between the first change information and the second change information, a result of a subtraction (e.g., P122-P121) of the peak value (e.g., P121 in FIG. 12) of the pressure on the primary side extracted as the first change information in Step S51 from the peak value (e.g., P122 in FIG. 12) of the pressure on the primary side extracted as the second change information in Step S52.

In Step S54, when the difference acquired in Step S53 is a negative value, the estimation unit 74 estimates that the clogging of the hollow fiber membrane 11 has progressed, i.e., that the effect of the chemical washing is insufficient. By contrast, when the difference acquired in Step S53 is a positive value, the estimation unit 74 estimates that the clogging of the hollow fiber membrane 11 has been eliminated, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

Alternatively, the estimation unit 74 may refer to the pressure logging data stored in the storage unit 71 during the backwashing steps before and after the chemical washing, and estimate an effect of the chemical washing based on a difference, in the backwashing steps before and after the chemical washing, a time from the start of the backwashing step until the pressure on the secondary side stabilizes at the air pressure.

Specifically, similarly to the estimation processing described in [Estimation of Effect of Physical Washing or Future Increase in Membrane Differential Pressure (3)] in the first embodiment, the estimation unit 74 performs the estimation processing illustrated in FIG. 5 to perform the estimation. In other words in Step S51, the estimation unit 74 refers to the pressure logging data stored in the storage unit 71 during the backwashing step before the chemical washing to extract a time (e.g., t131 in FIG. 13) from the start of the backwashing step until the pressure on the secondary side stabilizes at the air pressure as the first change information. In Step S52, with reference to the pressure logging data stored in the storage unit 71 during the backwashing step after the chemical washing, a time (e.g., t132 in FIG. 13) from the start of the backwashing step until the pressure on the secondary side stabilizes at the end pressure is extracted as the second change information.

In Step S53, the estimation unit 74 acquires, as a difference between the first change information and the second change information, a result of a subtraction (e.g., t132–t131) of the time (e.g., t131) extracted as the first change information in Step S51 from the time (e.g., t132) extracted as the second change information in Step S52.

In Step S54, when the difference acquired in Step S53 is a positive value, the estimation unit 74 estimates that the clogging of the hollow fiber membrane 11 has progressed, i.e., that the effect of the chemical washing is insufficient. By contrast, when the difference acquired in Step S53 is a negative value, the estimation unit 74 estimates that the clogging of the hollow fiber membrane 11 has been eliminated, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

Alternatively, the estimation unit 74 may refer to the pressure logging data stored in the storage unit 71 during the backwashing steps before and after the chemical washing, and estimate an effect of the chemical washing based on a difference, between the backwashing steps before and after the chemical washing, in a pressure (peak) at the reaching point of the pressure on the secondary side that has instantaneously increased immediately after the start of the backwashing step.

Specifically, similarly to the estimation processing described in [Estimation of Effect of Physical Washing or Future Increase in Membrane Differential Pressure (4)] in the first embodiment, the estimation unit 74 performs the estimation processing illustrated in FIG. 5 to perform the estimation. In other words, in Step S51, the estimation unit 74 refers to the pressure logging data stored in the storage unit 71 during the backwashing step before the chemical washing to extract the peak value (e.g., P131 in FIG. 13) of the pressure on the secondary side that has instantaneously increased immediately after the start of the backwashing step as the first change information.

In Step S52, the estimation unit 74 refers to the pressure logging data stored in the storage unit 71 during the backwashing step after the chemical washing to extract the peak value (e.g., P132 in FIG. 13) of the pressure on the secondary side that has instantaneously increased immediately after the start of the backwashing step as the second change information.

In Step S53, the estimation unit 74 acquires, as a difference between the first change information and the second change information, a result of a subtraction (e.g., P132-P131) of the peak value (e.g., P131 in FIG. 13) of the pressure on the secondary side extracted as the first change information in Step S51 from the peak value (e.g., P132 in FIG. 13) of the pressure on the secondary side extracted as the second change information in Step S52.

In Step S54, when the difference acquired in Step S53 is a positive value, the estimation unit 74 estimates that the clogging of the hollow fiber membrane 11 has progressed, i.e., that the effect of the chemical washing is insufficient. By contrast, when the difference acquired in Step S53 is a negative value, the estimation unit 74 estimates that the clogging of the hollow fiber membrane 11 has been eliminated, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

Alternatively, the estimation unit 74 may refer to the pressure logging data stored in the storage unit 71 during the backwashing steps before and after the chemical washing, and with respect to the backwashing steps before and after the chemical washing, calculate an integral value of a difference between the pressure on the secondary side and the pressure on the primary side in any one of the time (the first target time) from the start of the backwashing step until the pressure on the primary side or the secondary side that has instantaneously increased immediately after the start of the backwashing step reaches the reaching point, the time (the second target time) from when the pressure on the primary side or the secondary side that has instantaneously increased immediately after the start of the backwashing step reaches the reaching point until when the pressure on the primary side or the secondary side stabilizes, and the time (the third target time) from the start time point of the backwashing step until when the pressure on the primary side or the secondary side stabilizes. Then, the estimation unit 74 may estimate an effect of the chemical washing based on a difference in the integral value between the backwashing steps before and after the chemical washing.

Specifically, similarly to the estimation processing described in [Estimation of Effect of Physical Washing or Future Increase in Membrane Differential Pressure (5)] in the first embodiment, the estimation unit 74 performs the estimation processing illustrated in FIG. 5 to perform the estimation. In other words, in Step S51, the estimation unit 74 refers to the pressure logging data on the primary side and the secondary side stored in the storage unit 71 during the backwashing step before the chemical washing. Then, the estimation unit 74 extracts, as the first change information, the integral value calculated using any one of the first target time, the second target time, and the third target time in the backwashing step as the target time.

In Step S52, the estimation unit 74 refers to the pressures logging data on the primary side and the secondary side stored in the storage unit 71 during the backwashing step after the chemical washing. Then, as the second change information, the estimation unit 74 extracts the integral value calculated using, as the target time, a time which is the same as the time considered as the target time in Step S51, among the first target time, the second target time, and the third target time in the backwashing step.

In Step S53, the estimation unit 74 acquires, as a difference between the first change information and the second change information, a result of a subtraction of the integral value extracted as the first change information in Step S51 from the integral value extracted as the second change information in Step S52.

In Step S54, when the difference acquired in Step S53 is a positive value, the estimation unit 74 estimates that the degree of progress of the clogging of the hollow fiber membrane 11 has increased, i.e., that the effect of the chemical washing is insufficient. By contrast, when the difference acquired in Step S53 is a negative value, the estimation unit 74 estimates that the degree of progress of the clogging of the hollow fiber membrane 11 has decreased, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

In addition, the estimation unit 74 may refer to the pressure logging data stored in the storage unit 71 during the backwashing steps before and after the chemical washing, and detect, with respect to the backwashing steps before and after the chemical washing, a reaching point of any one of the pressures on the primary side and the secondary side that has instantaneously increased immediately after the start of the backwashing step. Then, the estimation unit 74 may estimate an effect of the chemical washing based on a difference, between the backwashing steps before and after the chemical washing, in a difference between the pressure on the secondary side and the pressure on the primary side at a time point at which the any one of the pressures reaches the reaching point.

Specifically, similarly to the estimation processing described in [Estimation of Degree of Progress of Clogging, Effect of Physical Washing or Future Increase in Membrane Differential Pressure] in the first embodiment, the estimation unit 74 performs the estimation processing illustrated in FIG. 5 to perform the estimation. In other words, in Step S51, the estimation unit 74 refers to the pressure logging data on the primary side and the secondary side stored in the storage unit 71 during the backwashing step before the chemical washing. Then, the estimation unit 74 detects a peak value of any one of the pressures on the primary side and the secondary side immediately after the start of the backwashing step. Then, the estimation unit 74 extracts, as the first change information, a difference between the pressure on the secondary side and the pressure on the primary side at a time point at which the any one of the pressures reaches the peak value.

In Step S52, the estimation unit 74 refers to the pressures logging data on the primary side and the secondary side stored in the storage unit 71 during the backwashing step after the chemical washing. Then, the estimation unit 74 detects a peak value of the same pressure (hereinafter referred to as second target pressure) as the above one of the pressures immediately after the start of the backwashing step in the same manner as in Step S51. Then, the estimation unit 74 extracts, as the second change information, a difference between the pressure on the secondary side and the pressure on the primary side at a point at which the second target pressure reaches the peak value.

In Step S53, the estimation unit 74 acquires, as a difference between the first change information and the second change information, a result of a subtraction of the difference between the pressure on the secondary side and the pressure on the primary side extracted as the first change information in Step S51 from the difference between the pressure on the secondary side and the pressure on the primary side extracted as the second change information in Step S52.

In Step S54, when the difference acquired in Step S53 is a positive value, the estimation unit 74 estimates that the clogging of the hollow fiber membrane 11 has progressed and the permeation resistance of the hollow fiber membrane 11 has increased, i.e., that the effect of the chemical washing is insufficient. By contrast, when the difference acquired in Step S53 is a negative value, the estimation unit 74 estimates that the clogging of the hollow fiber membrane 11 has been eliminated and the permeation resistance of the hollow fiber membrane 11 has decreased, i.e., that the effect of the chemical washing is sufficient.

In Step S55, as information indicating a result of the estimation, the estimation unit 74 outputs information indicating whether the effect of the chemical washing is insufficient or sufficient estimated in Step S54.

Note that the timing at which the estimation unit 74 estimates an effect of the chemical washing as described above is not particularly limited, and for example, the estimation may be performed every time the chemical washing is performed, or the estimation may be performed every time the chemical washing is repeated a plurality of times (e.g., twice). Alternatively, the estimation unit 74 may estimate an effect of the chemical washing at a predetermined frequency such as once a week, once a month, or the like. The frequency need only be appropriately determined according to a kind of raw water (e.g., river water, drainage water, or sewage water), season, and the like.

In the chemical solution injection step, instead of injecting the chemical solution from the primary side of the hollow fiber membrane module 10, the chemical solution may be injected from the secondary side of the hollow fiber membrane module 10, and be pushed out from the secondary side to the primary side.

In addition, the pressure logging data for use by the estimation unit 74 to estimate an effect of the chemical washing is not limited to the pressure logging data stored in the storage unit 71 during one backwashing step each before and after the chemical washing. For example, it may be an average value of the pressure logging data stored in the storage unit 71 during as many the backwashing steps as a predetermined number of times or as a predetermined number of days each before and after the chemical washing.

When the estimation unit 74 estimates that the effect of the chemical washing is insufficient, the effect of the chemical washing may be enhanced by, for example, increasing a concentration of the chemical solution at the time of the chemical washing or by extending an immersion time of the hollow fiber membrane 11 in the chemical solution. In addition, the effect of the chemical washing may be enhanced by adjusting temperature of the chemical solution, presence or absence of bubbling during the chemical solution immersion, presence or absence of circulation of the chemical solution, and the like. When the estimation unit 74 estimates that the effect of the chemical washing is insufficient, the effect of the chemical washing may be enhanced by putting off timing of changing a kind of chemical solution.

Although in the above, the description has been made of the example in which the estimation unit 74 estimates an effect of the chemical washing, the estimation unit 74 may estimate a length of a time of the chemical solution immersion step of the hollow fiber membrane module 10 based on the estimated time of the backwashing step.

Specifically, the estimation unit 74 may perform estimation processing of estimating a time required for the backwashing step performed before the chemical solution immersion step and estimation processing of estimating a time required for the backwashing step performed after the chemical solution immersion step, similarly to the estimation processing described in [Estimation of Time Required for Backwashing Step] in the first embodiment. Then, in a case where the time required for the backwashing step performed after the chemical solution immersion step is equal to or longer than the time required for the backwashing step performed before the chemical solution immersion step, the estimation unit 74 may estimate that the time of the chemical solution immersion step (the time of the chemical solution immersion step in FIG. 17) is shorter than a desired time length. In this case, the estimation unit 74 may output information indicating that the time of the chemical solution immersion step is shorter than the desired time length as information indicating a result of the estimation.

By contrast, in a case where the time required for the backwashing step performed after the chemical solution immersion step is shorter than the time required for the backwashing step performed before the chemical solution immersion step, the estimation unit 74 may estimate that the time of the chemical solution immersion step is longer than the desired time length. In this case, the estimation unit 74 may output information indicating that the time of the chemical solution immersion step is longer than the desired time length as information indicating a result of the estimation.

According to the present configuration, it is possible to optimize a time of the chemical solution immersion step so as to increase an operation rate of filtration operation and a recovery rate of the treated water while securing a washing effect of the chemical washing.

Third Embodiment

Next, a configuration of a water treatment device 1 according to a third embodiment of the present invention will be described. Although the third embodiment is basically similar to the first embodiment or the second embodiment, it is different from the first embodiment and the second embodiment in contents notified by the notification unit 75. In the following, only differences from the first embodiment and the second embodiment will be described.

After the start of the filtration process, at the end of each step, the control unit 72 causes the estimation unit 74 to estimate whether or not the internal state of the hollow fiber membrane module 10 or the air compressor 43 has abnormality based on the pressure logging data stored in the storage unit 71 by the measurement unit 60 in each step. Note that the pressure logging data stored in the storage unit 71 by the measurement unit 60 in each step also includes the pressure logging data previously stored in the storage unit 71 by the measurement unit 60 in the same step as each step.

In accordance with this, when the estimation unit 74 estimates that the internal state of the hollow fiber membrane module 10 or the air compressor 43 has abnormality, the notification unit 75 notifies a content of the abnormality. When the notification unit 75 notifies the content of the abnormality, the control unit 72 ends the filtration process being executed.

Specifically, the estimation unit 74 estimates whether or not the internal state of the hollow fiber membrane module 10 has abnormality at the end of the first water filling step and the draining step, for example, in a manner as follows.

At the end of the first water filling step, the estimation unit 74 may perform estimation processing of estimating a time required for the last first water filling step and estimation processing of estimating a time required for the current first water filling step, similarly to the estimation processing described in [Estimation of Time Required for First Water Filling Step] in the first embodiment. As a result, when the time required for the current first water filling step is shorter than the time required for the last first water filling step, it is presumed that the suspended components accumulated on the surface of the hollow fiber membrane 11 tend to increase. Accordingly, in this case, the estimation unit 74 estimates that the internal state of the hollow fiber membrane module 10 has abnormality. In the other cases, the estimation unit 74 estimates that the internal state of the hollow fiber membrane module 10 has no abnormality.

The present invention is not, however, limited thereto, and the estimation unit 74 may perform the estimation processing of estimating a time required for the first water filling step performed in the past and the estimation processing of estimating a time required for the current first water filling step at the end of the first water filling step, similarly to the above. As a result, when the time required for the current first water filling step is shorter than the time required for the first water filling step performed in the past, it is presumed that the suspended components accumulated on the surface of the hollow fiber membrane 11 tend to increase. Accordingly, in this case, the estimation unit 74 may estimate that the internal state of the hollow fiber membrane module 10 has abnormality.

Similarly, at the end of the draining step, the estimation unit 74 may perform estimation processing of estimating a time required for the last draining step and estimation processing of estimating a time required for the current draining step, similarly to the estimation processing described in [Estimation of Time Required for Draining Step] in the first embodiment. As a result, when the time required for the current draining step is shorter than the time required for the last draining step, it is presumed that the suspended components accumulated on the surface of the hollow fiber membrane 11 tend to increase. Accordingly, in this case, the estimation unit 74 estimates that the internal state of the hollow fiber membrane module 10 has abnormality.

Note that the present invention is not, however, limited thereto, and the estimation unit 74 may perform estimation processing of estimating a time required for the draining step performed in the past and the estimation processing of estimating a time required for the current draining step at the end of the draining step, similarly to the above. As a result, when the time required for the current draining step is shorter than the time required for the draining step performed in the past, it is presumed that the suspended components accumulated on the surface of the hollow fiber membrane 11 tend to increase. Accordingly, in this case, the estimation unit 74 may estimate that the internal state of the hollow fiber membrane module 10 has abnormality.

Note that in the above, the description has been made of the example in which the estimation unit 74 estimates whether or not the hollow fiber membrane module 10 has abnormality inside based on the times required for the current and the past first water filling steps estimated at the end of the first water filling step.

The present invention is not, however, limited thereto, and the estimation unit 74 may estimate only the time required for the current first water filling step at the end of the first water filling step. Also when the estimated time is shorter than a time required for the first water filling step determined in advance based on an experimental value or the like, it is presumed that an excessive amount of the suspended components is accumulated on the surface of the hollow fiber membrane 11. Accordingly, in this case, the estimation unit 74 may estimate that the hollow fiber membrane module 10 has abnormality inside.

Similarly, the estimation unit 74 may estimate only the time required for the current draining step at the end of the draining step. Also when the estimated time is shorter than the time required for the draining step determined in advance based on an experimental value or the like, it is presumed that an excessive amount of the suspended components is accumulated on the surface of the hollow fiber membrane 11. Accordingly, in this case, the estimation unit 74 may estimate that the hollow fiber membrane module 10 has abnormality inside.

When estimating that the internal state of the hollow fiber membrane module 10 is abnormal as described above, the estimation unit 74 outputs information indicating that the internal state of the hollow fiber membrane module 10 is abnormal as information indicating a result of the estimation. At the same time, the estimation unit 74 outputs information indicating that the suspended components accumulated on the surface of the hollow fiber membrane 11 tend to increase as information indicating a content of the abnormality. Then, the notification unit 75 notifies the information indicating the result of the estimation and the information indicating the content of the abnormality.

Note that the notification unit 75 may further notify information urging reinforcement of the physical washing. Alternatively, in these cases, after the notification unit 75 notifies the information indicating the content of the abnormality, the control unit 72 may refrain from ending the filtration process being executed. Then, the control unit 72 may automatically enhance the physical washing of the hollow fiber membrane module 10 or perform the chemical washing.

In the above, the description has been made of the example in which the estimation unit 74 estimates whether or not the internal state of the hollow fiber membrane module 10 has abnormality at the end of the first water filling step and the draining step. At the end of the backwashing step, the estimation unit 74 estimates whether or not the internal state of the hollow fiber membrane module 10 has abnormality, for example, in a manner as follows.

At the end of the backwashing step, the estimation unit 74 performs the estimation processing described in [Estimation of Blockage Degree of Hollow Fiber Membrane 11 (1)] in the first embodiment. As a result, when estimating that a blockage degree of the hollow fiber membranes 11 is very large state, the estimation unit 74 estimates that the internal state of the hollow fiber membrane module 10 has abnormality.

When estimating that the internal state of the hollow fiber membrane module 10 is abnormal, the estimation unit 74 outputs the information indicating that the internal state of the hollow fiber membrane module 10 is abnormal as information indicating a result of the estimation. At the same time, the estimation unit 74 outputs information indicating that the blockage degree of the hollow fiber membrane 11 tends to increase as the information indicating a content of the abnormality. Then, the notification unit 75 notifies the information indicating the result of the estimation and the information indicating the content of the abnormality.

Note that the notification unit 75 may further notify information urging execution of the chemical washing. Alternatively, in these cases, after the notification unit 75 notifies the content of the abnormality, the control unit 72 may refrain from ending the filtration process being executed. Then, the control unit 72 may automatically perform enhancement of the physical washing of the hollow fiber membrane module 10 or perform the chemical washing.

Note that a method of estimating whether or not the internal state of the hollow fiber membrane module 10 is abnormal by the estimation unit 74 at the end of the backwashing step is not limited to the above method.

For example, at the end of the backwashing step, the estimation unit 74 may perform the estimation processing described in [Estimation of Magnitude of Pipeline Resistance] in the first embodiment. As a result, when the estimation unit 74 estimates that the drain pipe 53 has a very high pipeline resistance, it is presumed that contamination in the drain pipe 53 tends to increase. Accordingly, in this case, the estimation unit 74 may estimate that the internal state of the hollow fiber membrane module 10 has abnormality.

In this case, the estimation unit 74 need only output the information indicating that the internal state of the hollow fiber membrane module 10 is abnormal as information indicating a result of the estimation, and may output information indicating that contamination in the drain pipe 53 tends to increase as the information indicating a content of the abnormality. Then, the notification unit 75 need only notify the information indicating the result of the estimation and the information indicating the content of the abnormality.

At the end of the backwashing step, the estimation unit 74 may perform the same processing as in Steps S41 and S42 of the estimation processing described in [Estimation of Presence or Absence of Leak of Hollow Fiber Membrane 11] in the first embodiment to extract an absolute value of a difference between the pressure on the secondary side, having stabilized in the current backwashing step, and the air pressure. Then, it is assumed that the absolute value of the difference between the pressure on the secondary side, having stabilized in the current backwashing step, and the air pressure is larger than that obtained when the estimation unit 74 estimated that the hollow fiber membrane 11 had leak last time. In this case, since it is presumed that the leak of the hollow fiber membrane 11 tends to increase, the estimation unit 74 may estimate that the internal state of the hollow fiber membrane module 10 has abnormality.

Note that the present invention is not limited thereto, and at the end of the backwashing step, the estimation unit 74 may further perform the same processing as in Steps S41 and S42 of the estimation processing described in [Estimation of Presence or Absence of Leak of Hollow Fiber Membrane 11] in the first embodiment to extract an absolute value of a difference between the pressure on the secondary side, having stabilized in the last backwashing step, and the air pressure. As a result, when the absolute value of the difference between the pressure on the secondary side, having stabilized in the current backwashing step, and the air pressure is larger than a difference in the last backwashing step, it is presumed that the leak generated in the hollow fiber membrane 11 tends to increase. Accordingly, in this case, the estimation unit 74 may estimate that the internal state of the hollow fiber membrane module 10 has abnormality.

In these cases, the estimation unit 74 need only output the information indicating that the internal state of the hollow fiber membrane module 10 is abnormal as the information indicating a result of the estimation, and may output the information indicating that the leak generated in the hollow fiber membrane 11 tends to increase as the information indicating a content of the abnormality. Then, the notification unit 75 need only notify the information indicating the result of the estimation and the information indicating the content of the abnormality.

In the above, the description has been made of the example in which the estimation unit 74 estimates whether or not the internal state of the hollow fiber membrane module 10 has abnormality at the end of the first water filling step, the draining step, and the backwashing step. At the end of the air diffuser bubbling and the water conduit bubbling, the estimation unit 74 estimates whether or not the peripheral device of the hollow fiber membrane module 10 has abnormality by the method described in the first embodiment.

Specifically, at the end of the air diffuser bubbling step, the estimation unit 74 performs the estimation processing described in [Estimation of Abnormality of Peripheral Device during Air Diffuser Bubbling Step] in the first embodiment. As a result, it is assumed that the estimation unit 74 estimates that one or more devices of the first air valve 32 and the air compressor 43 are abnormal. In this case, the estimation unit 74 outputs information indicating that one or more devices have abnormality as information indicating a result of the estimation. At the same time, the estimation unit 74 outputs information indicating that the pressure on the primary side in the air diffuser bubbling step has abnormality due to occurrence of abnormality in the one or more devices as the information indicating a content of the abnormality. Then, the notification unit 75 notifies the information indicating the result of the estimation and the information indicating the content of the abnormality.

Similarly, at the end of the water conduit bubbling step, the estimation unit 74 performs the estimation processing described in [Estimation of Abnormality of Peripheral Device during Water Conduit Bubbling Step] in the first embodiment. As a result, it is assumed that the estimation unit 74 estimates that one or more devices of the second air valve 33 and the air compressor 43 are abnormal. In this case, the estimation unit 74 outputs information indicating that one or more devices have abnormality as information indicating a result of the estimation. At the same time, the estimation unit 74 outputs information indicating that the pressure on the primary side in the water conduit bubbling step has abnormality due to occurrence of abnormality in the one or more devices as the information indicating a content of the abnormality. Then, the notification unit 75 notifies the information indicating the result of the estimation and the information indicating the content of the abnormality.

According to the third embodiment, without going to an installation place of the hollow fiber membrane module 10, it is possible to grasp a content of abnormality occurring inside the hollow fiber membrane module 10 or in the peripheral device of the hollow fiber membrane module 10 from the content notified by the notification unit 75.

Fourth Embodiment

Next, a water treatment device 1 according to a fourth embodiment of the present invention will be described. The fourth embodiment is basically similar to the first embodiment, the second embodiment, or the third embodiment. The fourth embodiment is, however, different from the first embodiment, the second embodiment, and the third embodiment in that the control device 70 further includes a setting change unit 76 that changes a set time of the at least one step based on an estimated time obtained by the estimation unit 74 as indicated by a chain line part in FIG. 2. In the following, only differences from the first embodiment, the second embodiment, and the third embodiment will be described.

Specifically, the setting change unit 76 is configured by a microcomputer including a CPU, a RAM, a ROM, and the like. Note that two or more of the control unit 72, the measurement control unit 73, the estimation unit 74, the notification unit 75, and the setting change unit 76 may be configured by the same microcomputer. Alternatively, each of the control unit 72, the measurement control unit 73, the estimation unit 74, the notification unit 75, and the setting change unit 76 may be configured by a separate microcomputer.

In the fourth embodiment, the control unit 72 causes the estimation unit 74 to estimate a time required for each of the first water filling step, the backwashing step, and the draining step after execution of the filtration process (the first water filling step to the pressure relieving step (FIG. 3)) is completed. Based on an estimated time required for each of the first water filling step, the backwashing step, and the draining step by the estimation unit 74, the setting change unit 76 changes a set time of each step.

For example, the setting change unit 76 calculates, at a predetermined frequency, an average value of an estimated time required for the first water filling step estimated by the estimation unit 74 during a predetermined period. The predetermined period may be, for example, a period from a time point at which the last average value of an estimated time is calculated to the present, or may be a period from a time point of installation of the water treatment device 1 or a maintenance end time point of the same to the present. The setting change unit 76 changes the set time for performing the first water filling step included in the step information stored in the storage unit 71 to the average value.

Similarly, the setting change unit 76 changes, at a predetermined frequency, the set time for performing each of the backwashing step and the draining step included in the step information to an average value of an estimated time required for each of the backwashing step and the draining step estimated by the estimation unit 74 during a predetermined period. The predetermined number of times may be once or twice or more.

Note that the method of changing the set time of each step by the setting change unit 76 is not limited to the above. Further, the change of the set time is not exclusively performed automatically by the setting change unit 76, and may be manually performed by the user.

According to the present configuration, based on an estimated time required for each of the first water filling step, the backwashing step, and the draining step estimated by the estimation unit 74, a time of each step can be set again. This enables reduction of an extra step time. It is accordingly possible to increase the operation rate of the filtration operation while suppressing cost and labor.

The measurement unit 60 may repeatedly measure the pressures on the primary side and the secondary side of the hollow fiber membrane module 10 at intervals of three seconds or less not only in the first water filling step, the backwashing step, and the draining step but also in the backwashing preparation step, the air venting step, and the pressure relieving step. Then, the estimation unit 74 may estimate a time required from the start to the end of each of the backwashing preparation step, the air venting step, and the pressure relieving step based on a temporal transition of the measurement result.

Specifically, the estimation unit 74 need only estimate a time from the start of each step of the backwashing preparation step, the air venting step, and the pressure relieving step until the pressure on the primary side or the secondary side becomes zero as a time required for each step. In accordance with this, the setting change unit 76 may change the set time of each of the backwashing preparation step, the air venting step, and the pressure relieving step based on the estimated time required for each of the backwashing preparation step, the air venting step, and the pressure relieving step estimated by the estimation unit 74, similarly to the change of the set time of the first water filling step, the backwashing step, and the draining step.

In addition, the frequency at which the setting change unit 76 automatically changes a set time is not particularly limited, and may be, for example, once an hour, once a day, once a week, or once a month. The frequency is appropriately determined according to a kind of raw water (e.g., river water, drainage water, or sewage water), season, and the like.

In addition, although the setting change unit 76 may change the set time for all of the first water filling step, the backwashing step, and the draining step, the present invention is not limited thereto, and may change the set time for only some steps. A step whose set time is to be changed need only be appropriately determined according to a condition of a work site. For example, in a case where fluctuation of a flow rate of the raw water pump 22 is large or in a case where it is difficult to visually check a condition of the water filled by the raw water pipe 21, it is effective to change the set time of the first water filling step.

In each of the above embodiments, the description has been made of the example in which the measurement unit 60 stores the pressure logging data in the storage unit 71 in all steps in the filtration process. The present invention is not, however, limited thereto, and the measurement control unit 73 may cause the primary side pressure sensor 61 and the secondary side pressure sensor 62 to measure a pressure and store the pressure logging data in the storage unit 71 only in one or more of the first water filling step, the backwashing step, the pressure relieving step, the air diffuser bubbling step, the water conduit bubbling step, and the draining step among all the steps in the filtration process.

In addition, the control device 70 may not include the notification unit 75. In accordance with this, the output information of the estimation unit 74 may be stored in the storage unit 71. This may enable an administrator of the water treatment device 1 to refer to the output information of the estimation unit 74 stored in the storage unit 71 at arbitrary timing.

First Example

Iron chloride simulated water was used as raw water, and filtered using the water treatment device 1 having the configuration shown in FIG. 1. Specifically, each step in Table 1 below was sequentially performed, and then a set time of each step was changed as shown in Table 1 based on an estimated time required for each step which has been estimated by the estimation unit 74. As a result, the operation rate of the filtration operation could be improved by 3.6% while maintaining stable filtration operation.

TABLE 1

| No. | Name of step | Initial set time (seconds) | Set time after change |
|---|---|---|---|
| 1 | First water filling | 15 | 12 |
| 2 | Filtration | 1800 | 1800 |
| 3 | Backwashing preparation | 5 | 2 |
| 4 | Backwashing | 15 | 4 |
| 5 | Air venting | 10 | 5 |
| 6 | Second water filling | 5 | 3 |
| 7 | Air diffusion board bubbling | 60 | 30 |
| 8 | Third water filling | 5 | 3 |
| 9 | Water conduit bubbling | 30 | 20 |
| 10 | Draining | 10 | 5 |
| 11 | Pressure relieving | 5 | 2 |
| | Operation rate (%) | 91.8 | 95.4 |
| | Safe driving | ○ | ○ |

In addition, the permeated liquid was used in the backwashing step, and the respective steps in Table 2 below were sequentially performed. Then, the set time of each step was changed as shown in Table 2 based on the estimated time required for each step which has been estimated by the estimation unit 74. As a result, the operation rate of the filtration operation could be improved by 2.5% while maintaining the stable filtration operation.

TABLE 2

| No. | Name of step | Initial set time (seconds) | Set time after change |
|---|---|---|---|
| 1 | Water filling | 30 | 20 |
| 2 | Filtration | 1800 | 1800 |
| 3 | Backwashing | 30 | 20 |
| 4 | Bubbling | 30 | 15 |
| 5 | Draining | 45 | 30 |
| | Operation rate (%) | 93.0 | 95.5 |
| | Safe driving | ○ | ○ |

Second Example

Industrial water was used as raw water and filtered using the water treatment device 1A having the configuration shown in FIG. 16. Then, a set time of the chemical solution immersion step (immersion of the hollow fiber membrane in water having a sodium hypochlorite concentration of 100 mg/l) was changed as shown in Table 3 based on a fluctuation tendency of the estimated time of the backwashing step which has been estimated by the estimation unit 74. In Table 3, the number of repetitions of a cycle including steps No. 7 to 10 was set to five. By shortening the time of the chemical solution immersion step, the operation rate of the filtration operation could be improved.

TABLE 3

| No. | Name of step | Initial set time (seconds) | Set time after change |
|---|---|---|---|
| 1 | Chemical solution injection | 60 | 60 |
| 2 | Water filling | 15 | 12 |
| 3 | Chemical solution immersion | 600 | 400 |
| 4 | Air bubbling | 60 | 60 |
| 5 | Draining | 10 | 5 |
| 6 | Pressure relieving | 5 | 2 |
| 7 | Water filling | 15 | 12 |
| 8 | Air bubbling | 30 | 30 |
| 9 | Draining | 10 | 5 |
| 10 | Pressure relieving | 5 | 2 |

A chemical solution was injected from the secondary side of the hollow fiber membrane module 10, and the respective steps in Table 4 were sequentially performed to perform the chemical washing. Then, the set time of the chemical solution immersion step was changed as shown in Table 4 based on the fluctuation tendency of the estimated time of the backwashing step which has been estimated by the estimation unit 74. As a result, the time of the chemical solution immersion step could be shortened and the operation rate of the filtration operation could be improved.

TABLE 4

| No. | Name of step | Initial set time (seconds) | Set time after change |
|---|---|---|---|
| 1 | Chemical solution injection | 60 | 60 |
| 2 | Chemical solution immersion | 1200 | 600 |
| 3 | Air bubbling | 60 | 60 |
| 4 | Draining | 45 | 45 |
| 5 | Backwashing | 30 | 30 |
| 6 | Air bubbling | 60 | 60 |
| 7 | Draining | 45 | 45 |
| 8 | Backwashing | 30 | 30 |
| 9 | Air bubbling | 60 | 60 |
| 10 | Draining | 45 | 45 |

It should be understood that the embodiments and examples disclosed herein are illustrative in all respects and are not restrictive. The scope of the present invention is indicated not by the above description but by the claims, and it is intended that meanings equivalent to the claims and all modifications within the scope are included.

Outline of Embodiments

Here, the embodiments will be outlined.

The water treatment device according to the above embodiments is a water treatment device for filtering raw water using a hollow fiber membrane module, and includes a measurement unit and an estimation unit. The measurement unit is configured to repeat measurement of pressures on a primary side and a secondary side of the hollow fiber membrane module every minute time of three seconds or less in one or more of a water filling step, a backwashing step, a pressure relieving step, a bubbling step, and a draining step. The estimation unit is configured to estimate (1) abnormality of an internal state of the hollow fiber membrane module or of a peripheral device of the hollow fiber membrane module, (2) a time required from a start to an end of the one or more steps, (3) an effect of physical washing or chemical washing of the hollow fiber membrane module, or (4) a future increase in an membrane differential pressure of the hollow fiber membrane module, based on a temporal transition of a measurement result of a pressure of at least one of the primary side and the secondary side, or when the one or more steps are performed a plurality of times, based on a difference in the temporal transition between the plurality of times of the step.

The estimation method according to the above embodiments is an estimation method in a water treatment device for filtering raw water using a hollow fiber membrane module, in which a computer of the water treatment device repeats measurement of pressures on a primary side and a secondary side of the hollow fiber membrane module every minute time of three seconds or less in one or more of a water filling step, a backwashing step, a pressure relieving step, a bubbling step, and a draining step. The computer estimates (1) abnormality of an internal state of the hollow fiber membrane module or of a peripheral device of the hollow fiber membrane module, (2) a time required from a start to an end of the one or more steps, (3) an effect of physical washing or chemical washing of the hollow fiber membrane module, or (4) a future increase in an membrane differential pressure of the hollow fiber membrane module, based on a temporal transition of a measurement result of a pressure of at least one of the primary side and the secondary side, or when the one or more steps are performed a plurality of times, based on a difference in the temporal transition between the plurality of times of the step.

According to these configuration, measurement of pressures on the primary side and the secondary side of the hollow fiber membrane module is repeated every minute time of three seconds or less in one or more of the water filling step, the backwashing step, the pressure relieving step, the bubbling step, and the draining step. Therefore, it is possible to grasp a detailed temporal transition of the pressures on the primary side and the secondary side in each of the one or more steps. Accordingly, the above (1) to (4) can be appropriately estimated from a temporal transition of a measurement result of at least one of the pressures on the primary side and the pressure on the secondary side or from a difference in the temporal transition between the plurality of times of the steps. As a result, from the estimation result, it is possible to appropriately grasp a state or abnormality of the hollow fiber membrane module or the peripheral device of the hollow fiber membrane module, a time required for each step, a washing effect of the hollow fiber membrane module, or a future increase in an membrane differential pressure.

In the water treatment device, the water filling step is a step of filling an inside of the hollow fiber membrane module with raw water, and the one or more steps may include the water filling step. Then, the estimation unit may be configured to estimate a time required for the water filling step based on a time from a start of the water filling step to reaching to an inflection point of a change in the pressure on the primary side.

According to this configuration, it is possible to easily estimate the time required for the water filling step without actually measuring a time of the water filling step at a work site. Therefore, it is possible to reduce an extra step time by suppressing cost and effort required for actually measuring a step time of the water filling step and by setting each step time based on an estimated time. It is accordingly possible to increase an operation rate of filtration operation while suppressing cost and labor.

In the water treatment device, the water filling step is a step of filling an inside of the hollow fiber membrane module with raw water, and the one or more steps may include the water filling step. The estimation unit may be configured to estimate an amount of suspended components accumulated on a surface of a hollow fiber membrane based on a time from a start of the water filling step to reaching to an inflection point of a change in the pressure on the primary side.

When the water filling step is started and the raw water flows into the hollow fiber membrane module, the pressure on the primary side gradually increases due to a hydraulic head pressure. Thereafter, when the inside of the hollow fiber membrane module becomes full of water, the raw water flows into the discharge pipe. At that time, since an inner diameter of the discharge pipe is small, pipeline resistance is generated, and the pressure on the primary side rapidly increases. In addition, the more the suspended components on the surface of the hollow fiber membrane are accumulated, the smaller an effective capacity of the inside of the hollow fiber membrane module 10 becomes.

Therefore, according to the present configuration, a time required for the inside of the hollow fiber membrane module to be full of water can be grasped from a time from the start of the water filling step to the reaching to the inflection point of a change in the pressure on the primary side. Then, the shorter the time, the smaller the effective capacity of the inside of the hollow fiber membrane module, i.e., the more appropriately an amount of suspended components accumulated on the surface of the hollow fiber membrane can be estimated.

In the water treatment device, the water filling step is a step of filling an inside of the hollow fiber membrane module with raw water, and the one or more steps may include the water filling step. The measurement unit may be configured to, when the water filling step is performed a plurality of times, repeat the measurement in each of the plurality of times of the water filling step. The estimation unit may be configured to estimate a future increase in the membrane differential pressure based on a difference, between the plurality of times of the water filling step, in a time from a start of the water filling step to reaching to an inflection point of a change in the pressure on the primary side. The water treatment device may further include a notification unit configured to notify a result of the estimation by the estimation unit.

When the water filling step is started and the raw water flows into the hollow fiber membrane module, the pressure on the primary side gradually increases due to a hydraulic head pressure. Thereafter, when the inside of the hollow fiber membrane module nears a full water state, the pressure on the primary side rapidly increases. Accordingly, the time from the start of the water filling step to the reaching to the inflection point of a change in the pressure on the primary side becomes shorter as an accumulation amount of the suspended components inside the hollow fiber membrane module is increased and the effective capacity of the inside the hollow fiber membrane module is decreased.

In addition, for example, it is presumed that the larger the accumulation amount of suspended components in the hollow fiber membrane module and the smaller the effective capacity of the inside of the hollow fiber membrane module, the larger a deposition amount of the suspended components in the hollow fiber membrane, i.e., it is presumed that the membrane differential pressure will increase in the future.

In the water treatment device, in the water filling step, a pressure on the primary side when the inside of the hollow fiber membrane module becomes full of the raw water is intermittently measured. Therefore, in the water treatment device, a transition of the pressure on the primary side of the hollow fiber membrane module according to the accumulation amount of the suspended components inside the hollow fiber membrane module can be measured.

Moreover, in the water treatment device, in each of the plurality of times of the water filling step, the pressure on the primary side of the hollow fiber membrane module is measured at an interval of three seconds or less shorter than a normal measurement interval of the membrane differential pressure in the filtration step. Therefore, a detailed temporal transition of the pressure on the primary side of the hollow fiber membrane module in each water filling step that ends within several minutes can be grasped.

Therefore, from a difference in the detailed temporal transition between the plurality of times of the water filling step, it is possible to grasp a change in the accumulation amount of the suspended components inside the hollow fiber membrane module according to a change in the pressure on the primary side of the hollow fiber membrane module.

Specifically, by a difference, between the plurality of times of the water filling step, in a time from the start time point of the water filling step to the reaching to the inflection point of a change in the pressure on the primary side, it is possible to grasp a change in the accumulation amount of the suspended components in the hollow fiber membrane module and a change in the effective capacity. Therefore, when a situation is grasped where the accumulation amount of the suspended components in the hollow fiber membrane module is increased and the effective capacity of the inside of the hollow fiber membrane module is reduced, it is possible to appropriately estimate a situation where the deposition amount of the suspended components in the hollow fiber membrane has increased, i.e., where the membrane differential pressure will increase in the future. Then, the estimation result can be notified.

In the water treatment device, the draining step is a step of draining drain water containing peeled off suspended components, and the one or more steps may include the draining step. The estimation unit may be configured to estimate a time required for the draining step based on a time from a start of the draining step until the pressure on the primary side stabilizes.

According to this configuration, it is possible to easily estimate a time required for the draining step without actually measuring a time of the draining step at the work site. Therefore, it is possible to reduce an extra process time by suppressing cost and effort required for actually measuring a step time of the draining steps and by setting each step time based on an estimated time. It is accordingly possible to increase an operation rate of filtration operation while suppressing cost and labor.

In the water treatment device, the draining step is a step of draining drain water containing peeled off suspended components, and the one or more steps may include the draining step. The estimation unit may be configured to estimate an amount of suspended components accumulated on the surface of the hollow fiber membrane based on the time from the start of the draining step until the pressure on the primary side stabilizes.

When discharge of the drain water inside the hollow fiber membrane module ends in the draining step, the pressure on the primary side stabilizes. In addition, the more the suspended components are accumulated on the surface of the hollow fiber membrane, the smaller the effective capacity of the inside of the hollow fiber membrane module becomes.

Therefore, according to the present configuration, the time required for discharge of the drain water inside the hollow fiber membrane module to end can be grasped from a time from the start of the draining step until the pressure on the primary side stabilizes. Then, the shorter the time, the smaller the effective capacity inside the hollow fiber membrane module, i.e., the amount of the suspended components accumulated on the surface of the hollow fiber membrane can be appropriately estimated.

In the water treatment device, the draining step is a step of draining drain water containing peeled off suspended components, and the one or more steps may include the draining step. The measurement unit may be configured to, when the draining step is performed a plurality of times, repeat the measurement in each of the plurality of times of the draining step. The estimation unit may be configured to estimate a future increase in the membrane differential pressure based on a difference, between the plurality of times of the draining step, in a time from the start of the draining step until when the pressure on the primary side becomes constant. The water treatment device may further include a notification unit configured to notify a result of the estimation by the estimation unit.

When discharge of the drain water inside the hollow fiber membrane module ends in the draining step, the pressure on the primary side stabilizes. Accordingly, the time from the start of the draining step until the pressure on the primary side becomes constant becomes shorter as the accumulation amount of the suspended components inside the hollow fiber membrane module is increased and the effective capacity of the inside the hollow fiber membrane module is decreased.

In addition, for example, it is presumed that the larger the accumulation amount of suspended components in the hollow fiber membrane module and the smaller the effective capacity of the inside of the hollow fiber membrane module, the larger a deposition amount of the suspended components in the hollow fiber membrane, i.e., it is presumed that the membrane differential pressure will increase in the future.

In the water treatment device, in the draining step, a pressure on the primary side when the drain water inside the hollow fiber membrane module is discharged is intermittently measured. Therefore, in the water treatment device, a transition of the pressure on the primary side of the hollow fiber membrane module according to the accumulation amount of the suspended components inside the hollow fiber membrane module can be measured.

Moreover, in the water treatment device, in each of the plurality of times of the draining step, the pressure on the primary side inside the hollow fiber membrane module is measured at an interval of three seconds or less shorter than the normal measurement interval of the membrane differential pressure in the filtration step. Therefore, a detailed temporal transition of the pressure on the primary side of the hollow fiber membrane module in each draining step that ends within several minutes can be grasped.

Accordingly, from a difference in a detailed temporal transition between the plurality of times of the draining step, it is possible to grasp the change in the accumulation amount of the suspended components inside the hollow fiber membrane module according to a change in the pressure on the primary side of the hollow fiber membrane module.

Specifically, by a difference, between the plurality of times of the draining step, in a time from the start of the draining step until the pressure on the primary side becomes constant, it is possible to grasp a change in the accumulation amount of the suspended components in the hollow fiber membrane module and a change in the effective capacity. Therefore, when a situation is grasped where the accumulation amount of the suspended components in the hollow fiber membrane module is increased and the effective capacity of the inside of the hollow fiber membrane module is reduced, it is possible to appropriately estimate a situation where the deposition amount of the suspended components in the hollow fiber membrane has increased, i.e., where the membrane differential pressure will increase in the future. Then, the estimation result can be notified.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The estimation unit may be configured to estimate a time required for the backwashing step based on a time from a start of the backwashing step until the at least one of the pressures becomes constant or until the at least one pressure reaches a maximum pressure.

According to this configuration, it is possible to easily estimate the time required for the backwashing step without actually measuring the time of the backwashing step at the work site. Therefore, it is possible to reduce the extra step time by suppressing cost and effort required for actually measuring a step time of the backwashing step and by setting each step time based on an estimated time. It is accordingly possible to increase an operation rate of filtration operation while suppressing cost and labor.

In the water treatment device, the backwashing step is a step of pushing out treated water on the secondary side to the primary side by a pressurized medium to peel off suspended components accumulated on a surface of a hollow fiber membrane in the filtration step, and the estimation unit may be configured to estimate a length of a time of a chemical solution immersion step of the hollow fiber membrane module based on an estimated time of the backwashing step.

According to this configuration, since the time of the chemical solution immersion step can be changed to an appropriate time, waste of a washing time of the hollow fiber membrane can be reduced, and the operation rate of the filtration operation can be further increased.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to estimate a blockage degree of the hollow fiber membrane based on a time from a start of the backwashing step until the pressure on the primary side stabilizes at a predetermined end pressure indicating an end of the pushing out of the treated water on the secondary side. Alternatively, the estimation unit may be configured to estimate an effect of the physical washing or the chemical washing, or a future increase in the membrane differential pressure based on a difference, between the plurality of times of the backwashing step, in a time from the start of the backwashing step until the pressure on the primary side stabilizes at the end pressure.

Immediately after the backwashing step is started and the treated water on the secondary side is pushed out to the primary side, the pressure on the primary side instantaneously increases. Thereafter, the larger the blockage degree of the hollow fiber membranes, the slower a speed at which the treated water is pushed out to the primary side and the longer a time required to end the pushing out of the treated water on the secondary side. In other words, the larger the blockage degree of the hollow fiber membrane, the longer the time required from the start of the backwashing step until the pressure on the primary side reaches the predetermined end pressure indicating the end of the pushing out of the treated water on the secondary side.

Therefore, according to the present configuration, the speed at which the treated water is pushed out to the primary side can be grasped from the time required from the start of the backwashing step until the pressure on the primary side reaches the end pressure, and it can be appropriately estimated that the slower the speed, the larger state the blockage degree of the hollow fiber membrane.

Immediately after the backwashing step is started, the pressure on the primary side instantaneously increases. Thereafter, as clogging of the hollow fiber membrane progresses and a permeation resistance of the hollow fiber membrane is increased, the speed at which the treated water is pushed out to the primary side is decreased to make longer a time required to end the pushing out of the treated water on the secondary side.

According to the present configuration, when the backwashing step is performed a plurality of times, the pressure on the primary side of the hollow fiber membrane module is measured at intervals of three seconds or less in each of the plurality of times of the backwashing step. Therefore, it is possible to detect a time from the start time point of each backwashing step until the pressure on the primary side stabilizes at the end pressure. Accordingly, an amount of change in the permeation resistance of the hollow fiber membrane can be grasped from a difference, between the plurality of times of the backwashing step, in a time from the start time of the backwashing step until the pressure on the primary side stabilizes at the end pressure. Then, based on the grasped amount of change in the permeation resistance, it is possible to appropriately estimate an effect of eliminating clogging of the hollow fiber membrane by the physical washing or an effect of dissolving the suspended components deposited on the hollow fiber membrane by the chemical washing. Further, when it is grasped that the permeation resistance of the hollow fiber membrane is increased, it can be appropriately estimated that the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to estimate a magnitude of a pipeline resistance of a drain pipeline on the primary side based on a reaching point of the pressure on the primary side that has instantaneously increased immediately after the start of the backwashing step. Alternatively, the estimation unit may be configured to estimate an effect of the physical washing or the chemical washing, or a future increase in the membrane differential pressure based on a difference in the reaching point between the plurality of times of the backwashing step.

Immediately after the filtered water on the secondary side is pushed out to the primary side after the backwashing step is started, the pressure on the primary side instantaneously increases due to pipeline resistance generated when the raw water on the primary side flows into the drain pipe. In addition, the larger the contamination in the drain pipe, the higher the pipeline resistance when the raw water on the primary side is drained, so that the pressure on the primary side increases.

Therefore, according to the present configuration, it is possible to grasp a magnitude of the pipeline resistance generated when the raw water on the primary side is drained from the drain pipe by the pressure on the primary side that has instantaneously increased immediately after the start of the backwashing step, and to appropriately estimate that the higher the pressure on the primary side, the higher state the pipeline resistance of the drain pipeline on the primary side.

Immediately after the backwashing step is started, the pressure on the primary side instantaneously increases. At this time, the speed at which the treated water on the secondary side is pushed out to the primary side increases and an ultimate pressure on the primary side increases as clogging of the hollow fiber membranes decreases and the permeation resistance of the hollow fiber membranes decreases.

According to the present configuration, when the backwashing step is performed a plurality of times, the pressure on the primary side of the hollow fiber membrane module is measured at intervals of three seconds or less in each of the plurality of times of the backwashing step. Therefore, it is possible to detect the reaching point of the pressure on the primary side that instantaneously increases immediately after the start of each backwashing step. Accordingly, an amount of change in a permeation resistance of the hollow fiber membrane can be grasped from a difference in the reaching point between the plurality of times of the backwashing step. Then, based on the grasped amount of change in the permeation resistance, it is possible to appropriately estimate an effect of eliminating clogging of the hollow fiber membrane by the physical washing or an effect of dissolving the suspended components deposited on the hollow fiber membrane by the chemical washing. Further, when it is grasped that the permeation resistance of the hollow fiber membrane is increased, it can be appropriately estimated that the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to estimate an effect of the physical washing or the chemical washing, or a future increase in the membrane differential pressure based on a difference, between the plurality of times of the backwashing step, in a time from the start of the backwashing step until the pressure on the secondary side stabilizes at a pressure of the medium.

In the backwashing step, when the pushing of the treated water on the secondary side out to the primary side ends, the secondary side is filled state with a pressurized medium, and the pressure on the secondary side stabilizes at the pressure of the medium. Here, as the clogging of the hollow fiber membranes progresses and the permeation resistance of the hollow fiber membrane increases, the time required for all the treated water on the secondary side to be pushed out to the primary side increases.

According to the present configuration, since the pressure on the secondary side of the hollow fiber membrane module is measured at intervals of three seconds or less in each of the plurality of times of the backwashing step, the time from the start of each backwashing step until the pressure on the secondary side stabilizes at the pressure of the medium can be detected. Therefore, according to the present configuration, the amount of change in the permeation resistance of the hollow fiber membrane can be grasped from a difference, between the plurality of times of the backwashing step, in a time from the start time of the backwashing step until the pressure on the secondary side stabilizes at the pressure of the medium. Then, based on the grasped amount of change in the permeation resistance, it is possible to appropriately estimate an effect of eliminating clogging of the hollow fiber membrane by the physical washing or an effect of dissolving the suspended components deposited on the hollow fiber membrane by the chemical washing. Further, when it is grasped that the permeation resistance of the hollow fiber membrane is increased, it can be appropriately estimated that the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to estimate an effect of the physical washing or the chemical washing, or a future increase in the membrane differential pressure based on a difference, between the plurality of times of the backwashing step, in a reaching point of the pressure on the secondary side that has instantaneously increased immediately after a start of the backwashing step.

Immediately after the start of the backwashing step, the treated water on the secondary side is rapidly pushed by the pressurized medium and flows into the primary side. At this time, the permeation of the treated water in the hollow fiber membrane enters a rate-determining step, so that a degree of pressurization of the treated water by the medium becomes larger than a degree of permeation of the treated water to the primary side. Therefore, the pressure on the secondary side instantaneously increases immediately after the start of the backwashing step, and an ultimate pressure on the secondary side at the time of the increase increases as the clogging of the hollow fiber membrane progresses and the permeation resistance of the hollow fiber membranes increases.

According to the present configuration, since the pressure on the secondary side of the hollow fiber membrane module is measured at intervals of three seconds or less in each of the plurality of times of the backwashing step, the reaching point of the pressure on the secondary side that has instantaneously increased immediately after the start of each backwashing step can be detected. Accordingly, an amount of change in a permeation resistance of the hollow fiber membrane can be grasped from a difference in the reaching point between the plurality of times of the backwashing step. Then, based on the grasped amount of change in the permeation resistance, it is possible to appropriately estimate an effect of eliminating clogging of the hollow fiber membrane by the physical washing or an effect of dissolving the suspended components deposited on the hollow fiber membrane by the chemical washing. Further, when it is grasped that the permeation resistance of the hollow fiber membrane is increased, it can be appropriately estimated that the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to detect a reaching point of any one of the pressure on the primary side and the pressure on the secondary side that have instantaneously increased immediately after a start of the backwashing step with respect to the plurality of times of the backwashing step. Then, the estimation unit may be configured to estimate a degree of progress of clogging of the hollow fiber membrane, an effect of the physical washing or the chemical washing, or a future increase in the membrane differential pressure based on a difference, between the plurality of times of the backwashing step, in a difference between the pressure on the secondary side and the pressure on the primary side at a time point at which the any one of the pressures reaches the reaching point.

According to the present configuration, since the pressure on at least one of the primary side and the secondary side of the hollow fiber membrane module is measured at intervals of three seconds or less with respect to the plurality of times of the backwashing step, the reaching point of the pressure on any one of the primary side and the secondary side that has instantaneously increased immediately after the start of the backwashing step can be detected. In other words, in the backwashing step, even with a suspended component that is peeled off from the surface of the hollow fiber membrane by the force of pushing the treated water out from the secondary side to the primary side, the any one of the pressures before the suspended component is reduced by peeling off can be appropriately detected.

As a result, by using a difference between the pressure on the secondary side and the pressure on the primary side at the time of the detection, it is possible to appropriately grasp the degree of progress of the clogging of the hollow fiber membranes or a change in the deposition amount of the suspended components in the hollow fiber membrane. In addition, the effect of eliminating the clogging of the hollow fiber membrane by the physical washing or the chemical washing can be appropriately estimated based on the grasped degree of progress of the clogging of the hollow fiber membrane. In addition, when it is grasped that the deposition amount of suspended components in the hollow fiber membrane has increased, it can be appropriately estimated that the permeation resistance of the hollow fiber membrane will increase and the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The measurement unit may be configured to, when the backwashing step is performed a plurality of times, repeat the measurement in each of the plurality of times of the backwashing step. The estimation unit may be configured to, with respect to the plurality of times of the backwashing step, calculate an integral value of a difference between the pressure on the secondary side and the pressure on the primary side in any one of (1) a time from a start of the backwashing step until the pressure on the primary side or the secondary side that has instantaneously increased immediately after the start of the backwashing step reaches a reaching point, (2) a time from when the pressure on the primary side or the secondary side that has instantaneously increased immediately after the start of the backwashing step reaches the reaching point until when the pressure stabilizes, and (3) a time from a start time point of the backwashing step to a time point at which the pressure on the primary side or the secondary side stabilizes. The estimation unit may be configured to estimate an effect of the physical washing or the chemical washing, or a future increase in the membrane differential pressure based on a difference in the integral value between the plurality of times of the backwashing step.

The present inventors have found from the test operation that an integral value of the difference in a time from the start time point of the backwashing step until the pressure on the primary side or the secondary side stabilizes is significantly different between a case where the degree of progress of the clogging of the hollow fiber membrane is larger than a predetermined degree and a case where the degree of progress of the clogging is smaller than the predetermined degree even when the difference between the pressure on the secondary side and the pressure on the primary side during the filtration step is substantially constant. Similarly, the present inventors have obtained knowledge, from the test operation, that even when the difference between the pressure on the secondary side and the pressure on the primary side during the filtration step is substantially constant, the integral value is significantly different between a case where the deposition amount of the suspended components in the hollow fiber membrane is larger than a predetermined amount and a case where the same is smaller.

The inventors further conducted the test operation, and found that the above integral values of the times are significantly different between a case where the degree of progress of the clogging of the hollow fiber membrane is larger than the predetermined degree and a case where the degree of progress of the clogging of the hollow fiber membrane is smaller than the predetermined degree, and are also significantly different between a case where the deposition amount of the suspended components in the hollow fiber membrane is larger than the predetermined amount and a case where the amount of the suspended components deposited on the hollow fiber membrane is smaller than the predetermined amount, the above integral values of the times being the time from the start of the backwashing step until the pressure on the primary side or the secondary side that has instantaneously increased immediately after the start of the backwashing step reaches the reaching point and being the time from the reaching point of the pressure on the primary side or the secondary side that has instantaneously increased immediately after the start of the backwashing step until the pressure stabilizes.

Accordingly, according to the present configuration, it is possible to appropriately grasp the degree of progress of the clogging of the hollow fiber membrane or the change in the deposition amount of the suspended components in the hollow fiber membrane by a difference, between the plurality of times of the backwashing step, in an integral value of a difference, between the pressure on the secondary side and the pressure on the primary side, in the above three times. Therefore, the effect of elimination of clogging of the hollow fiber membranes by the physical washing or the chemical washing can be appropriately estimated based on the grasped degree of progress of the clogging of the hollow fiber membrane. In addition, when it is grasped that the deposition amount of suspended components in the hollow fiber membrane has increased, it can be appropriately estimated that the permeation resistance of the hollow fiber membrane will increase and the membrane differential pressure will increase.

In the water treatment device, the backwashing step is a step of pushing out treated water on the secondary side to the primary side by a pressurized medium to peel off suspended components accumulated on a surface of a hollow fiber membrane in a filtration step, and the one or more steps may include the backwashing step. The estimation unit may be configured to, when the pressure on the secondary side has stabilized in the backwashing step, estimate whether or not the hollow fiber membrane leaks by comparing the stabilized pressure on the secondary side with the pressure of the medium.

In the backwashing step, in a case where the hollow fiber membrane has no leak, when the pushing of the treated water on the secondary side out to the primary side ends, the pressure on the secondary side stabilizes at a pressure of the medium that pushes the treated water on the secondary side. However, when the hollow fiber membrane leaks, the medium flows out to the primary side of the inside of the hollow fiber membrane module from a location of the leak. As a result, after the pushing of the treated water on the secondary side out to the primary side ends in the backwashing step, the pressure on the secondary side stabilizes at a pressure lower than the medium pressure.

Therefore, according to the present configuration, when the pressure on the secondary side has stabilized in the backwashing step, whether or not the hollow fiber membrane leaks can be appropriately estimated by comparing the stabilized pressure on the secondary side with the medium pressure.

In the water treatment device, the bubbling step is a step of causing a gas to flow in when the inside of the hollow fiber membrane module is full of water, and shaking a hollow fiber membrane to peel off suspended components accumulated on a surface of the hollow fiber membrane, and the one or more steps may include the bubbling step. The estimation unit may be configured to estimate whether or not the peripheral device that allows the gas to flow into the hollow fiber membrane module has abnormality by comparing a predetermined pressure with a reaching point of the pressure on the primary side that has instantaneously increased immediately after a start of the bubbling step.

When gas flows into the hollow fiber membrane module immediately after the start of the bubbling step, water corresponding to an amount of the flowed gas flows into the drain pipe at once, so that the pressure on the primary side instantaneously increases. In addition, the pressure on the primary side increases as an inflow amount of the gas increases.

Therefore, according to the present configuration, an inflow amount of gas flowing into the hollow fiber membrane module can be grasped from a reaching point of the pressure on the primary side that has instantaneously increased immediately after the start of the bubbling step. Whether or not the peripheral device that allows gas to flow into the hollow fiber membrane module is abnormal can be appropriately estimated by comparing the reaching point of the pressure on the primary side with the predetermined pressure.

The water treatment device may further include a setting change unit configured to change a set time of the one or more steps based on an estimated time obtained by the estimation unit. The setting change unit may be configured to change set times of a plurality of steps among the water filling step, the pressure relieving step, the backwashing step, and the draining step based on an estimated time obtained by the estimation unit.

According to the present configuration, based on an estimated time obtained by the estimation unit, set times of the plurality of steps can be automatically changed among the water filling step, the pressure relieving step, the backwashing step, and the draining step. Therefore, set times of the plurality of steps can be set to accurate set times based on a temporal transition of an actually measured pressure, and efficiency can be improved as compared with a case where an operator manually changes a set time.

The water treatment device may further include a control unit configured to control execution of a filtration process of filtering raw water using the hollow fiber membrane module. The water treatment device may further include a notification unit configured to notify a content of abnormality when the estimation unit estimates that the internal state of the hollow fiber membrane module or the peripheral device has the abnormality. The filtration process may include the one or more steps. The control unit may be configured to cause the estimation unit to estimate, at the end of each step after a start of the filtration process, whether or not the internal state of the hollow fiber membrane module or the peripheral device has abnormality based on a temporal transition of the least one of the pressures measured by the measurement unit at each step. Then, the control unit may be configured to, in a case where the notification unit notifies the content of the abnormality, end the filtration process being executed. Alternatively, the control unit may be configured to, in a case where the estimation unit estimates that the internal state of the hollow fiber membrane module has abnormality at the end of the water filling step, the backwashing step, or the draining step, enhance the physical washing or perform the chemical washing.

According to the present configuration, when it is estimated that the internal state of the hollow fiber membrane module or the peripheral device has abnormality at the end of each step after the start of the filtration process, a content of the abnormality is notified, and the filtration process being executed is ended. Therefore, a user of the water treatment device can grasp what kind of abnormality has occurred in the internal state of the hollow fiber membrane module or the peripheral device and in which step in the filtration process the abnormality has occurred. As a result, the user of the water treatment device can quickly take necessary measures against the hollow fiber membrane module or the peripheral device having abnormality in which the filtration process is not being performed.

Alternatively, according to the present configuration, when it is estimated that the internal state of the hollow fiber membrane module has abnormality at the end of the water filling step, the backwashing step, or the draining step, the physical washing of the hollow fiber membrane module is enhanced or the chemical washing of the hollow fiber membrane module is performed. Therefore, the present configuration enables measures to recover the state of the hollow fiber membrane module to be quickly taken, and enables reduction in opportunities for forcibly ending the filtration process.

The invention claimed is:

1. A water treatment device for filtering raw water using a hollow fiber membrane module, the water treatment device comprising:

a measurement unit configured by a measurement control unit, a primary side pressure sensor and a secondary side pressure sensor, wherein the measurement control unit is configured by a microcomputer, the measurement unit being configured to repeat measurement of pressures on a primary side and a secondary side of the hollow fiber membrane module at intervals of less than one second in one or more of a water filling step, a backwashing step, a pressure relieving step, a bubbling step, and a draining step;

an estimater configured by a microcomputer, the estimater being configured to estimate;

(1) abnormality of an internal state of the hollow fiber membrane module or of a peripheral device of the hollow fiber membrane module, (2) a time required from a start to an end of the one or more steps, (3) an effect of physical washing or chemical washing of the hollow fiber membrane module, or (4) a future increase in a membrane differential pressure of the hollow fiber membrane module, based on variation over time of a measurement result of at least one pressure of the primary side and the secondary side pressures by the measurement unit, or when the one or more steps are performed a plurality of times, based on a difference in the variation over time between the plurality of times of the step; and a controller configured by a microcomputer, the controller being configured to act on a result of the estimation by the estimater.

2. The water treatment device according to claim 1, wherein the water filling step is a step of filling an inside of the hollow fiber membrane module with raw water, the one or more steps include the water filling step, and the estimater is configured to estimate a time required for the water filling step based on a time from a start of the water filling step to reaching to an inflection point of a change in the pressure on the primary side.

3. The water treatment device according to claim 1, wherein the water filling step is a step of filling an inside of the hollow fiber membrane module with raw water, the one or more steps include the water filling step, and the estimater is configured to estimate an amount of suspended components accumulated on a surface of a hollow fiber membrane based on a time from a start of the water filling step to reaching to an inflection point of a change in the pressure on the primary side.

4. The water treatment device according to claim 1, wherein the water filling step is a step of filling an inside of the hollow fiber membrane module with raw water, the one or more steps include the water filling step, the measurement unit is configured to, when the water filling step is performed a plurality of times, repeat the measurement in each of the plurality of times of the water filling step, and the estimater is configured to estimate a future increase in the membrane differential pressure based on a difference, between the plurality of times of the water filling step, in a time from a start of the water filling step to reaching to an inflection point of a change in the pressure on the primary side, and the water treatment device further comprises a notifier configured to notify a result of the estimation by the estimater.

5. The water treatment device according to claim 1, wherein the draining step is a step of draining drain water containing peeled off suspended components, the one or more steps include the draining step, and the estimater is configured to estimate a time required for the draining step based on a time from a start of the draining step until the pressure on the primary side stabilizes.

6. The water treatment device according to claim 1, wherein the draining step is a step of draining drain water containing peeled off suspended components, the one or more steps include the draining step, and the estimater is configured to estimate an amount of suspended components accumulated on a surface of a hollow fiber membrane based on a time from a start of the draining step until the pressure on the primary side stabilizes.

7. The water treatment device according to claim 1, wherein the draining step is a step of draining drain water containing peeled off suspended components, the one or more steps include the draining step, the measurement unit is configured to, when the draining step is performed a plurality of times, repeat the measurement in each of the plurality of times of the draining step, and the estimater is configured to estimate a future increase in the membrane differential pressure based on a difference, between the plurality of times of the draining step, in a time from a start of the draining step until the pressure on the primary side becomes constant, and the water treatment device further comprises a notifier configured to notify a result of the estimation by the estimater.

8. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, and the estimater is configured to estimate a time required for the backwashing step based on a time from a start of the backwashing step until the at least one of the pressures becomes constant or until the at least one of the pressures reaches a maximum pressure.

9. The water treatment device according to claim 8, wherein the backwashing step is a step of pushing out treated water on the secondary side to the primary side by a pressurized medium to peel off suspended components accumulated on a surface of a hollow fiber membrane in a filtration step, and the estimater is configured to estimate a length of a time of a chemical solution immersion step of the hollow fiber membrane module based on an estimated time of the backwashing step.

10. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to (1) estimate a blockage degree of the hollow fiber membrane based on a time from a start of the backwashing step until the pressure on the primary side stabilizes at a predetermined end pressure indicating an end of the pushing out of the treated water on the secondary side, or (2) estimate an effect of the physical washing or the chemical washing, or a future increase in the membrane differential pressure based on a difference, between the plurality of times of the backwashing step, in a time from the start of the backwashing step until the pressure on the primary side stabilizes at the end pressure.

11. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to (1) estimate a magnitude of a pipeline resistance of a drain pipeline on the primary side based on a reaching point of the pressure on the primary side that has instantaneously increased immediately after a start of the backwashing step, or (2) estimate an effect of the physical washing or the chemical washing, or a future increase in the membrane differential pressure based on a difference in the reaching point between the plurality of times of the backwashing step.

12. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to estimate an effect of the physical washing or the chemical washing, or a future increase in the membrane differential pressure based on a difference, between the plurality of times of the backwashing step, in a time from a start of the backwashing step until the pressure on the secondary side stabilizes at a pressure of the medium.

13. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to estimate an effect of the physical washing or the chemical washing, or a future increase in the membrane differential pressure based on a difference, between the plurality of times of the backwashing step, in a reaching point of the pressure on the secondary side that has instantaneously increased immediately after a start of the backwashing step.

14. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to detect a reaching point of any one of the pressure on the primary side and the pressure on the secondary side that have instantaneously increased immediately after a start of the backwashing step with respect to the plurality of times of the backwashing step, and estimate a degree of progress of clogging of the hollow fiber membrane, an effect of the physical washing or the chemical washing, or a future increase in the membrane differential pressure based on a difference, between the plurality of times of the backwashing step, in a difference between the pressure on the secondary side and the pressure on the primary side at a time point at which the any one of the pressures reaches the reaching point.

15. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, the measurement unit is configured to, when the backwashing step is performed a plurality of times, repeat the measurement in each of the plurality of times of the backwashing step, and the estimater is configured to, with respect to the plurality of times of the backwashing step, calculate an integral value of a difference between the pressure on the secondary side and the pressure on the primary side in any one of (1) a time from a start of the backwashing step until the pressure on the primary side or the secondary side that has instantaneously increased immediately after the start of the backwashing step reaches a reaching point, (2) a time from when the pressure on the primary side or the secondary side that has instantaneously increased immediately after the start of the backwashing step reaches the reaching point until the pressure stabilizes, and (3) a time from a start time point of the backwashing step to a time point at which the pressure on the primary side or the secondary side stabilizes, and estimate an effect of the physical washing or the chemical washing, or a future increase in the membrane differential pressure based on a difference in the integral value between the plurality of times of the backwashing step.

16. The water treatment device according to claim 1, wherein the backwashing step is a step of pushing out treated water on the secondary side to the primary side by a pressurized medium to peel off suspended components accumulated on a surface of a hollow fiber membrane in a filtration step, the one or more steps include the backwashing step, and the estimater is configured to, when the pressure on the secondary side has stabilized in the backwashing step, estimate whether or not the hollow fiber membrane leaks by comparing the stabilized pressure on the secondary side with a pressure of the medium.

17. The water treatment device according to claim 1, wherein the bubbling step is a step of causing a gas to flow in when the inside of the hollow fiber membrane module is full of water, and shaking a hollow fiber membrane to peel off suspended components accumulated on a surface of the hollow fiber membrane, the one or more steps include the bubbling step, and the estimater is configured to estimate whether or not the peripheral device that allows the gas to flow into the hollow fiber membrane module has abnormality by comparing a predetermined pressure with a reaching point of the pressure on the primary side that has instantaneously increased immediately after a start of the bubbling step.

18. The water treatment device according to claim 2, further comprising a setting changer configured to change a set time of the one or more steps based on an estimated time obtained by the estimater, wherein the setting changer is configured to change set times of a plurality of steps among the water filling step, the pressure relieving step, the backwashing step, and the draining step based on an estimated time obtained by the estimater.

19. The water treatment device according to claim 1, further comprising:

a notifier configured to notify a content of abnormality when the estimation unit estimates that the internal state of the hollow fiber membrane module or the peripheral device has the abnormality, wherein the filtration process includes the one or more steps, and the controller is configured to control execution of a filtration process of filtering raw water using the hollow fiber membrane module, cause the estimater to estimate, at the end of each step after a start of the filtration process, whether or not the internal state of the hollow fiber membrane module or the peripheral device has abnormality based on variation over time of the at least one of the pressures measured by the measurement unit at each step, and (1) in a case where the notifier notifies the content of the abnormality, end the filtration process being executed, or (2) in a case when the estimater estimates that the internal state of the hollow fiber membrane module has abnormality at the end of the water filling step, the backwashing step, or the draining step, enhance the physical washing or perform the chemical washing.

20. The water treatment device according to claim 5, further comprising a setting changer configured to change a set time of the one or more steps based on an estimated time obtained by the estimater, wherein the setting changer is configured to change set times of a plurality of steps among the water filling step, the pressure relieving step, the backwashing step, and the draining step based on an estimated time obtained by the estimater.

21. The water treatment device according to claim 8, further comprising a setting changer configured to change a set time of the one or more steps based on an estimated time obtained by the estimater, wherein the setting changer is configured to change set times of a plurality of steps among the water filling step, the pressure relieving step, the backwashing step, and the draining step based on an estimated time obtained by the estimater.

22. The water treatment device according to claim 9, further comprising a setting changer configured to change a set time of the one or more steps based on an estimated time obtained by the estimater, wherein the setting changer is configured to change set times of a plurality of steps among the water filling step, the pressure relieving step, the backwashing step, and the draining step based on an estimated time obtained by the estimater.

23. An estimation method in a water treatment device for filtering raw water using a hollow fiber membrane module, wherein a computer of the water treatment device repeats measurement of pressures on a primary side and a secondary side of the hollow fiber membrane module at intervals of less than one second in one or more of a water filling step, a backwashing step, a pressure relieving step, a bubbling step, and a draining step, and estimates (1) abnormality of an internal state of the hollow fiber membrane module or of a peripheral device of the hollow fiber membrane module, (2) a time required from a start to an end of the one or more steps, (3) an effect of physical washing or chemical washing of the hollow fiber membrane module, or (4) a future increase in a membrane differential pressure of the hollow fiber membrane module, based on variation over time of a measurement result of a pressure of at least one of the primary side and the secondary side, or when the one or more steps are performed a plurality of times, based on a difference in the variation over time between the plurality of times of the step.

* * * * *